United States Patent
Bae et al.

(10) Patent No.: US 10,963,107 B2
(45) Date of Patent: Mar. 30, 2021

(54) TOUCH DISPLAY DEVICE, ACTIVE PEN, TOUCH SYSTEM, TOUCH CIRCUIT, AND PEN RECOGNITION METHOD

(71) Applicant: LG Display Co., Ltd., Seoul (KR)

(72) Inventors: SangHyuck Bae, Paju-si (KR); BuYeol Lee, Goyang-si (KR); SeungRok Shin, Goyang-si (KR); CheolSe Kim, Daegu (KR); DeukSu Lee, Goyang-si (KR); Hyunwoo Jang, Paju-si (KR); Jaeseung Kim, Goyang-si (KR); YoungGyu Kim, Paju-si (KR); Hyunsuk Cho, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/591,155

(22) Filed: Oct. 2, 2019

(65) Prior Publication Data

US 2020/0033990 A1 Jan. 30, 2020

Related U.S. Application Data

(63) Continuation of application No. 15/792,409, filed on Oct. 24, 2017, now Pat. No. 10,474,286.

(30) Foreign Application Priority Data

Oct. 25, 2016 (KR) .................. 10-2016-0139550
Mar. 3, 2017 (KR) .................. 10-2017-0027939

(51) Int. Cl.
*G06F 3/041* (2006.01)
*G06F 3/0354* (2013.01)
(Continued)

(52) U.S. Cl.
CPC .......... *G06F 3/0442* (2019.05); *G06F 3/0383* (2013.01); *G06F 3/03545* (2013.01);
(Continued)

(58) Field of Classification Search
CPC .... G06F 3/0416; G06F 3/0383; G06F 3/0412; G06F 3/03545; G06F 3/044;
(Continued)

(56) References Cited

U.S. PATENT DOCUMENTS 8,866,767 B2 * 10/2014 Shahparnia ......... G06F 3/03545
345/173
8,963,838 B2 2/2015 King et al.
(Continued)

FOREIGN PATENT DOCUMENTS

CN 104731399 A 6/2015
CN 105320376 A 2/2016
(Continued)

OTHER PUBLICATIONS

United States Office Action, U.S. Appl. No. 15/792,409, dated Mar. 11, 2019, 29 pages.

*Primary Examiner* — Vinh T Lam
(74) *Attorney, Agent, or Firm* — Fenwick & West LLP

(57) ABSTRACT

Embodiments described herein is able to provide a touch display device, an active pen, a touch system, a touch circuit, and a pen recognition method capable of efficiently providing a display function, a touch-sensing function, and a pen-touch-sensing function.

16 Claims, 49 Drawing Sheets

[Pen Searching mode Concept Diagram]

(51) Int. Cl.
*G06F 3/038* (2013.01)
*G06F 3/044* (2006.01)

(52) U.S. Cl.
CPC .......... *G06F 3/0412* (2013.01); *G06F 3/0441* (2019.05); *G06F 3/04162* (2019.05); *G06F 3/04166* (2019.05); *G06F 2203/04104* (2013.01); *G06F 2203/04111* (2013.01); *G06F 2203/04112* (2013.01)

(58) Field of Classification Search
CPC . G06F 2203/04112; G06F 2203/04104; G06F 2203/04111
See application file for complete search history.

(56) References Cited

U.S. PATENT DOCUMENTS

| | | | |
|---|---|---|---|
| 9,274,639 B2 | 3/2016 | Park et al. | |
| 9,348,476 B2 | 5/2016 | Lee | |
| 9,489,076 B2 | 11/2016 | Park et al. | |
| 2010/0315357 A1 | 12/2010 | Choi et al. | |
| 2012/0105362 A1* | 5/2012 | Kremin | G06F 3/03545 345/174 |
| 2013/0207938 A1* | 8/2013 | Ryshtun | G06F 3/04166 345/179 |
| 2014/0002409 A1* | 1/2014 | Rohozin | G06F 3/0488 345/174 |
| 2014/0009432 A1* | 1/2014 | Kwon | G06F 3/044 345/174 |
| 2014/0049507 A1 | 2/2014 | Shepelev et al. | |
| 2015/0035797 A1* | 2/2015 | Shahparnia | G06F 3/03545 345/174 |
| 2015/0177868 A1 | 6/2015 | Morein et al. | |
| 2015/0179133 A1 | 6/2015 | Lee | |
| 2015/0261356 A1 | 9/2015 | Shepelev et al. | |
| 2015/0302831 A1 | 10/2015 | Reynolds | |
| 2015/0355762 A1 | 12/2015 | Tripathi et al. | |
| 2016/0026312 A1 | 1/2016 | Park et al. | |
| 2016/0098134 A1 | 4/2016 | Park et al. | |
| 2016/0116997 A1* | 4/2016 | Kim | G06F 3/03545 345/174 |
| 2016/0162044 A1* | 6/2016 | Ciou | G06F 3/04162 345/179 |
| 2016/0239123 A1 | 8/2016 | Ye et al. | |
| 2016/0246390 A1* | 8/2016 | Lukanc | G06F 3/0383 |
| 2016/0306447 A1 | 10/2016 | Fleck et al. | |
| 2016/0357292 A1* | 12/2016 | Suzuki | G06F 3/0442 |
| 2016/0370915 A1 | 12/2016 | Agarwal et al. | |
| 2017/0003792 A1 | 1/2017 | Berget et al. | |
| 2017/0031465 A1* | 2/2017 | Jung | G06F 3/0442 |
| 2017/0108984 A1* | 4/2017 | Takaya | G06F 3/0441 |
| 2017/0153763 A1* | 6/2017 | Vavra | G06F 3/0441 |
| 2017/0177137 A1* | 6/2017 | Bell | G06F 3/0442 |
| 2017/0315655 A1 | 11/2017 | Weinerth | |
| 2018/0004338 A1 | 1/2018 | Khazeni et al. | |
| 2018/0095553 A1* | 4/2018 | Birenberg | G06F 3/04162 |

FOREIGN PATENT DOCUMENTS

| | | |
|---|---|---|
| KR | 10-2014-0049324 A | 4/2014 |
| WO | WO 2016/004003 A1 | 1/2016 |

* cited by examiner

[Pen Searching mode Concept Diagram]

[Pen mode Concept Diagram]

FIG.22

Pen Searching Mode

| LHB #1 | LHB #2 | LHB #3 | LHB #4 | LHB #5 | LHB #6 | LHB #7 | LHB #8 | LHB #9 | LHB #10 | LHB #11 | LHB #12 | LHB #13 | LHB #14 | LHB #15 | LHB #16 |
|---|---|---|---|---|---|---|---|---|---|---|---|---|---|---|---|
| BCON | Full Tone | Full Tone | Full Tone | Full Tone | Full Tone | Full Tone | Full Tone | BCON | Full Tone | Full Tone | Full Tone | Full Tone | Full Tone | Full Tone | Full Tone |
| FP0000000 | 0 | 0 | 0 | 0 | 0 | 0 | 0 | FP0000000 | 0 | 0 | 0 | 0 | 0 | 0 | 0 |

FIG.23A

Pen Mode (Single Active Pen)

| LHB #1 | LHB #2 | LHB #3 | LHB #4 | LHB #5 | LHB #6 | LHB #7 | LHB #8 | LHB #9 | LHB #10 | LHB #11 | LHB #12 | LHB #13 | LHB #14 | LHB #15 | LHB #16 |
|---|---|---|---|---|---|---|---|---|---|---|---|---|---|---|---|
| BCON | Position &Tilt | Pressure | Full.Tone | Full.Tone | Position &Tilt | Pressure | Full.Tone | BCON | Position &Tilt | Data | Full.Tone | Full.Tone | Position &Tilt | Data | Full.Tone |
| FP1200120 | 1 | 2 | 0 | 0 | 1 | 2 | 0 | FP1300130 | 1 | 3 | 0 | 0 | 1 | 3 | 0 |

FIG.23B

Pen Mode (Two Active Pen)

| LHB #1 | LHB #2 | LHB #3 | LHB #4 | LHB #5 | LHB #6 | LHB #7 | LHB #8 | LHB #9 | LHB #10 | LHB #11 | LHB #12 | LHB #13 | LHB #14 | LHB #15 | LHB #16 |
|---|---|---|---|---|---|---|---|---|---|---|---|---|---|---|---|
| BCON | (Pen 1, 2) Position | (Pen 1) Pressure | Full Tone | Full Tone | (Pen 1, 2) Tilt | (Pen 1) Data | Full Tone | BCON | (Pen 1, 2) Position | (Pen 2) Pressure | Full Tone | Full Tone | (Pen 1, 2) Tilt | (Pen 2) Data | Full Tone |
| FP1200130 | 1 | 2 | 0 | 0 | 1 | 3 | 0 | FP1200130 | 1 | 2 | 0 | 0 | 1 | 3 | 0 |

FIG.25

| | Position and/or Tilt | Pressure | Data |
|---|---|---|---|
| Importance | High | Middle | Low |
| Number of LHBs | High | Middle | Low |
| Interval of LHBs | Uniform Interval | Uniform or Non-uniform Interval | Uniform or Non-uniform Interval |

FIG.26
Driving Signal (AC)
Driving Signal (DC)

FIG.36
Full Sensing
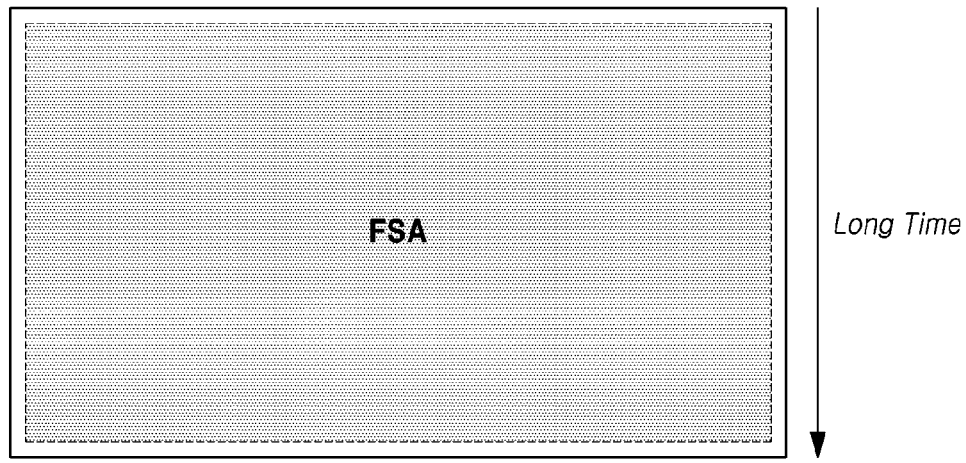
Long Time
Local Sensing
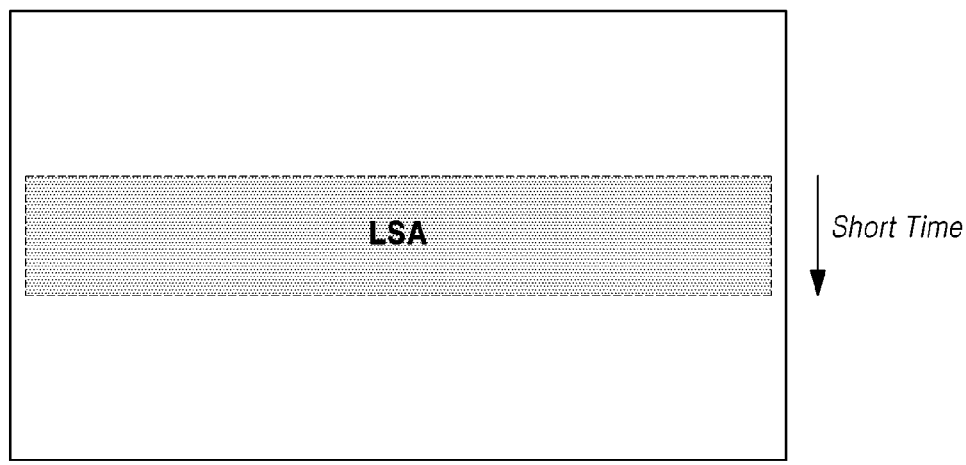
Short Time

Local Sensing

FIG.40
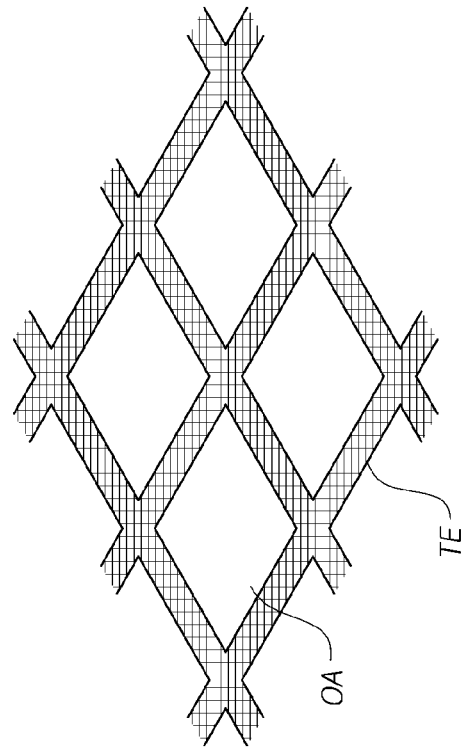
MESH TYPE
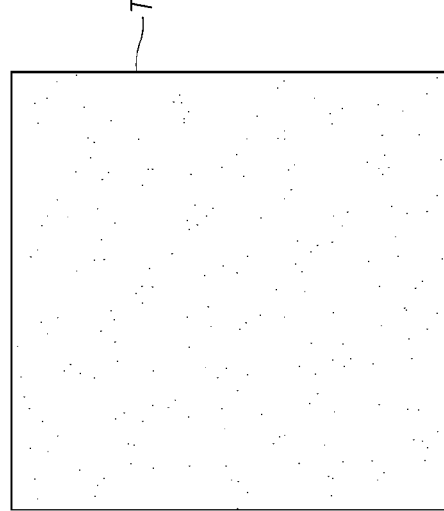
PLATE TYPE

TOE STRUCTURE

TOUCH DISPLAY DEVICE, ACTIVE PEN, TOUCH SYSTEM, TOUCH CIRCUIT, AND PEN RECOGNITION METHOD

CROSS REFERENCE TO RELATED APPLICATIONS

This application is a continuation of U.S. patent application Ser. No. 15/792,409 filed on Oct. 24, 2017 which claims priority from Republic of Korea Patent Application No. 10-2016-0139550, filed on Oct. 25, 2016, and Republic of Korea Patent Application No. 10-2017-0027939, filed on Mar. 3, 2017, each of which is hereby incorporated by reference in its entirety.

BACKGROUND

1. Field of Technology

The present disclosure relates to a touch display device, an active pen, a touch system, a touch circuit, and a touch recognition method.

2. Description of the Prior Art

With the development of the information-oriented society, demands for a touch display device for displaying an image are increasing in various forms, and various display devices, such as a liquid crystal display (LCD) device, a plasma display panel (PDP) device, and an organic light-emitting display (OLED) device, are utilized.

Such display devices provide a touch-based input method that enables a user to easily input information or commands intuitively and conveniently, apart from a conventional input method using buttons, a keyboard, a mouse, or the like.

In order to provide such a touch-based input method, it is necessary to determine the presence or absence of the user's touch, and to correctly detect touch coordinates.

For this purpose, in the related art, one of various touch methods, such as a resistance film touch method, a capacitance touch method, an electromagnetic induction touch method, an infrared touch method, and an ultrasonic touch method has been employed in order to provide a touch-enabled display device.

Among these various touch methods, a capacitance touch method that detects the presence or absence of a touch, touch coordinates, and the like, based on a capacitance between touch electrodes or a change in capacitance between a touch electrode and a pointer, such as a finger, through a plurality of touch electrodes formed on a touch screen panel is frequently adopted.

Meanwhile, attempts have been made to incorporate a touch screen panel composed of touch electrodes into a display panel in order to improve the convenience of manufacture of the touch display device, to reduce the size of the touch display device, and so on.

In addition to fingers, a pen touch technology has also been developed in response to increasing demands for sophisticated pen-touch inputs.

However, while the touch display device basically provides a display function, there is considerable difficulty in efficiently supporting both a finger touch and a pen touch.

SUMMARY

In view of the above, an object of embodiments disclosed herein is to provide a touch display device, an active pen, a touch system, a touch circuit, and a pen recognition method capable of efficiently providing a display function, a touch-sensing function (e.g., a function of sensing a touch made by a finger or the like), and a pen-touch-sensing function.

Another object of the embodiments is to provide a touch display device, an active pen, a touch system, a touch circuit, and a pen recognition method capable of improving pen-touch-sensing performance without deteriorating display performance or touch performance.

Another object of the embodiments is to provide a touch display device, an active pen, a touch system, a touch circuit, and a pen recognition method which enable a plurality of pen-touch inputs at the same time.

Still another object of the embodiments is to provide a touch display device, an active pen, a touch system, a touch circuit, and a pen recognition method capable of accurately distinguishing and processing a plurality of pen-touch inputs from each other.

Yet another object of the present embodiments is to provide a touch display device, an active pen, a touch system, a touch circuit, and a pen recognition method that enable the recognition of positions, pressures, tilts, buttons, and the like not only for one pen, but also for a plurality of pens.

In one aspect, embodiments disclosed herein may provide a touch display device including: a display panel in which a plurality of data lines and a plurality of gate lines are arranged, and a plurality of touch electrodes which are embedded in the display panel and in which a plurality of sub-pixels, which are defined by the plurality of data lines and the plurality of gate lines, are arranged; a data-driving circuit configured to drive the plurality of data lines; a gate driving circuit configured to drive the plurality of gate lines; and a touch-driving circuit configured to drive the plurality of touch electrodes.

In such a touch display device, one frame period may be driven in the state of being divided into two or more display periods and two or more touch periods.

Further, in the touch display device, it is possible to sense an active pen and a touch target object other than the active pen during the two or more touch periods.

The two or more touch periods may include a period, in which a beacon signal is transmitted from the display panel to the active pen.

The active pen may determine panel information and a panel status based on the beacon signal.

The active pen may determine one of a pen-searching mode and a pen mode as a touch panel state based on the beacon signal.

In the pen-searching mode, it is possible to recognize whether or not an active pen exists and the position of the active pen.

In the pen mode, the position of the active pen and various kinds of data may be received from the active pen. When a new active pen is added through full sensing of the entire screen area, the position of the new active pen and related data may be transmitted.

Each of the plurality of touch electrodes may be connected to the touch-driving circuit via a signal line.

Each of the plurality of touch electrodes may be larger than the size of one sub-pixel area.

According to one aspect, embodiments disclosed herein may provide a touch display device including: a display panel on which a plurality of touch electrodes is arranged; and a touch circuit configured to provide a driving signal to the display panel, and to sense a touch made by a finger or"

to sense pen touches made by two or more active pens based on a signal received in response to the driving signal.

One frame period may repeatedly include a display period and a blank period.

Pen signals output from the two or more active pens may be emitted to the display panel in two or more blank periods among a plurality of blank periods in the one frame period.

The touch circuit may sense the pen touches made by the two or more active pens based on the pen signals.

In another aspect, embodiments disclosed herein may provide a touch system including: two or more active pens; and a touch display device including a display panel, on which a plurality of touch electrodes is arranged, and a touch circuit configured to provide a driving signal to the display panel, and to sense a touch made by a finger or to sense pen touches made by two or more active pens based on a signal received in response to the driving signal.

In the touch display device, one frame period may repeatedly include a display period and a blank period, and in two or more blank periods among a plurality of blank periods in one frame period, pen signals output from the two or more active pens may be emitted to the display panel.

The touch circuit of the touch display device may sense the pen touches made by the two or more active pens based on the pen signals.

In still another aspect, embodiments disclosed herein may provide an active pen interlocked with a touch display device. The active pen may include: two or more pen tips which are in contact with or not in contact with a display panel of the touch display device; and a processing unit configured to sense a pressure through at least one of the two or more pen tips, to receive a driving signal applied to the display panel through at least one of the two or more pen tips, and to output a pen signal to the display panel through at least one of the two or more pen tips.

The pen signal may be output to the display panel in a blank period between two display periods.

During the blank period where the pen signal is output to the display panel, the pen signal of another active pen may also be output to the display panel.

In another aspect, embodiments disclosed herein may provide a touch circuit including: a first circuit configured to supply a driving signal to a display panel on which a plurality of touch electrodes is arranged and to detect a signal generated in response to the driving signal through the display panel; and a second circuit configured to sense a touch made by a finger or to sense a pen touch made by an active pen based on the signal detected in the first circuit.

The first circuit may operate in a plurality of blank periods within one frame period, may supply driving signals to the display panel during two or more different blank periods in one frame period, and may detect, through the display panel, the pen signals output from the two or more active pens.

The second circuit may sense the pen touches made by the two or more active pens based on the pen signals.

In still another aspect, embodiments disclosed herein may provide a pen recognition method in a touch display device. The pen recognition method may include: a first step of supplying a driving signal to a display panel on which a plurality of touch electrodes is arranged and detecting a signal generated in response to the driving signal through the display panel; and a second step of sensing a touch made by a finger or sensing a pen touch made by an active pen based on the signal detected in the first step.

In the first step, the touch display device may operate in a plurality of blank periods within one frame period, may supply the driving signal to the display panel during two or more different blank periods in one frame period, and may detect the pen signals output from the two or more active pens through the display panel.

In the second step, the touch display device may sense the pen touches made by the two or more active pens based on the pen signals.

According to still another aspect, embodiments disclosed herein may provide a touch display device including: a display panel on which a plurality of touch electrodes is arranged; and a touch circuit configured to supply a driving signal to the display panel and to sense a touch made by a finger or to sense a pen touch made by an active pen based on a signal received in response to the driving signal.

A blank period exists between every two display periods in which display driving is performed, and among the plurality of blank periods, there are a first blank period, a second blank period, and a third blank period respectively corresponding to three different blank periods in which the display panel receives the pen signal from the active pen.

During the first blank period, the touch circuit may sense a position of the active pen by receiving a pen signal output from the active pen through the display panel, during the second blank period, the touch circuit may sense a position of the active pen by receiving a pen signal output from the active pen through the display panel, and during the third blank period, the touch circuit may sense a position of the active pen by receiving a pen signal output from the active pen through the display panel.

Even if at least one of the position of the active pen detected through the first blank period, the position of the active pen detected through the second blank period, and the position of the active pen detected through the third blank period is different from remaining ones thereof, a time interval between the first blank period and the second blank period and a time interval between the second blank period and the third blank period may be the same.

In still another aspect, embodiments disclosed herein may provide an active pen interlocked with a touch display device. The active pen may include: two or more pen tips, which are in contact with or not in contact with a display panel of the touch display device; and a processing unit configured to sense pressure through at least one of the two or more pen tips, to receive a driving signal applied to the display panel through at least one of the two or more pen tips, and to generate a pen signal to the display panel through at least one of the two or more pen tips.

A pen signal generated on the display panel through at least one of the two or more pen tips in order to detect the position of the active pen may be generated in a first blank period, a second blank period, and a third blank period which respectively correspond to three different blank periods among blank periods each existing between every two display periods in which display driving is performed. Even if at least one of the position of the active pen in the first blank period, the position of the active pen in the second blank period, and the position of the active pen in the third blank period is different from remaining ones thereof, the time interval between the first blank period and the second blank period and the time interval between the second blank period and the third blank period may be the same.

According to still another aspect, embodiments disclosed herein may provide a touch display device including: a display panel, on which a plurality of touch electrodes is arranged; and a touch circuit configured to supply a driving signal to the display panel, and to sense a touch made by a finger or to sense a pen touch made by an active pen based on a signal received in response to the driving signal.

A blank period may exist between display periods in which the display panel is driven to display. A first blank period and a second blank period may exist, in which a beacon signal is transmitted from the display panel to the active pen.

The beacon signal transmitted in the first blank period may include information for controlling the driving for sensing the pen touch made by the active pen during one or more blank periods existing between the first blank period and the second blank period.

According to still another aspect, embodiments disclosed herein may provide a touch display device including: a display panel on which a plurality of touch electrodes is arranged; and a touch circuit configured to supply a touch-driving signal to a plurality of touch electrodes, and to sense a touch generated on the display panel.

One frame period of the display panel may include a plurality of display periods and a plurality of blank periods, and the plurality of blank periods may include at least a first blank period and a second blank period.

A beacon signal may be supplied to at least one of the plurality of touch electrodes during the first blank period.

A touch-driving signal may be supplied to at least one of the plurality of touch electrodes during the second blank period.

The plurality of blank periods may further include a third blank period, and a signal different from the touch-driving signal supplied to the touch electrode in the second blank period may be supplied during the third blank period.

The touch circuit may include a touch-sensing unit configured to sense a touch by sensing a touch electrode by outputting a touch-driving signal, a signal-generating unit configured to generate a signal different from the touch-driving signal, and a switch configured to selectively electrically connect at least one of the signal-generating unit and the touch-sensing unit to the touch electrode.

In still another aspect, embodiments disclosed herein may provide an active pen interlocked with a touch display device. The active pen may include: one or more pen tips which are in contact with or not in contact with a display panel of the touch display device; and a processing unit configured to receive a beacon signal applied to the display panel through at least one of the one or more pen tips and to output a pen signal to the display panel based on the beacon signal.

In yet another aspect, embodiments disclosed herein may provide a touch system including: a touch display device including a touch panel on which a plurality of touch electrodes is arranged, and a touch circuit configured to supply a touch-driving signal to a plurality of touch electrodes and to sense a touch generated on the display panel; and an active pen including one or more pen tips which are in contact with or not in contact with the display panel and a processing unit configured to receive a beacon signal applied to the display panel through at least one of the one or more pen tips, and to output a pen signal to the display panel based on the beacon signal.

One frame period of the display panel may include a plurality of display periods and a plurality of blank periods, and the plurality of blank periods may include at least a first blank period and a second blank period.

A beacon signal may be supplied to at least one of the plurality of touch electrodes during the first blank period. A touch-driving signal may be supplied to at least one of the plurality of touch electrodes during the second blank period.

The pen signal may be output to the display panel in a blank period between two display periods, and during the blank period where the pen signal is output to the display panel, the pen signal may also be output to the display panel in another active pen.

According to the embodiments described above, it is possible to provide a touch display device, an active pen, a touch system, a touch circuit, and a pen recognition method capable of efficiently providing a display function, a touch-sensing function, and a pen-touch-sensing function.

According to the embodiments, it is possible to provide a touch display device, an active pen, a touch system, a touch circuit, and a pen recognition method capable of improving pen-touch-sensing performance without deteriorating display performance or touch performance.

According to the embodiments, it is possible to provide a touch display device, an active pen, a touch system, a touch circuit, and a pen recognition method which enable a plurality of pen-touch inputs to be made at the same time.

According to the embodiments, it is possible to provide a touch display device, an active pen, a touch system, a touch circuit, and a pen recognition method capable of accurately distinguishing and processing a plurality of pen-touch inputs from each other.

According to the embodiments, it is possible to provide a touch display device, an active pen, a touch system, a touch circuit, and a pen recognition method that enable the recognition of positions, pressures, tilts, buttons, and the like not only for one pen, but also for a plurality of pens.

A touch display device comprising: a display panel comprising a plurality of touch electrodes for sensing touch of the display panel; and a touch circuit configured to supply a drive signal to the display panel, the touch circuit sensing at least one of a finger touch of the display panel based on a touch signal received in response to the drive signal or pen touches of the display panel by a plurality of pens based on pen signals received from the plurality of pens in response to the drive signal, wherein one frame period of the touch display device includes a plurality of alternating display periods for displaying images and a plurality of blank periods, the pen signals output from the plurality of pens to the display panel in two or more blank periods from the plurality of blank periods in the one frame period of the touch display device.

A pen in communication with a touch display device, the pen comprising: a plurality of pen tips that are either in contact with a display panel of the touch display device or not in contact with the display panel of the touch display device; and a processing unit configured to sense a pressure through at least one of the plurality of pen tips, receive a driving signal applied by the display panel through at least one of the plurality of pen tips, and output pen signals to the display panel through at least one of the plurality of pen tips, wherein the pen signals are output by the pen to the display panel in a blank period, the blank period between two display periods for displaying one or more images on the display panel, and during the blank period in which the pen signals are output to the display panel by the pen, an additional pen signal is output to the display panel by another pen.

A touch circuit comprising: a first circuit configured to supply a driving signal to a display panel comprising a plurality of touch electrodes and to detect a signal generated in response to the driving signal through the display panel; and a second circuit configured to sense a finger touch of the display panel or a pen touch of the display panel by a plurality of pens based on the signal detected in the first circuit, wherein the first circuit operates in a plurality of blank periods within one frame period, supplies the driving signal to the display panel during two or more different blank periods in the one frame period, and detects pen signals output from the plurality of pens, and the second circuit senses the pen touches made by the plurality of pens based on the pen signals.

A method of recognizing a pen by a touch display device, the method comprising: supplying a driving signal to a display panel comprising a plurality of touch electrodes, and detecting a signal generated in response to the driving signal through the display panel; and sensing a finger touch of the display panel or a pen touch of the display panel by active plurality of pens based on the detected signal, wherein the touch display device operates in a plurality of blank periods within one frame period, supplies the driving signal to the display panel during two or more different blank periods in one frame period, and detects pen signals output from the plurality of pens, and wherein the touch display device senses pen touches made by the plurality of pens based on the pen signals.

A touch display device comprising: a display panel comprising a plurality of touch electrodes for sensing touch of the display panel; and a touch circuit configured to supply a touch-driving signal to the plurality of touch electrodes, the touch circuit sensing a touch of the display panel, wherein one frame period of the display panel includes a plurality of display periods for displaying images and a plurality of blank periods, the plurality of blank periods including at least a first blank period and a second blank period, wherein a beacon signal is supplied to at least one of the plurality of touch electrodes during the first blank period, and a touch-driving signal for sensing touch of the display panel is supplied to at least one of the plurality of touch electrodes during the second blank period.

A touch display device comprising: a display panel comprising a plurality of touch electrodes for sensing touch of the display panel; and a touch circuit configured to supply a touch-driving signal to the plurality of touch electrodes, the touch circuit sensing a touch of the display panel, wherein one frame period of the display panel includes a plurality of display periods for displaying images and a plurality of blank periods, wherein one frame period of the display panel includes a plurality of display periods for displaying images and a plurality of blank periods, a beacon signal is supplied to at least one of the plurality of touch electrodes during the first blank period, and a touch-driving signal for sensing touch of the display panel is supplied to at least one of the plurality of touch electrodes during the second blank period.

BRIEF DESCRIPTION OF THE DRAWINGS

The above and other objects, features and advantages of the present invention will be more apparent from the following detailed description taken in conjunction with the accompanying drawings, in which:

FIG. 22 is a view exemplifying LHB driving and pen driving for the pen-searching mode of the touch system according to embodiments disclosed herein;

FIG. 23A is a view exemplifying LHB driving and pen driving for the pen mode of the touch system according to embodiments disclosed herein;

FIG. 23B is another view exemplifying LHB driving and pen driving for the pen mode of the touch system according to embodiments disclosed herein;

FIG. 25 is a view illustrating characteristics related to the recognition of the position, pressure, and data of the active pen when the pen-touch sensing is performed in the touch system according to embodiments disclosed herein;

FIG. 26 is a view exemplifying driving signals in the touch display device according to embodiments disclosed herein;

FIG. 36 is a view illustrating full sensing and local sensing in the touch system according to embodiments disclosed herein;

FIG. 40 is a view illustrating two types of touch electrodes in the touch display device according to embodiments disclosed herein;

DETAILED DESCRIPTION

Figure 1:
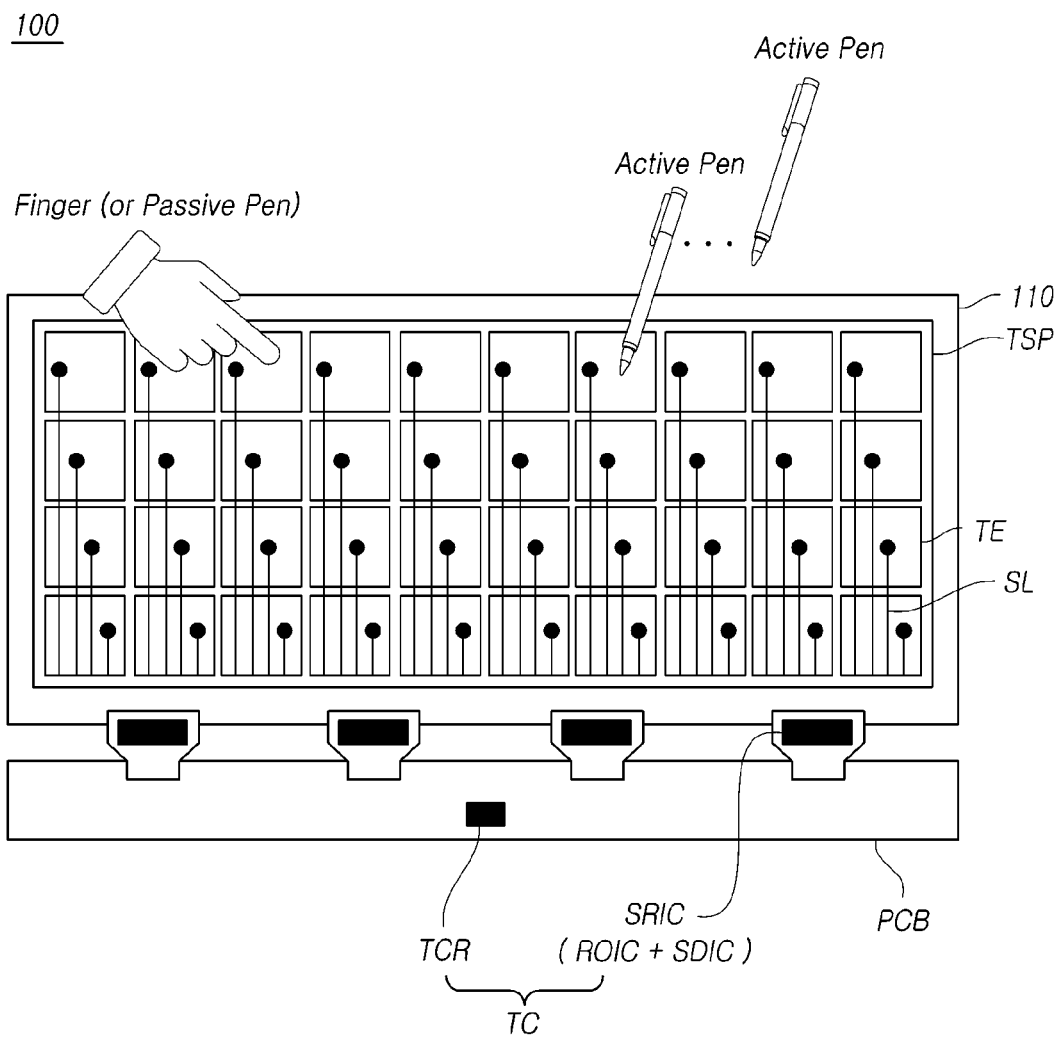
FIG. 1 is a view illustrating a touch display device system according to embodiments disclosed herein.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 2:
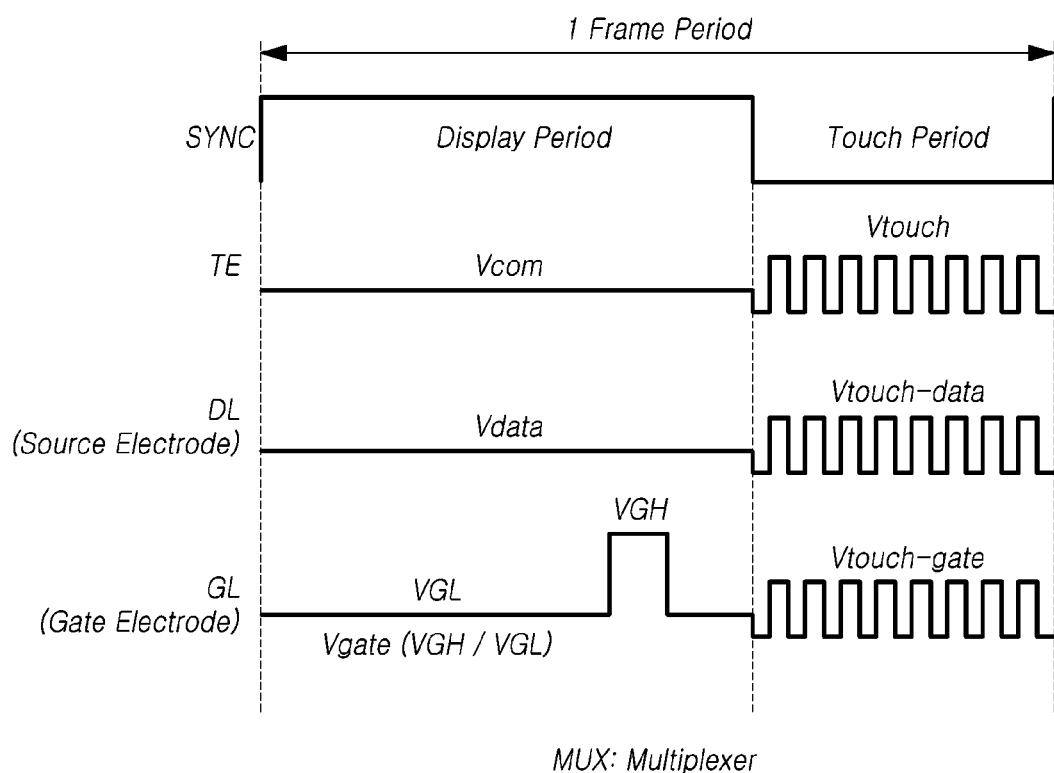
FIG. 2 is an operation timing diagram of a touch display device according to embodiments disclosed herein.

FIG. 1 is view illustrating a touch display device 100 according to the present embodiments, and FIG. 2 is an operation timing diagram of the touch display device 100 according to the present embodiments.

Referring to FIG. 1, the touch display device 100 according to the present embodiments is capable of providing a touch-sensing function for a passive touch input pointer, such as a finger, and a pen-touch-sensing function (pen recognition function) for an active pen, which corresponds to an active touch input pointer as well as an image display function.

The touch display device 100 according to the present embodiments is a display device in which a touch panel TSP including a plurality of touch electrodes TE serving as a touch sensor is embedded in a display panel 110. The touch display device 100 may be a television TV, a monitor, or a mobile device, such as a tablet or a smart phone.

For example, the touch display device 100 may be used as a plurality of touch electrodes TE by separating common electrodes (Vcom electrodes) used at the time of display driving into a plurality of blocks.

As another example, the touch display device 100 may use a plurality of touch electrodes TE as electrodes dedicated to the touch sensor (i.e., electrodes dedicated for touch driving).

The display panel 110 may be various kinds of panels, such as a liquid crystal display panel or an organic light-emitting display panel.

For example, when the display panel 110 is a liquid crystal display panel, the touch display device 100 is applied with a common voltage Vcom so that common electrodes, which form an electric field with pixel electrodes, are separated into a plurality of blocks so as to be used as a plurality of touch electrodes TE.

As another example, when the display panel 110 is an organic light-emitting display panel, the touch display device 100 may include a plurality of touch electrodes TE, which may be formed on a touch sensor metal layer, which may be positioned on an encapsulation layer, which may be positioned on a first electrode, an organic light-emitting layer, and a second electrode, which constitute an organic light-emitting diode (OLED), so as to have an encapsulation function.

Hereinafter, for convenience of explanation, it is assumed that a plurality of touch electrodes TE is used as touch-driving electrodes (touch sensors) at the time of touch driving, and is used as common electrodes (Vcom electrodes) at the time of display driving.

The touch display device 100 may include a touch circuit TC configured to drive a touch panel TSP (also referred to as a "touch screen panel"), thereby receiving a signal through the touch panel TSP, and to perform touch sensing and pen-touch sensing on the basis of the received signal.

The touch circuit TC may include a first circuit configured to drive the touch panel TSP, thereby receiving a signal through the touch panel TSP and a second circuit configured to perform touch sensing (finger-touch sensing) and pen-touch sensing (pen recognition processing) using the signal received by the first circuit via the touch panel TSP.

The first circuit may also be referral to as a touch-driving circuit ROIC, and the second circuit may also be referred to as a touch controller TCR.

As illustrated in FIG. 1, each touch-driving circuit ROIC may be implemented as an integrated driving chip SRIC together with a data-driving circuit SDIC for driving data lines.

The integrated driver chip SRIC may be of a chip-on-film (COF) type mounted on a film.

The film on which the integrated driving chip SRIC is mounted may be bonded to each of a bonding portion on the display panel 110 and a bonding portion on the PCB.

The touch controller TCR or the like may be mounted on the PCB.

The touch-driving circuit ROIC and the data-driving circuit SDIC may be implemented as separate driving chips. The touch operation circuit ROIC may be electrically connected to a plurality of touch electrodes IL, which constitutes the touch panel TSP, through a plurality of signal lines SL.

Referring to FIGS. 1 and 2, the touch display device 100 is driven by dividing one frame period (frame period) thereof into one or more display periods and one or more touch periods. Here, the display period and the touch period may be defined by a synchronization signal SYNC.

For example, when one frame period is divided into two display periods (a first display period and a second display period) and two touch periods (a first touch period and a second touch period), during one frame period, the display driving in the first display period, the touch driving in the first touch period, the display driving in the second display period, and the touch driving in the second touch period may be sequentially performed.

For example, in a case where the plurality of touch electrodes TE serves as a touch sensor corresponding to a touch-driving electrode, and also serves as a common electrode (Vcom electrode) corresponding to a display-driving electrode, the touch display device 100 applies the common voltage Vcom (which may be in the form of a DC voltage) to the plurality of touch electrodes TE that serves as a common electrode (Vcom electrode) during the display period, may apply the corresponding display data voltage Vdata to a source electrode (or a data line DL), and applies a gate voltage Vgate having a gate high voltage VGH or a gate low voltage VGL to a gate electrode (or a gate line GL).

The touch display device 100 applies a touch-driving signal TDS to the touch electrodes TE during the touch period.

Here, in this specification, the touch-driving signal may also be referral to as a touch-driving voltage (Vtouch), a touch panel driving signal, or a driving signal.

At this time, the touch display device 100 may apply a signal, which is the same as the touch-driving signal Vtouch applied to the touch electrodes TE, to the data lines DL and/or the gate lines GL, or may apply a signal, which is the same as, substantially the same as or similar to the touch-driving signal Vtouch in terms of at least one of a frequency, an amplitude (a voltage difference between a high-level voltage and a low-level voltage), and a phase, to the data lines DL and/or the gate lines GL. Here, the term "substantially the same" means that when two values are not completely the same as each other, but a difference between the two values is within a predetermined tolerance margin or a measurement error range, the two values may be considered as being the same as each other. For example, the tolerance margin or measurement error range may be ±20%, ±10%, ±5%, ±1%, and so on.

That is, the touch display device 100 may apply a signal Vtouch_data, which is the same as the touch-driving signal Vtouch applied to the touch electrodes TE, to the data lines DL, or may apply a signal Vtouch_data, which is the same as (substantially the same as) or similar to the touch-driving signal Vtouch in terms of at least one of a frequency, an amplitude (a difference between a high-level voltage and a low-level voltage), and a phase to the data lines DL.

In addition, the touch display device 100 may apply a signal Vtouch_gate, which is the same as the touch-driving signal Vtouch applied to the touch electrodes TE, to the gate lines GL, or may apply a signal Vtouch_gate, which is the same as (substantially the same as) or similar to the touch-driving signal Vtouch in terms of at least one of a frequency, an amplitude (a difference between a high-level voltage and a low-level voltage), and a phase to the gate lines GL.

Figure 3:
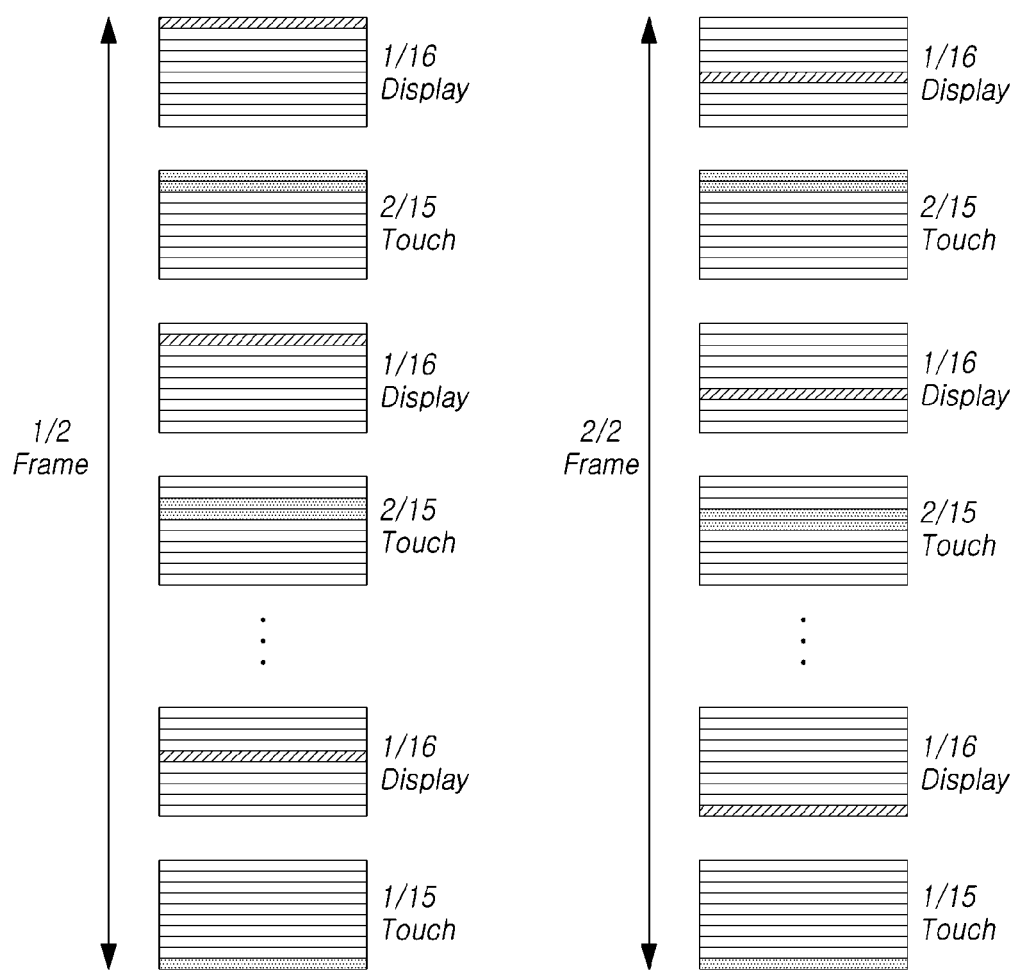
FIG. 3 is a diagram illustrating the concept whereby a plurality of display periods and a plurality of touch periods are performed during one frame period according to an LHB driving method of the touch display device according to embodiments disclosed herein.
Figure 4:
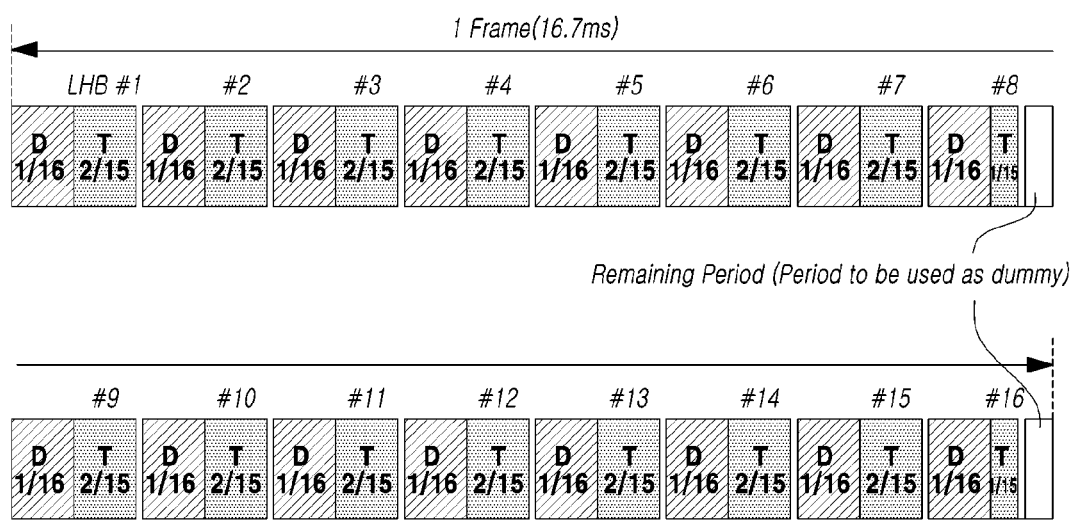
FIG. 4 is a drive timing diagram when a plurality of display periods and a plurality of touch periods are performed during one frame period according to the LHB driving method of the touch display device according to embodiments disclosed herein.

FIG. 3 is a diagram illustrating a concept whereby a plurality of display periods (16 display periods) and a plurality of touch periods (16 touch periods) are performed during one frame period according to a long horizontal blank (LHB) driving method of the touch display device 100 according to the present embodiments. FIG. 4 is a timing diagram in a case in which a plurality of display periods (16 display periods) and a plurality of touch periods (16 touch periods) are performed during one frame period according to the LHB driving method of the touch display device 100 according to the present embodiments.

However, FIGS. 3 and 4 illustrate a case in which the entire screen area is displayed once during one frame period, and touch-sensing for the entire screen area is performed twice. That is, assuming that a display frequency (display refresh rate) is 60 Hz, a touch frequency (touch report rate) is 120 Hz.

Referring to FIGS. 3 and 4, the touch display device 100 according to the present embodiments is a display device in which touch electrodes TE, serving as a touch sensor are embedded in the display panel 110.

In such a touch display device 100, for example, a common electrode (Vcom electrode) may be used as a touch electrode IL.

The touch display device 100 drives the display panel 110 by dividing one frame period (one frame period) into display periods D and touch periods T.

Here, each of the display period D and the touch period T may be repeated once, or twice or more.

According to the examples of FIGS. 3 and 4, one frame period is divided into 16 display periods D, in which display driving is performed, and 16 blank periods (hereinafter, referral to as long horizontal blanks (LHBs) (LHB #1 to LHB #16) in which display driving is not performed. Here, the 16 LHB periods (LHB #1 to LHB #16) may include 16 touch periods T. That is, touch driving is performed in 16 LHB periods (LHB #1 to LHB #16).

In FIGS. 3 and 4, "1/16" means the time length of each display period D in one frame period. In FIGS. 3 and 4, "2/15" and "1/15" mean relative time lengths in each touch period T in one frame period.

Referring to FIG. 4, during one frame period, the length (1/15) of the touch period T in two specific LHBs (LHB #8 and LHB #16) is shorter than the length (2/15) of the touch period T in the other LHBs (the LHBs other than LHB #8 and LHB #16).

Therefore, in the two specific LHBs (LHB #8 and LHB #16), after the touch period T of the length of "1/15" has progressed, the remaining time period of the length of "1/15" may be utilized as various dummy periods.

One or more specific LHBs (e.g., LHB #8 and LHB #16), each including a touch period T having a length (e.g., 1/15) shorter than the length (e.g., 2/15) of touch periods T in the other LHBs, may exist in one frame period.

During the display period, a common voltage (Vcom DC voltage) is applied to a common electrode, a corresponding display data voltage Vdata is applied to a source electrode (or a data line), and a display gate voltage (VGH or VGL) may be applied to a gate electrode (or a gate line).

During the touch period, when the touch-driving signal (touch-driving voltage) is applied to a touch electrode, a signal, which is the same as the touch-driving signal, a signal, which is the same as (substantially the same as) or similar to the touch-driving signal in terms of at least one of a frequency, an amplitude (a voltage difference between a high-level voltage and a low-level voltage), a phase, etc., may be applied to a source electrode and/or a gate electrode (a data line and/or a gate line).

Such voltage application (signal application) is referred to as load-free driving for eliminating or reducing unnecessary parasitic capacitance from the source electrode and/or the gate electrode (the data line and/or the gate line) during the touch period.

As an example of such load-free driving, a touch-driving signal may be equally applied to all the touch electrodes TE, all of the data lines, all of the gate lines, and so on during the touch period.

The examples of FIGS. 3 and 4 correspond to a case in which one frame period is divided into 16 display periods D in which display driving is performed and 16 LHBs (LHB #1 to LHB #16) in which display driving is not performed, touch driving is performed during the 16 LHBs (LHB #1 to LHB #16), and the multiplexers (MUXs) are configured in the first to fifteenth periods. In this case, it is a touch timing diagram in which the display refresh rate is 60 Hz and the touch report rate (the frequency for calculating touch coordinates) is 120 Hz.

The touch display device 100 according to the present embodiments to be described in more detail below is capable of performing multi-pen recognition processing including recognition of the positions of a plurality of active pens (hereinafter, simply referred to as "pens"), and recognition of the pressures, tilts, and the like of the plurality of active pens.

In addition, the touch display device 100 according to the present embodiments may provide a driving method capable of driving a plurality of active pens corresponding to active touch input pointers.

The present embodiments may implement a touch display device 100 capable of performing recognition and touch-sensing of a plurality of active pens, each corresponding to an active touch input pointer, and an active pen interlocked with the touch display device 100.

The present embodiments enable the functions, such as recognition of the positions, pressures (also referred to as "tip pressures," "pen pressures," "writing pressures"), and tilts (also referred to as "inclinations" or "pen tilts") of a plurality of active pens, and processing of pen button inputs, to be implemented by the touch display device 100.

The present embodiments may enable touch-sensing to be performed for a passive touch input pointer (touch object) (e.g., a finger, a general touch pen, or a passive pen) other than an active pen (an active touch input pointer) even when recognition (sensing) is performed for an active pen.

The present exemplary embodiments may provide a driving method and device in which display driving and touch driving are alternately performed in one frame period, and during a touch period, in which the touch driving is performed, and an active pen and a touch object, which is not an active pen (a passive touch input pointer (e.g., a finger or a general touch pen)) are sensed.

The touch display device 100 according to the present embodiments separately includes a period, in which the touch display panel provides touch panel information (e.g., an in-cell touch panel ID) or a status) to an active pen, and the active pen may determine whether or not a touch is performed, and a touch panel state (e.g., a pen-searching mode or a pen mode) based on a beacon signal (control signal).

In the pen-searching mode according to the present embodiments, the touch display device 100 may determine whether or not an active pen exists (e.g., is in communication with the display device 100), the position of the active pen, and the like.

In the pen mode according to the present embodiments, the touch display device 100 may receive the position and various kinds of data (data required for touch-sensing (e.g., a pressure, and various kinds of additional information such as button input information on an active pen) from the active pen, and may be capable of transmitting the position and related data of the active pen added through the full sensing of the entire screen area (all of the touch electrodes).

According to the present embodiments, in a touch display device 100 in which touch electrodes are embedded in a display panel 110 (e.g., an in-cell touch type touch display device that uses common electrodes (Vcom electrodes) as touch electrodes TE), it is possible to provide a driving method and driving device in which a plurality of touch electrodes TE, is driven in a so-called MUX unit (or a MUX channel unit), display driving and touch driving are separately performed in a display period and a touch period, a period for informing the active pen of touch panel information (pen information), a touch panel state, etc. is included in the touch period, and during the touch period, the positions of a plurality of active pens are sensed and pen data (a pen signal) of each of the plurality of active pens is transmitted.

Figure 5:
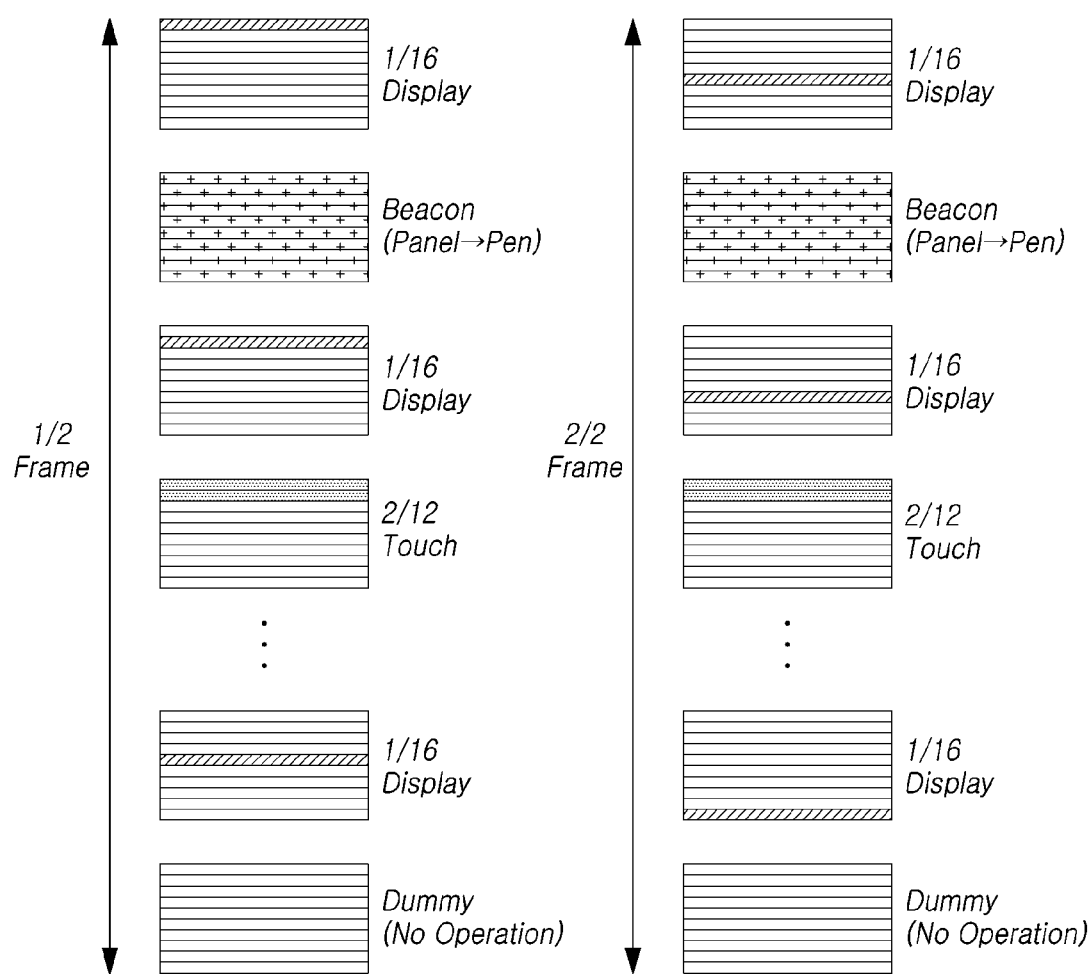
FIG. 5 is a view illustrating the concept of a pen-searching mode of the touch display device according to embodiments disclosed herein.
Figure 6:
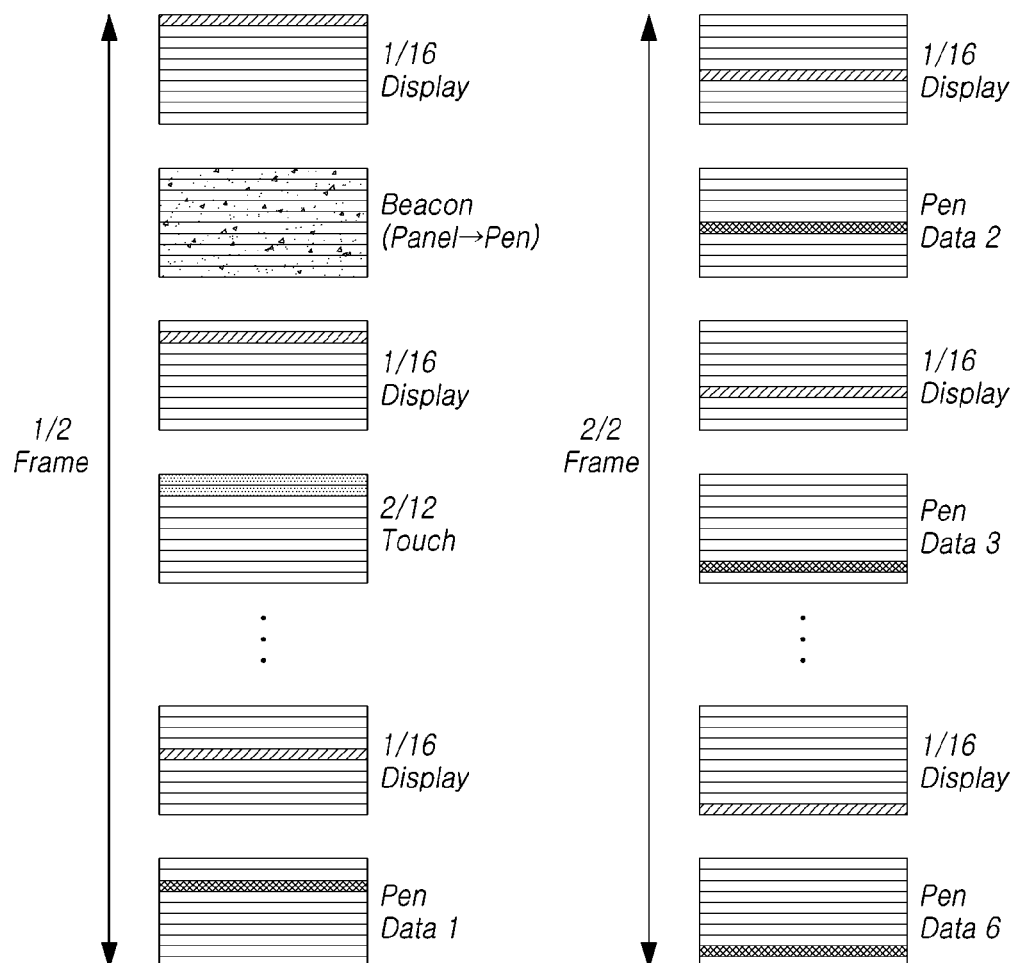
FIG. 6 is a view illustrating the concept of a pen mode of the touch display device according to embodiments disclosed herein.
Figure 7:
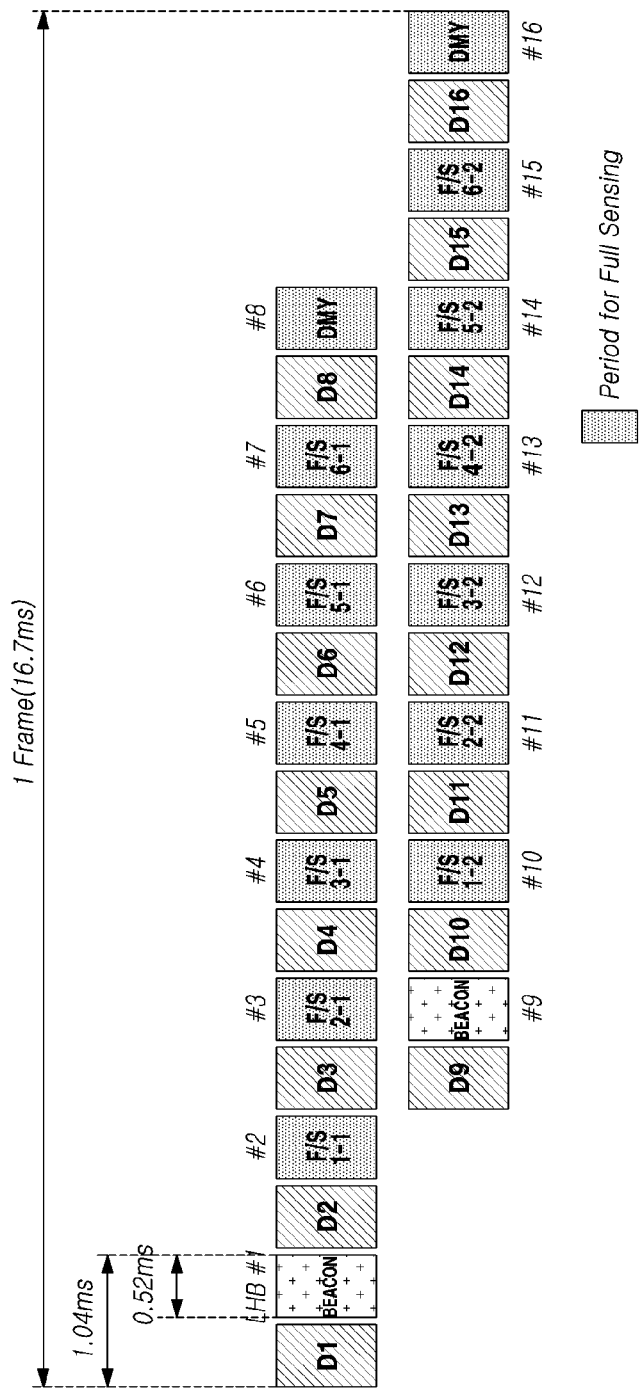
FIG. 7 is a view illustrating a timing diagram of the pen-searching mode of the touch display device according to embodiments disclosed herein.
Figure 8:
FIG. 8 is a view illustrating a timing diagram of the pen mode of the touch display device according to embodiments disclosed herein.

FIG. 5 is a view illustrating the concept of the pen-searching mode of the touch display device 100 according to the present embodiments. FIG. 6 is a view illustrating the concept of the pen mode of the touch display device 100 according to the present embodiments. FIG. 7 is a view illustrating a timing diagram of the pen-searching mode of the touch display device according to the present embodiments; FIG. 8 is a view illustrating the timing diagram of the pen mode of the touch display device 100 according to the present embodiments.

Referring to FIGS. 5 to 8, one frame (frame period) includes 16 display periods in which display driving is performed and 16 LHBs in which display driving is not performed.

Of the 16 LHBs, one or two specific LHBs (e.g., LHB #1 and LHB #9) may be periods in which a beacon signal (also simply referral to as a "beacon") is transmitted and the remaining LHBs may be periods in which the display panel 110 and the active pen are driven and the touch-sensing and the pen-touch sensing (pen recognition) are performed.

Of the 16 LHBs, some LHBs (e.g., LHB #8 and LHB #16) among the remaining LHBs except for the beacon signal transmission periods (e.g., LHB #1 and LHB #9) may be dummy periods DMY in which the display panel 110 and the active pen are not driven. Due to such dummy periods DMY, an effect of reducing power consumption may also be obtained (see FIG. 33).

Here, for example, the dummy periods DMY may be LHBs (e.g., LHB #8 and LHB #16) immediately before the LHBs (e.g., LHB #1 and LHB #9) corresponding to beacon signal transmission periods.

In FIGS. 5 and 6, "$1/16$" means a time length of each display period in one frame period. In FIGS. 5 and 6, "$2/12$" means a relative time length of each touch period in 12 LHBs except for 4 LHBs corresponding to beacon signal transmission periods and dummy periods in one frame period. Referring to FIGS. 7 and 8, in the 16 LHBs included in one frame period, the first sensing of a sensing target area (a full sensing area (entire screen area) or a local sensing area) is performed during the first eight LHBs (LHB #1 to LHB #8) and the second sensing of a sensing target area (the full sensing area (entire screen area) or a local sensing area) is performed during the next eight LHBs (LHB #9 to LHB #16).

In FIG. 7, F/S 1-1, F/S 2-1, F/S 3-1, F/S 4-1, F/S 5-1, and F/S 6-1 are six full sensing periods included in the first sensing period of the sensing target area, and F/S 1-2, F/S 2-2, F/S 3-2, F/S 4-2, F/S 5-2, and F/S 6-2 are six full sensing periods included in the second sensing periods of the sensing target area.

Referring to FIG. 5, the touch display device 100 further includes a period (beacon signal transmission period) for providing touch panel information (for example, an in-cell touch panel ID) to the active pen. However, the display panel 110 may be referral to as a "touch panel" or a "panel," and the active pen may be referral to as a "pen."

The active pen may determine whether or not a touch is performed (e.g., the information on the corresponding panel) and a touch panel status (e.g., an operation mode, such as a pen-searching mode or a pen mode) based on beacon signals.

The beacon signals in the beacon signal transmission period may be output simultaneously through all of the multiplexers, or may be output simultaneously through some multiplexers. Below, the beacon signal may also be simply referral to as a beacon.

In the pen-searching mode, whether or not an active pen exists, the position of the active pen, and the like may be determined.

Here, in the full sensing (F/S) mode, sensing (signal detection) may be sequentially performed through all multiplexers (or all of the channels of all of the multiplexers) so as to determine a finger touch position or a pen position (the position of an active pen).

In the pen mode, the position, tilt, and various kinds of pen data of an active pen, may be received from the active pen, and the position of the existing active pen and the position of an added active pen may be sensed through the full sensing performed in a ½ frame (a half of one frame period).

Here, the various kinds of pen data may include at least one of a writing pressure (pressure), pen button input information, pen identification information (pen ID), and the like.

The secondary position information, pen data, position, and tilt of an active pen may be processed in a so-called local sensing (US) mode, in which sensing can be performed only for a multiplexer where the active pen is located. The configuration of the multiplexer for which such local sensing is performed may be variable.

The pen-searching mode may be an operating mode which may be performed in the case in which no recognized active pen exists and the first active pen can be recognized in the pen-searching mode.

The pen mode may be an operation mode in which various kinds of information about an active pen (e.g., a position, a tilt (inclination of the pen), a writing pressure (pressure), pen button input information, and pen identification (pen ID) information) can be recognized, and an additional active pen may be newly recognized in the pen mode.

A beacon signal in the pen-searching mode and a beacon signal in the pen mode may include the same information or different pieces of information.

Even during the driving of an active pen, finger touch-sensing (i.e., sensing with respect to a passive touch input pointer, such as a finger) may be enabled, and the sensing function of the positions, pressures (also referred to as "tip pressures" or "writing pressures"), tilts (also referred to as "inclinations" or "pen inclinations") of a plurality of active pens (i.e., active touch input pointers), and a button may be enabled.

Figure 9:
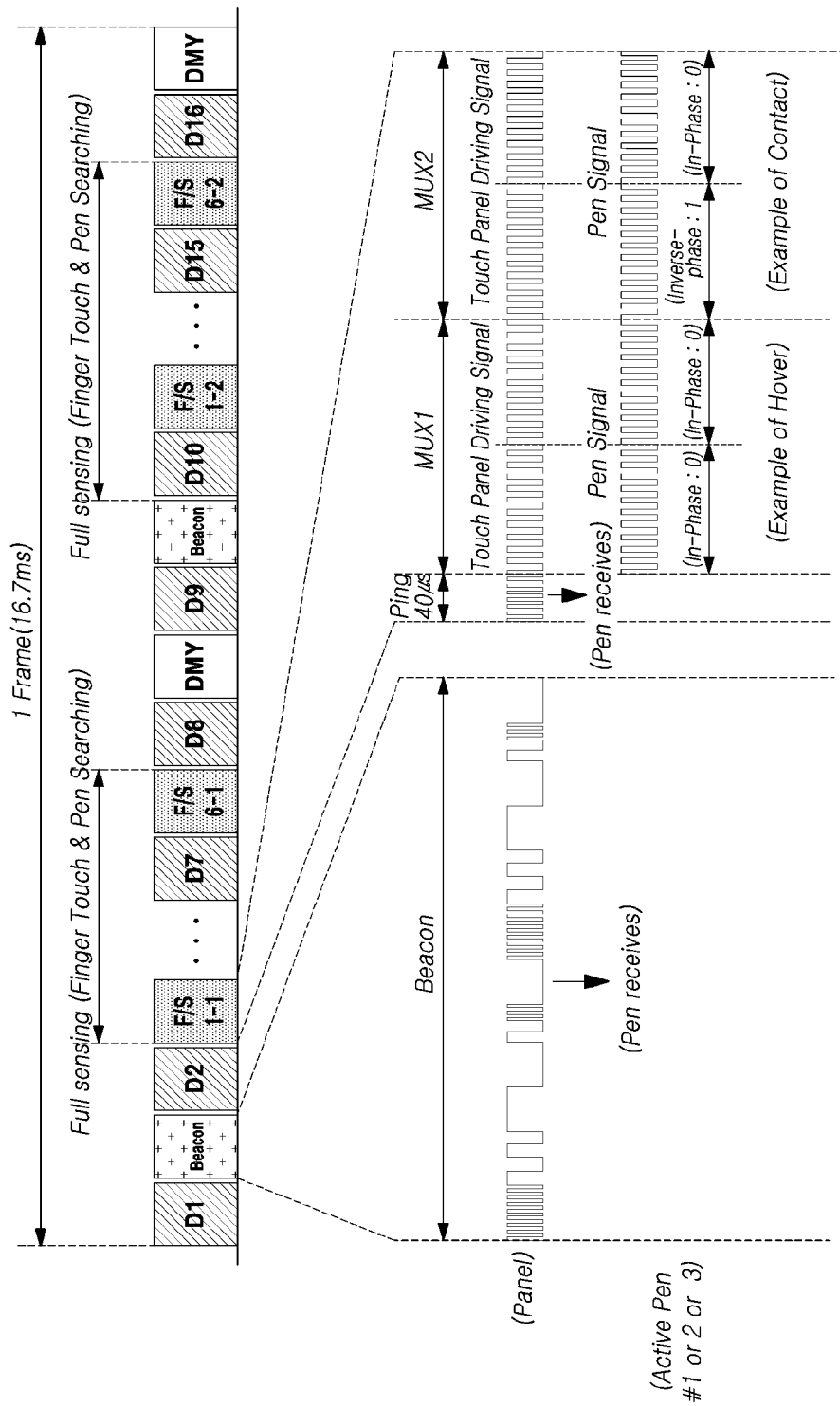
FIG. 9 is a view illustrating a specific timing diagram of a beacon transmission period and a full sensing (F/S) period in the pen-searching mode of the touch display device according to embodiments disclosed herein.
Figure 10:
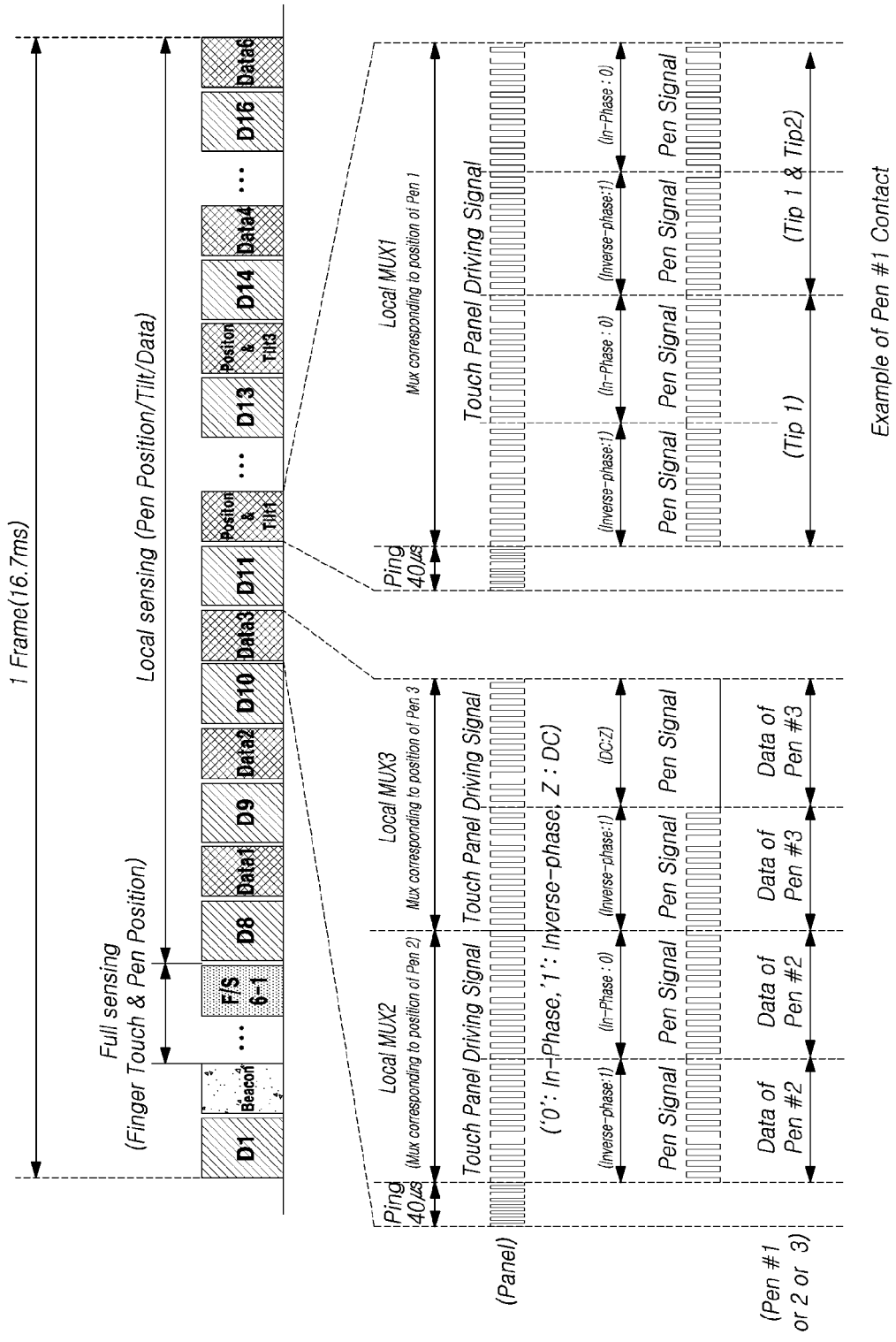
FIG. 10 is a view illustrating a specific timing diagram of a local sensing period in the pen mode of the touch display device according to embodiments disclosed herein.

FIG. 9 is a view illustrating a specific timing diagram of a beacon transmission period and a full sensing (F/S) period in the pen-searching mode of the touch display device 100 according to the embodiments. FIG. 10 is a view illustrating a specific timing diagram of a local sensing period in the pen mode of the touch display device 100 according to the embodiments.

Referring to FIG. 9, in the pen-searching mode, a beacon signal may be transmitted from the touch display device 100 to the active pen in a beacon period (beacon signal transmission period).

As one example, the first LHB (LHB #1) of 16 LHBs, may be utilized as a beacon signal transmission period in one frame period.

As another example, in one frame period, the first LHB (LHB #1) and one or more additional LHBs (e.g., LHB #8, LHB #9, and LHB #10) of 16 LHBs may be utilized as the beacon signal transmission period in one frame period.

Touch panel information (e.g., a touch panel ID, a touch panel state, and a driving frequency (LFD frequency)) may be transmitted through a beacon signal, for which a communication method of a spread spectrum or the like may be used.

Here, the spread spectrum communication method may include, for example, a direct sequence spread spectrum (DSSS), a frequency hopping spread spectrum (FHSS), and the like.

For a predetermined length of time in each touch period, in which sensing is performed during a period other than the beacon period (beacon signal transmission period), a separate signal (hereinafter, referred to as a "ping signal" or a "ping") for synchronizing a driving signal (touch panel driving signal) for driving a touch panel TSP embedded in a display panel 110 and a driving signal of an active pen (pen signal) may be generated in the touch panel TSP, and the active pen may receive the ping signal (also simply referred to as a "ping") and may generate and emit (output) a pen signal synchronized with the driving signal for driving the touch panel TSP.

After receiving the ping signal, the active pen may generate a pen signal synchronized with the driving frequency of the touch panel (TSP).

The pen signal may have the same frequency as the driving signal (touch panel driving signal) for driving the touch panel and may have a normal-phase (0-degree) relationship with the driving signal (touch panel driving signal), or may be an AC signal having the same frequency as the driving signal (touch panel driving signal) for driving the touch panel and having an inverse-phase (180-degree) relationship with the driving signal (touch panel driving signal) or a DC signal having a predetermined DC voltage.

As one example, as illustrated in FIGS. 9 and 10, a pen signal for sensing the position and/or tilt of an active pen in connection with full sensing or local sensing may include one or both of a signal period (0), which is composed of pulses having the same frequency as the touch panel driving signal and having a normal-phase relationship with the touch panel driving signal, and a signal period (1), which is composed of pulses having the same frequency as the touch panel driving signal and having an inverse-phase relationship with the touch panel driving signal.

As another example, as illustrated in FIG. 10, a pen signal (pen data) for transmitting various kinds of additional information on an active pen (e.g., a pressure and button information) may include one, two, or three of (0) a signal period composed of pulses having the same frequency as the touch panel driving signal and having a normal-phase relationship with the touch panel driving signal, (1) a signal period composed of pulses having the same frequency as the touch panel driving signal and having an inverse-phase relationship with the touch panel driving signal, and (Z) a signal period having a predetermined DC voltage.

When the pen signal is an AC signal, the pen signal may be in the form of, for example, phase shift keying (PSK) or differential phase shift keying (D-PSK).

An active pen may be capable of performing coding by a method of varying a phase depending on a hover (non-contact) state or a contact state (e.g., PSK or D-PSK).

Referring to FIG. 10, in the pen mode, a beacon signal is transmitted from the touch panel TSP to the active pen in the beacon period (beacon signal transmission period).

Through the beacon signal, touch panel information (e.g., a touch panel ID, a touch panel status, and a driving frequency (LFD frequency)) may be transmitted.

The beacon signal of the pen mode may be a signal which is the same type as the beacon signal of the pen-searching mode or a signal in which the touch panel information (e.g., a status) is expressed differently. For example, the beacon signal of the pen mode may be in the form of a spread spectrum signal, such as a direct sequence spread spectrum (DSSS).

During a predetermined length of time in each touch period, in which sensing is performed in a period other than the beacon signal transmission period, a separate ping signal for synchronizing a touch panel driving signal for driving the touch panel TSP and a driving signal (pen signal) of an active pen may be generated in the touch panel TSP, and the active pen may perform signal synchronization by receiving the ping signal.

After receiving the ping signal, the active pen may generate a pen signal synchronized with the driving frequency of the touch panel (TSP).

The pen signal may have the same frequency as the driving signal (touch panel driving signal) for driving the touch panel and may have a normal-phase (0-degree) relationship with the driving signal (touch panel driving signal), or may be an AC signal having the same frequency as the driving signal (touch panel driving signal) for driving the touch panel and having an inverse-phase (180-degree) relationship with the driving signal (touch panel driving signal) or a DC signal having a predetermined DC voltage.

As one example, a pen signal for sensing the position and/or tilt of an active pen in connection with full sensing or local sensing may include one or both of (0) a signal period composed of pulses having the same frequency as the touch panel driving signal and having a normal-phase relationship with the touch panel driving signal, and (1) a signal period composed of pulses having the same frequency as the touch panel driving signal and having an inverse-phase relationship with the touch panel driving signal.

As another example, a pen signal (pen data) for transmitting various kinds of additional information on an active pen (e.g., a pressure and button information) may include one, two, or three of a signal period (0), which is composed of pulses having the same frequency as the touch panel driving signal and having a normal-phase relationship with the touch panel driving signal, a signal period (1), which is composed of pulses having the same frequency as the touch panel driving signal and having an inverse-phase relationship with the touch panel driving signal, and a signal period (Z), which has a predetermined DC voltage.

The pen signal may be an AC signal in the form of, for example, PSK or D-PSK, or a DC signal having a predetermined DC voltage.

The position of an active pen is firstly calculated in the full sensing period and then a secondary position and pen data (a pressure, a tilt, and various kinds of additional information) are obtained through local sensing that perform sensing only for a partial area, so that the pen position and pen data (a pressure, a tilt, and various kinds of additional information) may be sensed.

The number of sensing lines (the number of touch electrode rows or the number of touch electrode columns) performing local sensing is variable and may be changed every LHB.

An active pen may be capable of performing coding by a method of varying a phase depending on a hover (non-contact) state or a contact state (e.g., PSK or D-PSK).

In the case of the contact method, a plurality of tips (also referral to as "pen tips") may be formed in an active pen, and a pen position, tilt information, and the like may be transmitted to the touch panel TSP by causing the output signal generating timing of respective tips to vary according to time.

Pen data corresponding to other pen signals that are not associated with a pen position and a tilt are transmitted from the active pen to the touch panel (TSP) in a separately allocated time.

The pen data may include one, two or three of (0) a signal period composed of pulses having the same frequency as the touch panel driving signal and having a normal-phase relationship with the touch panel driving signal, (1) a signal period composed pulses having the same frequency as the touch panel driving signal and having a reverse phase relationship with the touch panel driving signal, and (Z) a signal period having a constant DC voltage.

The pen data may be in the form of a signal of, for example, PSK or D-PSK in a signal period (0, 1) in which the pen data is in the form of an AC signal.

The pen data may include at least one piece of additional information, such as a pressure (writing pressure) of a pen tip, pen button input information, and pen identification information (ID).

The above-mentioned writing pressure information need not be transmitted every frame.

Information, which may be included in the pen data, may be transmitted in a predetermined order between an active pen and the touch display device 100 (panel).

Figure 11:
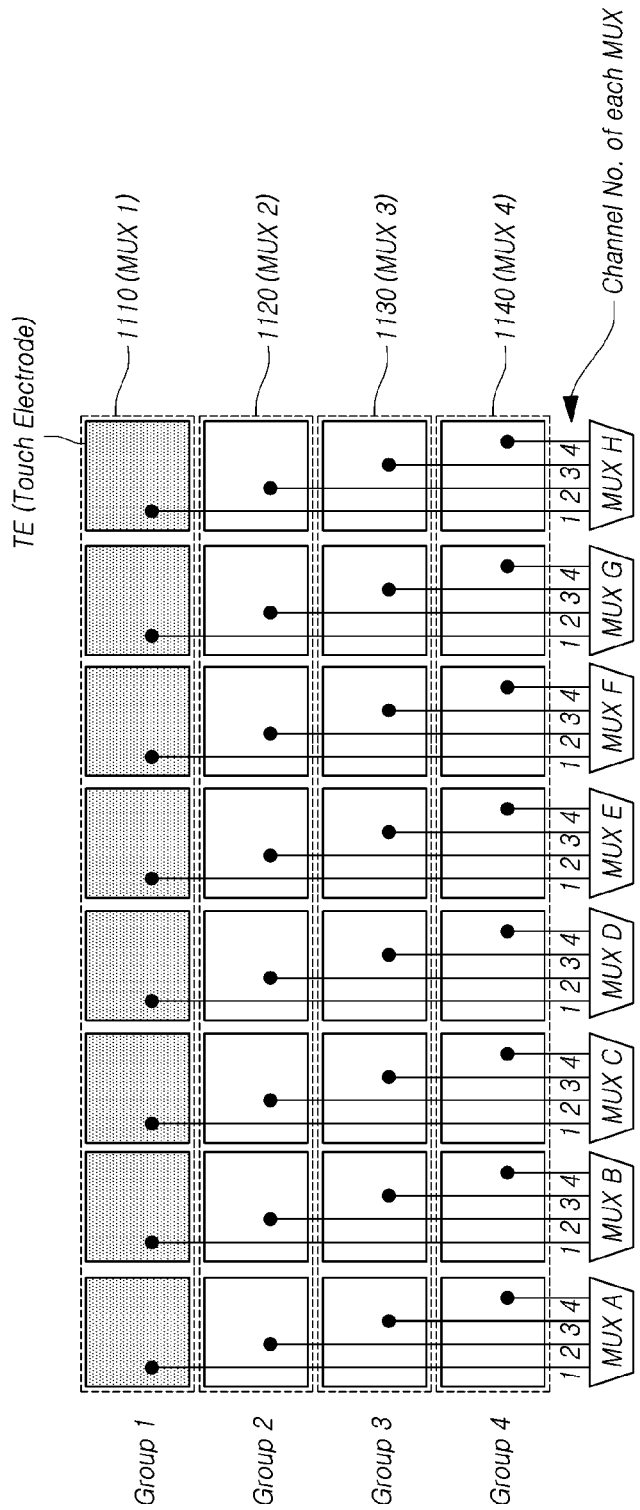
FIG. 11 is a view for explaining a multiplexer driving method of the touch display device according to embodiments disclosed herein.

FIG. 11 is a view for explaining a multiplexer driving method of the touch display device 100 according to the present embodiments.

Referring to FIG. 11, it is assumed that a multiplexer circuit includes eight multiplexers MUX A, MUX B, MUX C, MUX D, MUX E, MUX F, MUX G, and MUX H.

Each of the MUX A, MUX B, MUX C, MUX D, MUX E, MUX F, MUX G and MUX H has four channels (1, 2, 3, and 4). (1, 2, 3, 4 are the channel numbers of respective MUXs).

Referring to FIG. 11, for example, a plurality of touch electrodes TE may be grouped into a plurality of groups (Group 1, Group 2, Group 3, and Group 4).

Group 1 1110 may correspond to touch electrodes (touch electrodes sensed in the MUX 1 driving period) sensed by a driving signal output through channel 1 of each multiplexer.

Group 2 1120 may correspond to touch electrodes (touch electrodes sensed in the MUX 2 driving period) that are sensed by a driving signal output through channel 2 of each multiplexer.

Group 3 1130 may correspond to touch electrodes (touch electrodes sensed in the MUX 3 driving period) sensed by a driving signal output through channel 3 of each multiplexer.

Group 4 1140 may correspond to touch electrodes (touch electrodes sensed in the MUX 4 driving period) that are sensed by a driving signal output through channel 4 of each multiplexer.

When the touch electrodes are sensed, the other channels of each multiplexer may output an LFD driving signal that is similar to or the same or substantially the same as a touch-driving signal (also referred to as a "touch panel driving signal" or "driving signal").

Here, the term "substantially the same" means that when two values are not completely the same as each other, but the difference between the two values is within a predetermined tolerance margin or a measurement error range, the two values may be considered as being the same as each other. For example, the tolerance margin or measurement error range may be ±20%, ±10%, ±5%, ±1%, and so on.

The LFD driving signal is a signal to be applied to peripheral electrodes in order to reduce parasitic capacitance between the touch electrodes to be sensed and peripheral electrodes (e.g., data lines and gate lines).

Meanwhile, when the touch-driving signal (touch panel driving signal) applied to the touch electrodes and the LFD driving signal applied to the other electrodes (e.g., data lines and gate lines) are the same during the touch period, all of the signals (including the touch-driving signal) applied to the touch panel TSP during the touch period may be referred to as LFD driving signals.

Figure 12:
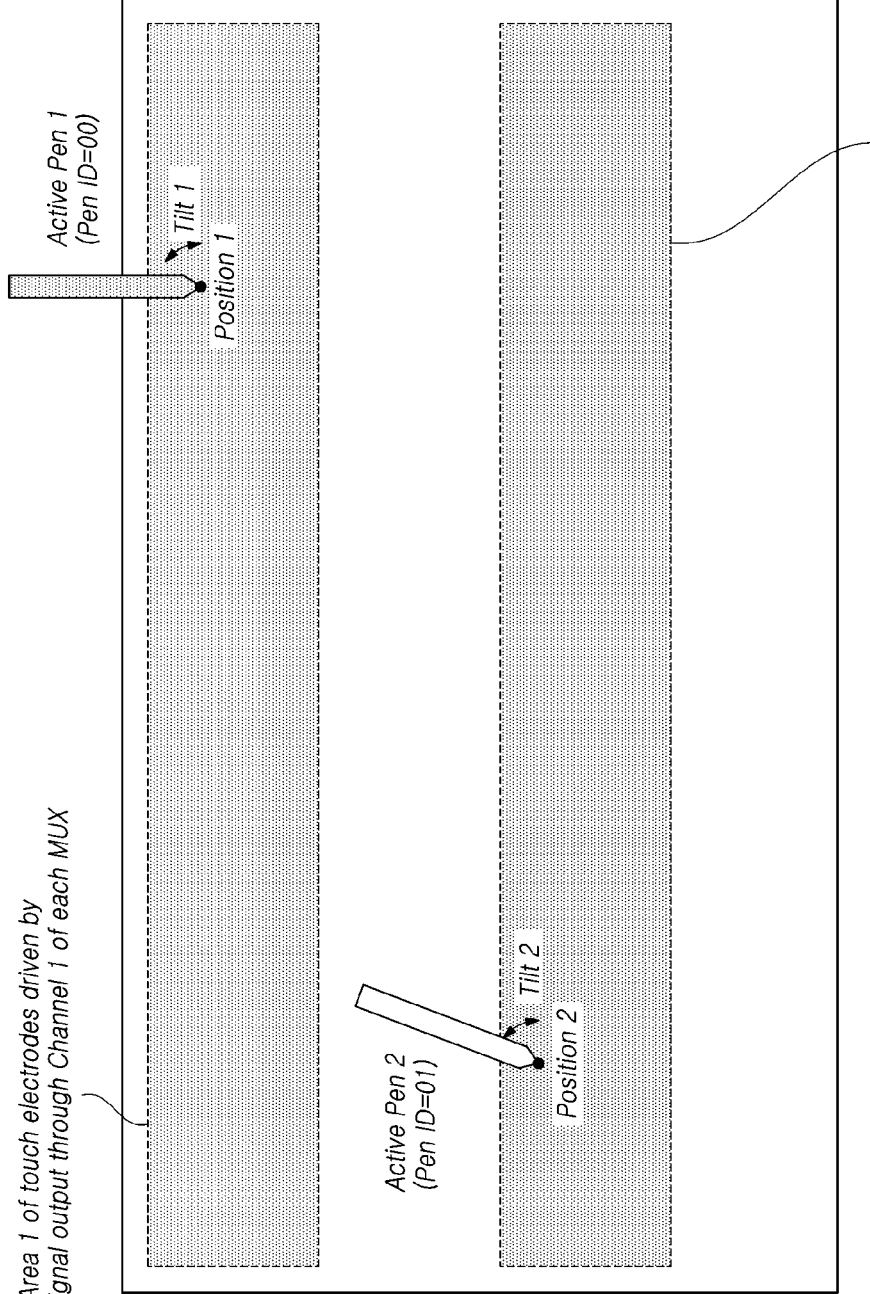
FIG. 12 is a view illustrating a multi-pen recognition situation of the touch display device according to embodiments disclosed herein.

FIG. 12 is a view illustrating a multi-pen recognition situation of the touch display device 100 according to the present embodiments.

Referring to FIG. 12, the area 1 of the touch electrodes driven by a driving signal output through the channel 1 of each multiplexer and the area 3 of the touch electrodes driven by a driving signal output through the channel 3 of each multiplexer are local sensing areas, which may be the same as or different from each other depending on the pen position.

Even if these areas 1 and 3 are the same, a pen ID or the like may be required in order to accurately distinguish the areas 1 and 3.

Figure 13:
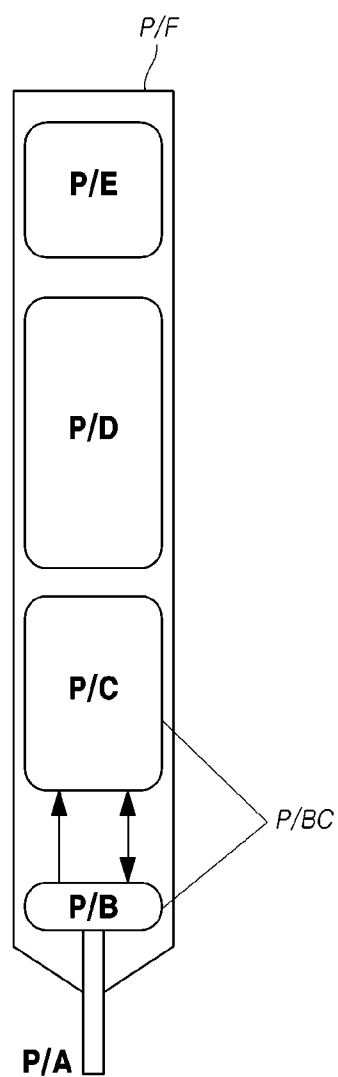
FIG. 13 is a view illustrating an active pen interlocked with the touch display device according to embodiments disclosed herein.
Figure 14:
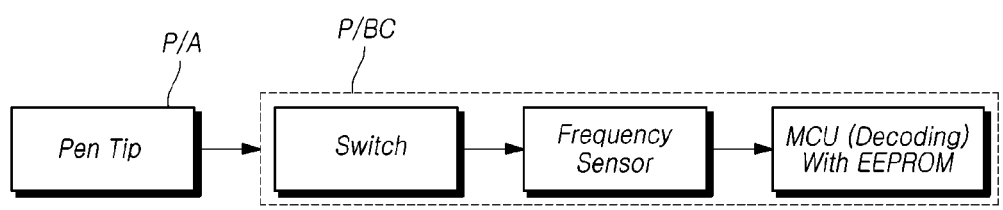
FIG. 14 is a view illustrating an example of reception of a beacon signal and a ping signal by the active pen interlocked with the touch display device according to embodiments disclosed herein.
Figure 15:
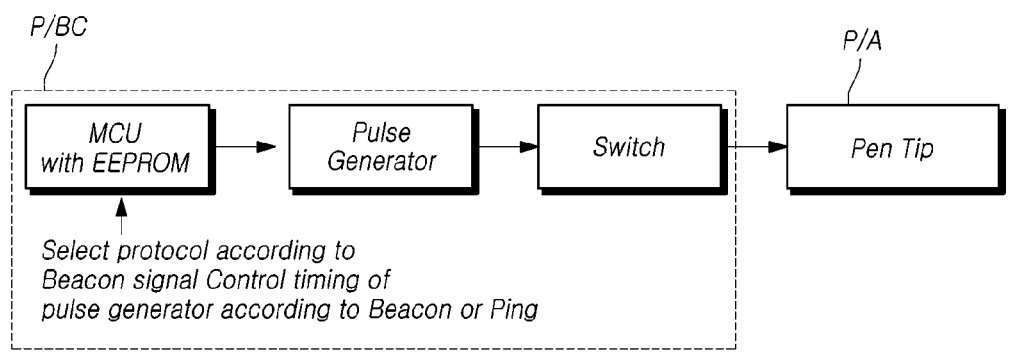
FIG. 15 is a view illustrating an example of transmission of a position, tilt, and data signal from the active pen interlocked with the touch display device according to embodiments disclosed herein.

FIG. 13 is a view illustrating an active pen interlocked with the touch display device 100 according to the present embodiments. FIG. 14 is a view illustrating an example of receiving a beacon signal and a ping signal by the active pen interlocked with the touch display device 100 according to the present embodiments. FIG. 15 is a view illustrating an example of transmitting pen signals, such as a position, a tilt, and a pen data signal, from the active pen interlocked with the touch display device 100 according to the present embodiments.

Referring to FIG. 13, in the active pen, P/A is a pen tip portion, which may be constituted by two or more portions that receive or transmit an electric field.

Two or more pen tips P/A may be spaced apart from each other by a predetermined distance.

A value for the distance between the two or more pen tips P/A may be included in pen data and may be provided to the touch display device 100.

The distance between the two or more pen tips P/A is used to calculate the tilt of the active pen. Therefore, it is possible to calculate the pen tilt by intentionally designing the distance between two or more pen tips P/A.

P/B is a portion for sensing the pressure of the pen tip, which may be constituted by, for example, a pressure sensor (e.g., an MEMS) and an amplifier Amp.

P/C may include a reception stage configured to sense the frequency of the electric field received from the pen tip P/A, a transmission stage configured to generate a signal synchronized with the touch panel TSP, a micro control unit (MCU) configured to receive a signal from the reception stage to identify a touch panel ID, to generate a communication protocol suitable for the touch panel ID, to control the timing of the transmission stage, to receive information on a pressure signal from the P/B to generate information thereon, and to control other button signals, and a circuit unit composed of a unit excluding a separate communication unit (e.g., Bluetooth).

The P/B or P/C may include a switch configured to perform a switching operation with two or more pen tips, a frequency sensor configured to sense the frequency of an electric field (signal) received through the touch panel TSP, a pulse generator configured to generate pulses corresponding to the pen signal, and the like.

Here, the frequency sensor may be implemented by, for example, a comparator or the like, and may include an amplifier. The pulse generator may include an amplifier.

The MCU may select the protocol according to a beacon signal, and may control a pulse generation timing according to the beacon signal or a ping signal.

The combination of PB and P/C is called a processing unit P/BC.

P/D is battery unit.

P/E is a portion including peripheral devices, such as a button and a Bluetooth unit.

P/F is a pen body.

Figure 16:
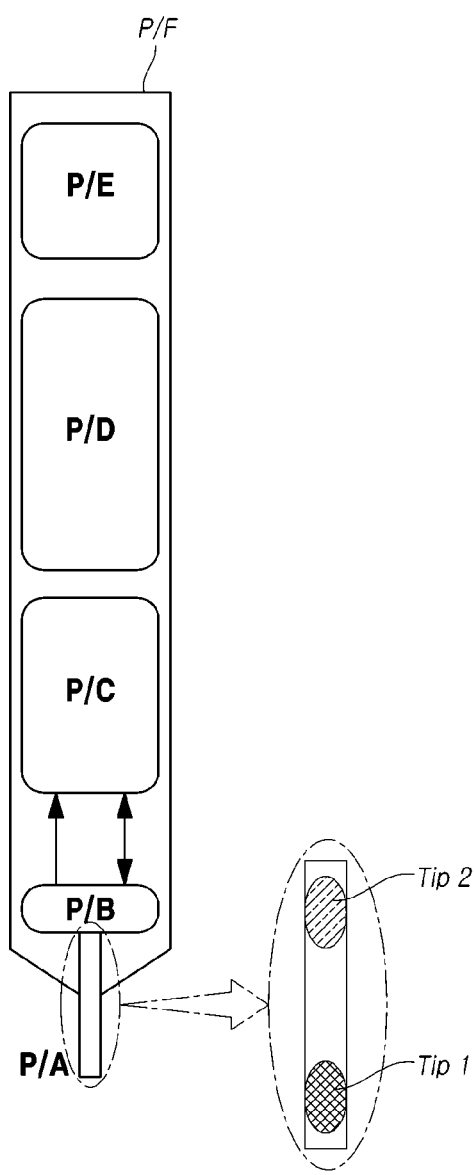
FIG. 16 is a view illustrating two pen tips in the active pen interlocked with the touch display device according to embodiments disclosed herein.
Figure 17:
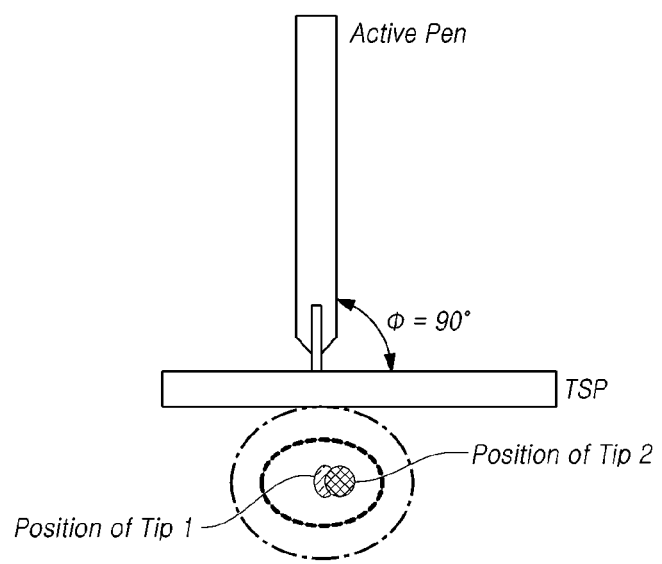
FIGS. 17 and 18 are views illustrating two tilting situations of the active pen interlocked with the touch display device according to embodiments disclosed herein.
Figure 18:
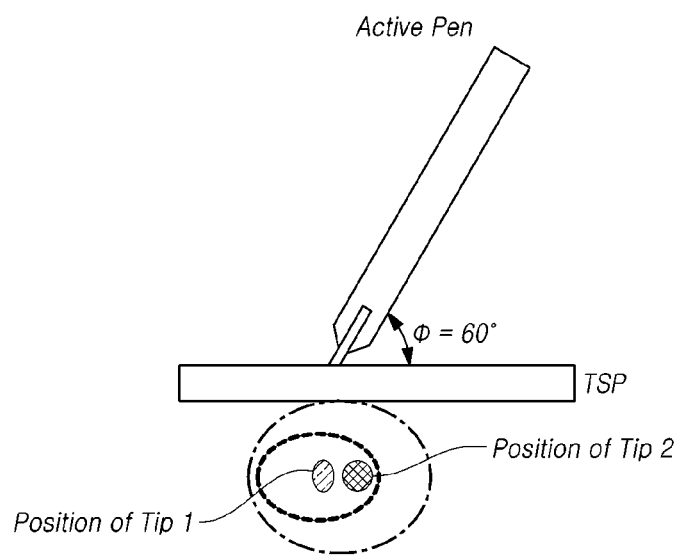

FIG. 16 is a view illustrating two pen tips in the active pen interlocked with the touch display device 100 according to the present embodiments. FIGS. 17 and 18 are views illustrating two tilting situations of the active pen interlocked with the touch display device 100 according to the present embodiments.

Referring to FIG. 16, the active pen has two pen tips (tip 1 and tip 2), which are capable of transmitting separate signal pulses (pen signals), respectively.

A touch circuit TC including a touch-driving circuit ROIC and a touch controller TCR may calculate the center of each of the tips 1 and 2 using the signal pulses (pen signals) received through the touch panel TSP, and may calculate the angle (tilt) of the corresponding active pen using the distance between the respective centers. In the following, the center of tip 1 is regarded as the position of tip 1, and the center of tip 2 is regarded as the position of tip 2.

Referring to FIG. 17, when the angle (tilt angle) between the active pen and the touch panel TSP is 90 degrees, the positions of two respective tips in the active pen in the touch panel TSP (i.e., the position of tip 1 and the position of tip 2) may coincide or substantially coincide with each other.

In this case, the cosine value of the tilt angle, cos θ, may be obtained as follows.

Cos θ=(difference between the positions of tip 1 and tip 2 on the touch panel)/(distance between tip 1 and tip 2 in the active pen)≈0

Therefore, the tilt angle, θ, becomes 90 degrees.

Referring to FIG. 18, when the angle (tilt angle) between the active pen and the touch panel TSP is 60 degrees, the position of tip 1 and the position of the 2 on the touch panel TSP do not coincide with each other.

In this case, the cosine value of the tilt angle may be obtained as follows.

Cos θ=(difference between the positions of tips 1 and 2 on the touch panel)/(distance between tips 1 and 2 in the active pen)≈0.5

Therefore, the tilt angle, θ, becomes 60 degrees.

Meanwhile, a pen ID may be allocated as follows.

For example, pen data of a predetermined number of bits may be allocated to every frame. In addition, the order of active pens may be designated through the beacon signal. The touch circuit TC may perform pen ID tracking based on the pen signal received via the touch panel TSP.

For example, in the case of representing the pen IDs of four active pens including active pen A, active pen B, active pen C, and active pen D by bit strings composed of two bits making the pen IDs, including the pen IDs in data, transmitting the data to the touch display device 100, a pen ID represented by a bit string corresponding to 00 may be assigned to active pen A and a pen ID represented by a bit string corresponding to 01 may be assigned to active pen B, a pen ID represented by a bit string corresponding to 10 may be assigned active pen C, and a pen ID expressed by a bit string corresponding to 11 may be assigned to active pen D.

The pen ID, which is assigned to each of the four active pens, is included in the data and transmitted to the touch display device 100, and the touch display device 100 may identify the active pen by confirming the pen ID included in the received data.

Each active pen may transmit information about the pen ID thereof by including the pen ID in data every time the active pen transmits data (pen data) to the touch display device 100, or may transmit the pen ID by including the pen ID in data to be transmitted with a predetermined period.

Further, each active pen may increase the period of transmitting the pen ID thereof or may not transmit the pen ID in the case where other active pens are located in a remote area.

As another example, the touch circuit TC may be capable of performing pen ID tracking via Bluetooth. That is, an active pen may transmit its own pen ID via Bluetooth, and the touch circuit TC may receive the pen ID from the active pen and may perform pen ID tracking.

On the other hand, descriptions will be made with reference to a pen pressure as an example. Assuming that the pen pressure (writing pressure) is represented by 9 bits and that the number of bits that are assigned to pen pressure in each frame is 3 bits, the pen pressure may be transmitted across 3 frames.

For example, when the display driving frequency is 60 Hz, the rate (frequency) for recognizing the pen pressure is 20 Hz (=60/3).

Hereinafter, the touch system, touch display device, active pen, touch circuit, driving method, and pen recognition method according to the above-described embodiments will be described again with specific examples.

Prior to the detailed description, the touch system, touch display device, active pen, and touch circuit according to the above-described embodiments will be briefly described again.

As described above, the touch system according to the present embodiments includes a touch display device 100, at least one active pen, and the like.

The touch display device 100 according to the present embodiments may include a touch panel TSP on which a plurality of touch electrodes TE is arranged, a touch circuit TC configured to sense a touch made by a finger or to perform sensing processing for sensing a pen touch made by at least one active pen, and the like.

The sensing processing performed by the touch circuit TC may means supplying a driving signal (also referral to as a touch-driving signal, a touch panel driving signal, or the like) to the touch panel TSP, and to sense a touch made by a finger or to sense a pen touch made by the at least one active pen based on the driving signal received through the touch panel TSP in response to the driving signal.

When the touch circuit TC supplies the driving signal to the touch panel TSP, the driving signal supplied to the touch panel TSP is transmitted to the active pen that touches the touch panel TSP or is located near the touch panel TSP.

The touch panel TSP in the touch display device 100 according to the present embodiments means a plurality of touch electrodes TE, and may exist separately outside the display panel 110. However, the touch panel TSP may be embedded in the display panel 110.

The touch circuit TC included in the touch display device 100 according to the present embodiments may include a first circuit ROIC configured to supply a driving signal to the display panel 110 on which a plurality of touch electrodes TE is arranged, and to detect a signal generated in response to the driving signal through the display panel 110, a second circuit TCR configured to sense a touch made by a finger or a pen touch made by the active pen based on the signal detected by the first circuit ROIC, and the like.

The active pen according to the present embodiments may include two or more pen tips P/A, which are in contact with or not in contact with the display panel 110 of the touch display device 100, and a processing unit PBC) configured to sense a pressure (writing pressure or pen pressure) through at least one of the two or more pen tips P/A, to receive a driving signal applied to the display panel 110 through at least one of the two or more pen tips P/A, and to generate a pen signal on the display panel 110 through at least one of the two or more pen tips P/A.

A touch system driving method and a pen recognition method according to the present embodiments are based on blank driving.

In the touch display device 100, one frame period may include at least one display period D for display driving required for displaying an image, and at least one blank period, in which no display driving is performed.

The display period D and the blank period are repeated.

The blank period is a period, in which there is no driving for displaying an image, and exists between two display periods D. Here, the driving for displaying an image may include processing of supplying a data voltage (Vdata) to a data line, processing of supplying a scan signal to a gate line, and the like.

In such a blank period, the sensing processing may be performed.

That is, in the blank period, sensing processing for sensing a touch made by a finger or sensing a pen touch made by one or more active pens may be performed based on a signal received through the touch panel TSP by driving the touch panel TSP.

Meanwhile, in the touch display device 100, one frame period may include two or more display periods D and two or more blank periods.

That is, in one frame period, the display period D and the blank period may be repeated two or more times.

As described above, when two or more blank periods are included in one frame period, each blank period will be referred to as an "LHB."

Two or more LHBs existing in one frame period may be used as a period for touch sensing and/or pen-touch sensing.

Figure 19:
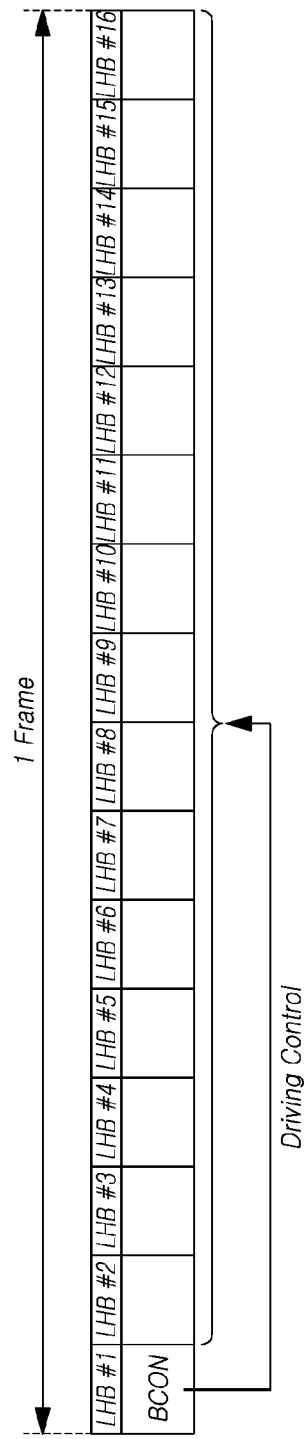
FIGS. 19 and 20 are views illustrating LHB driving control using a beacon signal in the touch system according to embodiments disclosed herein.
Figure 20:
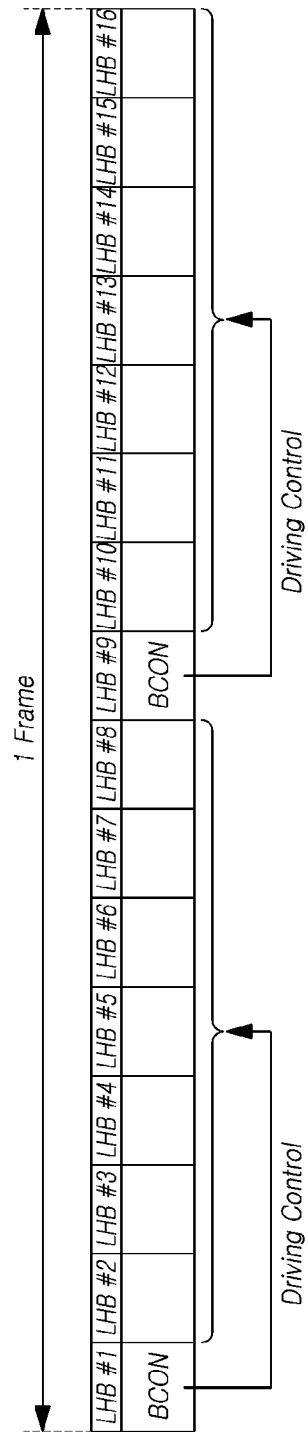
Figure 21:
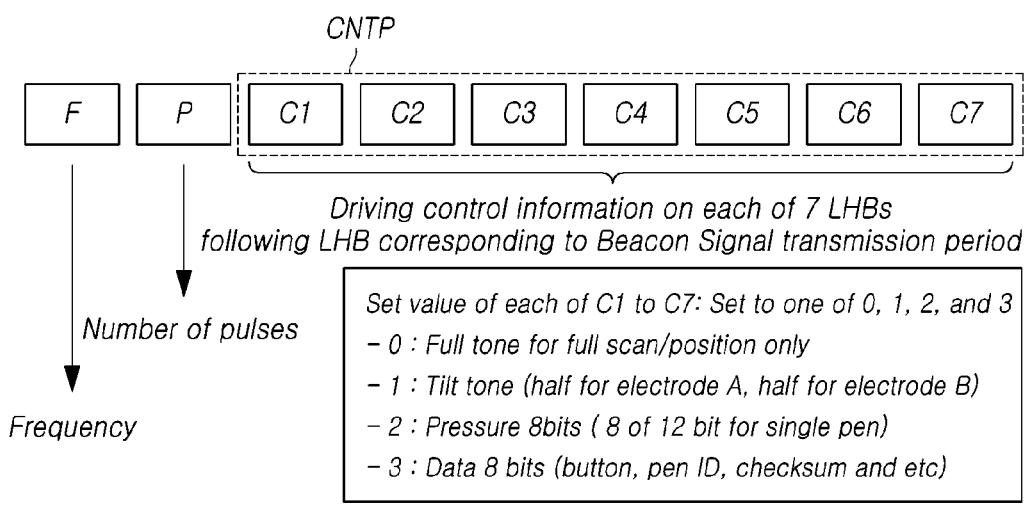
FIG. 21 is a view exemplifying a format of a beacon signal in the touch system according to embodiments disclosed herein.

FIGS. 19 and 20 are views illustrating LHB driving control using a beacon signal in the touch system according to the present embodiments, and FIG. 21 is a view exemplifying a format of the beacon signal BCON in the touch system according to the present embodiments.

FIGS. 19 and 20 illustrate only 16 LHBs (LHB #1 to LHB #16) for separating 16 display periods D in the case where one frame period includes 16 display periods D, in which display driving is performed and 16 LHBs LHB #1 to LHB #16, as illustrated in FIG. 4.

The beacon signal BCON is supplied from the touch circuit TC to the touch panel TSP. The active pen may receive the beacon signal BCON supplied to the touch panel TSP through the pen tip P/A.

As illustrated in FIG. 19, in the plurality of LHBs (LHB #1 to LHB #16) in one frame period, only one LHB (LHB #1) may exist, through which the beacon signal BCON is transmitted from the touch panel TSP to the active pen.

As illustrated in FIG. 20, in the plurality of LHBs (LHB #1 to LHB #16) in one frame period, two or more LHBs (LHB #1 and LHB #9) may exist, through which the beacon signal BCON is transmitted from the touch panel TSP to the active pen.

Referring to the example of FIG. 20, sixteen LHBs (LHB #1 to LHB #16) in one frame period may include a first LHB (LHB #1) and a second LHB (LHB #9) through which a beacon signal BCON is transmitted from the touch panel TSP to at least one active pen. That is, the first LHB (LHB #1) and the second LHB (LHB #9) corresponding to the beacon signal transmission period are included in one frame period.

The beacon signal BCON transmitted from the first LHB (LHB #1) to the at least one active pen may include information for controlling driving for sensing a pen touch made by at least one active pen during one or more LHBs (LHB #2 to LHB #8) existing between the first LHB (LHB #1) and the second LHB (LHB #9).

The information included in the beacon signal BCON may include touch panel information (which may be display panel information when the touch panel is embedded in the display panel), driving control information, and the like.

According to the above description, the active pen interlocked with the touch display device 100 may be informed, through the beacon signal BCON, of how to perform the driving in one or more LHBs after the LHB (LHB #1) through which the beacon signal BCON is transmitted and the active pen may perform the driving corresponding to the driving of the touch display device 100 based on the beacon signal BCON. Accordingly, correct pen recognition (pen-touch sensing) can be performed.

As illustrated in FIG. 20, when two or more LHBs (LHB #1 and LHB #9) corresponding to a beacon signal transmission period are included in one frame period, the amount of information carried in the beacon signal BCON may be reduced. This may reduce the processing burden of the touch circuit TC generating the beacon signal BCON and the processing burden of the active pen receiving and reading the beacon signal BCON.

Referring to FIG. 20, the operation mode of the active pen may be changed during one or more LHBs (LHB #2 to LHB #8) existing between a first LHB (LHB #1) and a second LHB (LHB #9) according to the beacon signal BCON transmitted from the first LHB (LHB #1).

Here, the operation mode of the active pen may be a pen-searching mode, a pen mode, and the like associated with pen searching, detailed pen information recognition, additional pen searching, etc., and a full sensing mode, a local sensing mode, and the like associated with a sensing area, and may also be a full-tone mode, a tilt-tone mode, and the like associated with the kind of a pen signal or pen recognition information output from the active pen.

According to the above description, the touch display device 100 and the active pen may share the operation mode through the beacon signal BCON, thereby accurately performing an operation suitable for the corresponding operation mode. Accordingly, the touch display device 100 and the active pen may perform the pen recognition driving operation through a correct interlocking operation.

Referring to FIG. 20, the frequency of a pen signal (an AC signal including a plurality of pulses) output from the active pen during one or more LHBs (LHB #2 to LHB #8) existing between a first LHB (LHB #1) and a second LHB (LHB #9) may be changed according to the beacon signal BCON transmitted from the first LHB (LHB #1).

Thus, the active pen is able to generate a pen signal having a frequency at which the touch circuit TC is able to perform signal detection and signal processing. Accordingly, the touch circuit TC is able to correctly receive and recognize the pen signal having the frequency to be recognized and processed by itself through the touch panel TSP, and thus the touch circuit TC is able to perform accurate pen recognition.

Referring to FIG. 20, the number of pulses of the pen signal output from the active pen during one or more LHBs (LHB #2 to LHB #8) existing between a first LHB (LHB #1) and a second LHB (LHB #9) may be changed according to the beacon signal BCON transmitted from the first LHB (LHB #1).

Thus, the active pen is able to generate a pen signal having pulses based on the number of which the touch circuit TC is able to perform signal detection and signal processing. Accordingly, the touch circuit TC is able to correctly receive and recognize the pen signal having the number of pulses to be recognized and processed by itself through the touch panel TSP, and thus the touch circuit TC is able to perform accurate pen recognition.

Referring to FIG. 20, the number of one or more LHBs (LHB #2 to LHB #8) existing between a first LHB (LHB #1) and a second LHB (LHB #9) may be changed according to the beacon signal BCON transmitted from the first LHB (LHB #1).

Accordingly, the active pen is able to accurately know how long the driving operation according to the driving control information learned through the beacon signal BCON is to be performed, so that the active pen is able to correctly perform the interlocking operation with the touch display device 100.

For the driving control through the above-described beacon signal BCON, the beacon signal BCON may be formed in the format illustrated in FIG. 21.

FIG. 21 is a format of a beacon signal BCON for the example of FIG. 20. That is, the format is a format of a beacon signal BCON in the case where 7 LHBs (LHB #2, LHB #3, LHB #4, LHB #5, LHB #6, LHB #7, and LHB #8) exist after an LHB (LHB #1) corresponding to the beacon signal transmission period and up to an LHB (LHB #9) corresponding to the next beacon signal transmission period.

Referring to FIG. 21, the beacon signal BCON may include a first portion F, a second portion P, and a third portion CNTP.

The first portion F is a portion in which information representing the frequency of a pen signal is set.

The first portion F may be composed of one bit or bit string, and one or more bits or a corresponding decimal value may correspond to a particular frequency value.

For example, when the first portion F is 11 (2 bits), the frequency indicated by the first portion F may be a first frequency corresponding to 11 (decimal number=3). As another example, when the first portion F is 10 (2 bits), the frequency indicated by the first portion F may be a second frequency corresponding to 10 (decimal number=2).

The second portion P is a portion in which the number of pulses of a pen signal or the corresponding information is set.

The second portion P may be composed of one bit or bit string, and one or more bits or a corresponding decimal value may correspond to a particular number of pulses or information corresponding thereto.

The third portion CNTP is a portion in which control information is set, which indicates a driving state, a driving type, a transmission signal type, or the like in each of LHBs (in FIG. 20, 7 LHBs (LHB #1 to LHB #8) between the current beacon signal transmission period (in FIG. 20, LHB #1) and the next beacon signal transmission period (in FIG. 20, LHB #9).

The third portion CNTP may include one sub-field or two or more sub-fields.

The number of sub-fields corresponds to the number of LHBs between the current beacon signal transmission period and the next beacon signal transmission period.

According to the beacon signal format of FIG. 21 according to the case of FIG. 20, the third portion CNTP includes sub-fields C1 to C7 corresponding to the number of LHBs (seven) existing between the current beacon signal transmission period (LHB #1) and the next beacon signal transmission period (LHB #7).

That is, seven sub-fields C1 to C7 included in the third portion CNTP correspond to 7 LHBs (LHB #2 to LHB #8) existing between the current beacon signal transmission period (LHB #1) and the next beacon signal transmission period (LHB #9).

In C1, control information representing a driving state, a driving type, a transmission signal type, or the like in LHB #2 is set.

In C2, control information representing a driving state, a driving type, a transmission signal type, or the like in LHB #3 is set.

In C3, control information representing a driving state, a driving type, a transmission signal type, or the like in LHB #4 is set.

In C4, control information representing a driving state, a driving type, a transmission signal type, or the like in LHB #5 is set.

In C5, control information representing a driving state, a driving type, a transmission signal type, or the like in LHB #6 is set.

In C6, control information representing a driving state, a driving type, a transmission signal type, or the like in LHB #7 is set.

In C7, control information representing a driving state, a driving type, a transmission signal type, or the like in LHB #8 is set.

Each of 7 sub-fields C1 to C7 included in the third portion CNTP may be composed of one bit or bit string, and one or more bits or a corresponding decimal value may represent a particular number of pulses or control information corresponding thereto.

The number of bits constituting each of the seven sub-fields C1 to C7 varies depending on the number of kinds of control information to be represented in each of the seven sub-fields C1 to C7 included in the third portion CNTP.

For example, when the number of kinds of control information to be represented in each of the seven sub-fields C1 to C7 included in the third portion CNTP is three or four, each of the seven sub-fields C1 to C7 should be composed two or more bits.

In another example, when the number of kinds of control information to be represented in each of the seven sub-fields C1 to C7 included in the third portion CNTP is five or more, each of the seven sub-fields C1 to C7 should be composed of three or more bits.

As a specific example, each of the seven sub-fields C1 to C7 included in the third portion CNTP may be composed of a bit string (including two or more bits) representing decimal numbers 0, 1, 2, and 3.

The decimal number 0 may be a value representing a full-tone mode of the pen signal for full scan (full sensing) associated with pen searching, pen position sensing, and the like.

The decimal number 1 may be a value representing a tilt-tone mode for tilt recognition.

The decimal number 2 may be a value representing the pressure of the active pen.

The decimal number 3 may be a value representing data (also referred to as pen data, which may include additional information, such as a button, a pen ID, and a checksum).

Meanwhile, intervals between beacon signal transmission periods may be uniform intervals or nonuniform intervals.

For example, referring to FIG. 20, a third LHB 20 (not illustrated in FIG. 20) in which a beacon signal BCON is transmitted is further included in a frame period or another frame period, in which a first LHB (LHB #1) and a second LHB (LHB #9) exist, and the interval between the first LHB (LHB #1) and the second LHB (LHB #9) and the interval between the second LHB and the third LHB may be the same as or different from each other.

When the intervals between beacon signal transmission periods are equally set, the interlocking operation (driving) of the touch panel TSP and the active pen may be performed more efficiently.

When the intervals between beacon signal transmission periods are non-equally set, the interlocking operation (driving) of the touch panel TSP and the active pen may be adaptively performed depending on the presence or absence of an active pen, the number of active pens, the presence or absence of a passive touch input pointer (e.g., a finger), and so on.

The beacon signal BCON having such a format may include touch panel type information (e.g., in-cell type), LHB driving information, multiplexer driving information, power mode information (e.g., information on an LHB in which panel driving and pen driving are not performed in order to reduce power consumption), and so on.

Meanwhile, the beacon signal BCON may include information for driving-synchronization between the touch panel TSP and the active pen. That is, the beacon signal BCON may also serve as a ping signal.

The various kinds of information included in the beacon signal BCON may be stored in a lookup table of the touch display device 100.

Here, the lookup table may be shared with the active pen in advance.

FIG. 22 is a view exemplifying LHB driving and pen driving for the pen-searching mode of the touch system according to the present embodiments, FIG. 23A is a view exemplifying LHB driving and pen driving for the pen mode of the touch system according to the present embodiments, and FIG. 23B is another view exemplifying LHB driving and pen driving for the pen mode of the touch system according to the present embodiments.

The pen-searching mode may be an operating mode which may be performed in order to search an active pen in the case in which no recognized active pen exists and the first active pen can be recognized in the pen-searching mode.

The pen mode may be an operation mode in which various kinds of information about an active pen (e.g., a position, a tilt (inclination of the pen), a writing pressure (pressure), pen button input information, and pen identification information (pen ID)) can be recognized, and an additional active pen may be newly recognized in the pen mode.

Referring to FIGS. 22 to 23B, the beacon signal BCON transmitted from LHBs (LHB #1 and LHB #9 in FIG. 22) corresponding to the beacon signal transmission periods in the case of the pen-searching mode and the beacon signal BCON transmitted from LHBs (LHB #1, LHB #9 in FIGS. 23A and 23B) corresponding to the beacon signal transmission periods in the case of the pen mode may be different from each other.

Referring to FIG. 22, in the case of the pen-searching mode, each of seven LHBs (LHB #2 to LHB #8) between the current beacon transmission period (LHB #1) and the next beacon transmission period (LHB #9) may be a "full-tone mode period" in which the touch panel TSP and the active pen operate in order to determine whether or not a touch and a pen touch exist in the entire screen area by performing full sensing of the entire screen area.

That is, in the full-tone mode period, a touch-driving signal (Vtouch) in the form of an AC signal is supplied to the touch panel (TSP), and the active pen outputs a pen signal through all of the tips (one tip in some cases).

Therefore, in the beacon signal BCON, all of the seven sub-fields C1 to C7 in the third portion CNTP are set to 0 (a decimal number) representing the full-tone mode. Therefore, the beacon signal BCON may be set to FP0000000.

FIG. 23A illustrates the pen mode for one active pen, and FIG. 23B illustrates the pen mode for two active pens.

Referring to FIG. 23A, in the case of the pen mode for one active pen, a plurality of LHBs (LHB #1 to LHB #16) in one frame period may include LHBs (LHB #1 and LHB #9) in which a beacon signal BCON is transmitted to an active pen, LHBs (LHB #4, LHB #5, LHB #8, LHB #12, LHB #13, and LHB #16) corresponding to the "full-tone mode period" in which the touch panel TSP and the active pen operates in order to know whether or not a touch and a pen touch exist in an entire area by performing full sensing of the entire area of the screen, LHBs (LHB #2, LHB #6, LHB #10, and LHB #14) corresponding to a period (pen position/tilt sensing period) in which the touch display device 100 senses the position and tilt of the active pen through the pen signal output from the active pen, LHBs (LHB #3 and LHB #7) corresponding to a period (pen pressure sensing period) in which the active pen informs the touch display device 100 of the pen pressure and the touch display device 100 recognizes the pressure of the pen, and LHBs (LHB #11 and LHB #15) corresponding to a period (pen data transmission period) in which the active pen outputs data including pen-related additional information and the touch display device 100 recognizes the pen-related additional information.

According to the driving situation according to the example of FIG. 23A, through an example in which the values of seven sub-fields C1 to C7 are set in the third portion CNTP in FIG. 21, the beacon signal BCON transmitted in LHB #1 may be set to FP1200120, and the beacon signal BCON transmitted in LHB #9 may be set to FP1300130.

Referring to FIG. 23B, in the case of a pen mode for two active pens (first active pen Pen 1 and second active pen Pen 2), a plurality of LHBs (LHB #1 to LHB #16) within one frame period may include LHBs (LHB #1 and LHB #9) in which a beacon signal BCON is transmitted to two active pens Pen 1 and Pen 2, LHBs (LHB #4, LHB #5, LHB #8, LHB #12, LHB #13, and LHB #16) corresponding to a "full-tone mode period" in which the touch panel TSP and two active pens Pen 1 and Pen 2 operate in order to determine whether or not a touch and a pen touch exist in the entire screen area, LHBs (LHB #2 and LHB #10) corresponding to a period (pen position/tilt sensing period) in which the touch display device 100 senses the positions of the two active pens Pen 1 and Pen 2 through the pen signals output from the two active pens Pen 1 and Pen 2, LHBs (LHB #6 and LHB #14) corresponding to a period (pen position/tilt sensing period) in which the touch display device 100 senses the tilts of the two active pens Pen 1 and Pen 2 through the pen signals output from the two active pens Pen 1 and Pen 2, an LHB (LHB #3) corresponding to a period (pen pressure sensing period) in which the first active pen Pen 1 informs the touch display device 100 of a pen pressure and the touch display device 100 recognizes the pen pressure of the first active pen Pen 1, and an LHB (LHB #11) corresponding to a period (pen pressure sensing period) in which the second active pen Pen 2 informs the touch display device 100 of a pen pressure and the touch display device 100 recognizes the pen pressure of the second active pen Pen 2, an LHB (LHB #7) corresponding to a period (pen data transmission period) in which the first active pen Pen 1 outputs data including pen-related additional information and the touch display device 100 recognizes the pen-related additional information on the first pen Pen 1, and an LHB (LHB #15) corresponding to a period (pen data transmission period) in which the second active pen Pen 2 outputs data including pen-related additional information and the touch display device 100 recognizes the pen-related additional information on the second active pen Pen 2.

According to the driving situation according to the example of FIG. 23B, by using an example of setting the values of seven sub-fields C1 to C7 in the third portion CNTP in FIG. 21, the beacon signal BCON transmitted in LHB #1 may be set to FP1200130, and the beacon signal BCON transmitted in LHB #9 may be set to FP1200130.

According to the example of FIG. 23B, one frame period is time-divided into 16 display periods D and 16 LHBs (LHB #1 to LHB #16).

The 16 LHBs (LHB #1 to LHB #16) may include two or more LHBs (LHB #2 and LHB #10) in which the positions of pen touches made by two or more active pens Pen 1 and Pen 2 are sensed.

According to the above-described LHB configuration and LHB driving, optimized display performance and sensing performance can be provided, and a pen position, a pen pressure, pen additional information, and the like can be efficiently recognized through the LHB driving. Particularly, multi-pen recognition performance can be improved.

For efficient multi-pen recognition, a period, in which a pen signal can be acquired two or more times within one frame period is required.

Accordingly, in the touch system according to the present embodiments, a display period and an LHB are repeated during one frame period, and pen signals output from two or more active pens may be emitted to the display panel 110 in two or more LHBs among a plurality of LHBs in one frame period. Accordingly, the touch circuit TC may sense the pen touches made by the two or more active pens based on the pen signals.

The first circuit ROIC included in the touch circuit TC according to the present embodiments may operate in a plurality of blank periods within one frame period, may supply the driving signals (a touch-driving signal and a touch panel driving signal) to the display panel 110 during two or more different LHBs in one frame period, and may detect, through the display panel 110, the pen signals output from the two or more active pens.

Accordingly, the second circuit TCR included in the touch circuit TC according to the present embodiments may sense the pen touches made by the two or more active pens based on the pen signals detected by the first circuit ROIC.

In addition, a pen recognition method of a touch display device 100 according to the present embodiments may include a first step of supplying a driving signal to the display panel 110 on which a plurality of touch electrodes TE is arranged, and detecting a signal generated in response to the driving signal through the display panel 110, and a second step of sensing a touch made by a finger or sensing a pen touch made by an active pen based on the signal detected in the first step. In the first step, the touch display device 100 may operate in a plurality of LHBs within one frame period, may supply the driving signal to the display panel 110 during two or more different LHBs in one frame period, and may detect the pen signals output from the two or more active pens through the display panel 110. In the second step, the touch display device 100 may sense the pen touches made by the two or more active pens based on the pen signals.

According to the above-described multi-pen recognition method, during a blank period (e.g., an LHB) in which any one active pen outputs a pen signal to the display panel 110 through at least one pen tip P/A, a pen signal may also be output from any other active pen to the display panel 110. Thus, during the same blank period, the pen signals output from two or more active pens may be emitted to the display panel 110.

As described above, the touch display device 100 may acquire pen signals two or more times within one frame period, and may provide a quick and effective multi-pen recognition process.

As described above, for effective multi-pen recognition, two or more LHBs in which pen signals output from two or more active pens are emitted to the display panel 110 among a plurality of LHBs in one frame period may be pen position/tilt sensing periods (LHB #2, LHB #6, LHB #10, and LHB #14 in FIG. 23B) in which at least one of the positions and tilts of the two or more active pens is sensed.

According to the above description, the touch display device 100 may acquire the pen signal output from the two or more active pens two or more times in one frame period, thereby sensing the positions and/or tilts of two or more active pens.

The intervals between the LHBs (LHB #2, LHB #6, LHB #10, and LHB #14 in FIG. 23B) corresponding to the pen position/tilt sensing period for sensing the positions and/or tilts of the active pens may be equal to each other.

Accordingly, pen touch positions accurately corresponding to a trace touched by the user using the active pen can be sensed without a deviation.

Referring to FIGS. 22 to 23B, a plurality of LHBs included in one frame period may include one or more LHBs (e.g., LHB #1 and LHB #9) corresponding to the beacon transmission periods in which a beacon signal BCON composed of pulses representing predetermined codes are transmitted from the display panel 110 to two or more active pens.

Through the transmission of the beacon signal BCON, the touch display device 100 may inform the active pens interlocked with the touch display device 100 of how to perform driving in one or more LHBs (e.g., LHB #2 to LHB #8) subsequent to the LHB (LHB #1) in which the beacon signal BCON is transmitted. Accordingly, the active pen may operate in cooperation with the touch display device 100 based on the beacon signal BCON. Accordingly, correct pen recognition (pen-touch sensing) can be performed.

The beacon signal BCON may be supplied to all of the touch electrodes TE arranged on the entire area of the touch panel TSP.

The beacon signal BCON is a signal that is supplied to the touch panel TSP and transmitted to the active pen and may be regarded as a kind of a touch panel driving signal in view of the fact that it is supplied to the touch panel TSP.

Comparing FIG. 22 with FIGS. 23A and 23B, it can be seen that the third portion CNTP in the beacon signal BCON in the case of the pen-searching mode is all set to 0 (a decimal number). Therefore, the beacon signal BCON in the pen-searching mode and the beacon signal BCON in the pen mode may be different from each other.

Accordingly, not only the touch display device 100 according to the present embodiments, but also the active pen may operate in one of the pen-searching mode and the pen mode according to the beacon signal BCON.

According to the above description, the touch display device 100 and the active pen may share the operation mode through the beacon signal BCON, thereby accurately performing an operation suitable for the corresponding operation mode. Accordingly, the touch display device 100 and the active pen may perform the pen recognition driving operation through a correct interlocking operation.

The beacon signal BCON may include panel information (e.g., panel ID, panel status, and panel type) and driving control information.

Here, the panel information is also referred to as touch panel information. The panel information may include, for example, a panel ID, panel type information (e.g., add-on type, in-cell type, on-cell type, etc.), and panel status information.

The driving control information may include information illustrated in the beacon signal format of FIG. 21.

Through the beacon signal BCON, the touch display device 100 is able to inform the active pen of information on the touch panel TSP and information on driving related to pen-touch sensing. Accordingly, an interlocking operation for pen-touch sensing (pen recognition) between the touch display device 100 and the active pen can be accurately performed.

As illustrated in FIG. 21, the frequency of a plurality of pen pulses constituting a pen signal output from the active pen may be defined by the beacon signal BCON.

Thus, the active pen is able to generate a pen signal having a frequency at which the touch circuit TC is able to perform signal detection and signal processing. Accordingly, the touch circuit TC is able to correctly receive and recognize the pen signal having the frequency to be recognized and processed by itself through the touch panel TSP, and thus the touch circuit TC is able to perform accurate pen recognition.

As illustrated in FIG. 21, the number of pulses of the plurality of pen pulses constituting the pen signal output from the active pen may be defined by the beacon signal BCON.

Thus, the active pen is able to generate a pen signal having pulses based on the number of which the touch circuit TC is able to perform signal detection and signal processing. Accordingly, the touch circuit TC is able to correctly receive and recognize the pen signal having the number of pulses to be recognized and processed by itself through the touch panel TSP, and thus the touch circuit TC is able to perform accurate pen recognition.

As illustrated in FIG. 21, the number of LHBs existing between the current beacon signal transmission period (e.g., LHB #1) and the next beacon signal transmission period (e.g., LHB #9) may be defined by the beacon signal BCON.

Accordingly, the active pen is able to accurately know how long the driving operation according to the driving control information learned through the beacon signal BCON is to be performed, so that the active pen is able to correctly perform the interlocking operation with the touch display device 100.

Alternatively, at least one LHB in which the pen signal is not emitted from the active pen may exist between the current beacon signal transmission period (e.g., LHB #1) and the next beacon signal transmission period (e.g., LHB #9).

Thus, the power consumption of the active pen and the touch display device 100 can be reduced.

Referring to the example of FIG. 23B, the plurality of LHBs in one frame period may include one or more LHBs (LHB #2, LHB #6, LHB #4, LHB #5, and LHB #8) corresponding to periods in which two or more active pens may output pen signals and at least one of the positions and tilts of two or more active pens may be sensed (pen position/tilt sensing period and full-tone mode period) in the touch display device 100 after the LHB (LHB #1) corresponding to the period, in which the beacon signal BCON is transmitted from the touch panel TSP of the touch panel device 100 to the two or more active pens (beacon signal transmission period).

In addition, the plurality of LHBs in one frame period may further include: at least one LHB (LHB #3) corresponding to a period, in which the two or more active pens may output pen signals representing pen pressures and the touch display device 100 may sense the pressures for the two or more active pens (pen pressures or writing pressures) (pen pressure sensing period) and/or at least one LHB (LHB #7) corresponding to a period, in which data (pen data) including additional pen information for the two or more active pens (e.g., pen IDs, pen button input information, and a checksum for beat error checking) is transmitted to the touch display device 100 (pen data transmission period).

The period, in which at least one of the positions and tilts for the two or more active pens is sensed may include pen position/tilt sensing periods (LHB #2 and LHB #6) for local sensing and full-tone mode periods (LHB #4, LHB #5, and LHB #8) for full sensing.

The additional pen information for the active pens included in the data (pen data) may include, for example, at least one of a pen ID for a corresponding active pen, pen button input information for the active pens, and a checksum for checking the bit error of the additional pen information for the active pens.

As described above, during one frame period, the touch display device 100 may accurately recognize the positions and/or tilts for the two or more active pens, and the pressures and/or additional pen information for two or more active pens.

Meanwhile, referring to FIG. 23B, in each of four LHBs (LHB #2, LHB #6, LHB #10, and LHB #14) for sensing the positions and/or tilts of two or more active pens, the corresponding position corresponding to each active pen may be found through time division driving and sensing.

For example, in order to sense the positions and/or tilts of a first active pen Pen 1 and a second active pen Pen 2, the position and/or tilt for the first active pen Pen 1 found through the pen-searching mode or full scan mode in the pen mode may be sensed in LHB #2 and LHB #10, and the position and/or tilt for the second active pen Pen 2 found through the pen-searching mode or the full scan mode in the pen mode may be sensed in LHB #6 and LHB #14.

At this time, the LHBs for sensing the position and/or tilt for the first active pen Pen 1 may be set at a uniform interval. Similarly, the LHB periods for sensing the position and/or tilt for the second active pen Pen 2 may be set at a uniform interval. This is because the accuracy of touch-sensing can be improved when the intervals for sensing the positions and/or tilts of the active pens are equal to each other.

In another example, in order to sense the positions and tilts of a first active pen Pen 1, a second active pen Pen 2, a third active pen Pen 3, and a fourth active pen Pen 4, in LHB #2, an area corresponding to the position of the first active pen Pen 1 found through the full scan mode in the pen-searching mode or the pen mode may be sensed, in LHB #6, an area corresponding to the position of the second active pen Pen 2 found through the full scan mode in the pen-searching mode or the pen mode may be sensed, in LHB #10, an area corresponding to the position of the third active pen Pen 3 found through the full scan mode in the pen-searching mode or the pen mode may be sensed, and in LHB #14, an area corresponding to the position of the fourth active pen Pen 4 found through the full scan mode in the pen-searching mode or the pen mode may be sensed.

Referring to FIG. 23B, in each of four LHBs (LHB #2, LHB #6, LHB #10, and LHB #14) for sensing the positions and/or tilts of two or more active pens, the position and/or tilt for each active pen may be found through simultaneous driving and sensing.

For example, in order to sense the positions and tilts of the first active pen Pen 1 and the second active pen Pen 2, during four LHBs (LHB #2, LHB #6, LHB #10, and LHB #14), areas (same or different areas) corresponding to the positions of the two active pens Pen 1 and Pen 2 found through the full scan mode in the pen-searching mode or the pen mode may be simultaneously sensed. At this time, when the two active pens Pen 1 and Pen 2 are located in the same local sensing area, the touch display device 100 may distinguish the two active pens Pen 1 and Pen 2 through the pen IDs included in the pen signals (data) emitted from the two active pens Pen 1 and Pen 2.

Figure 24A:
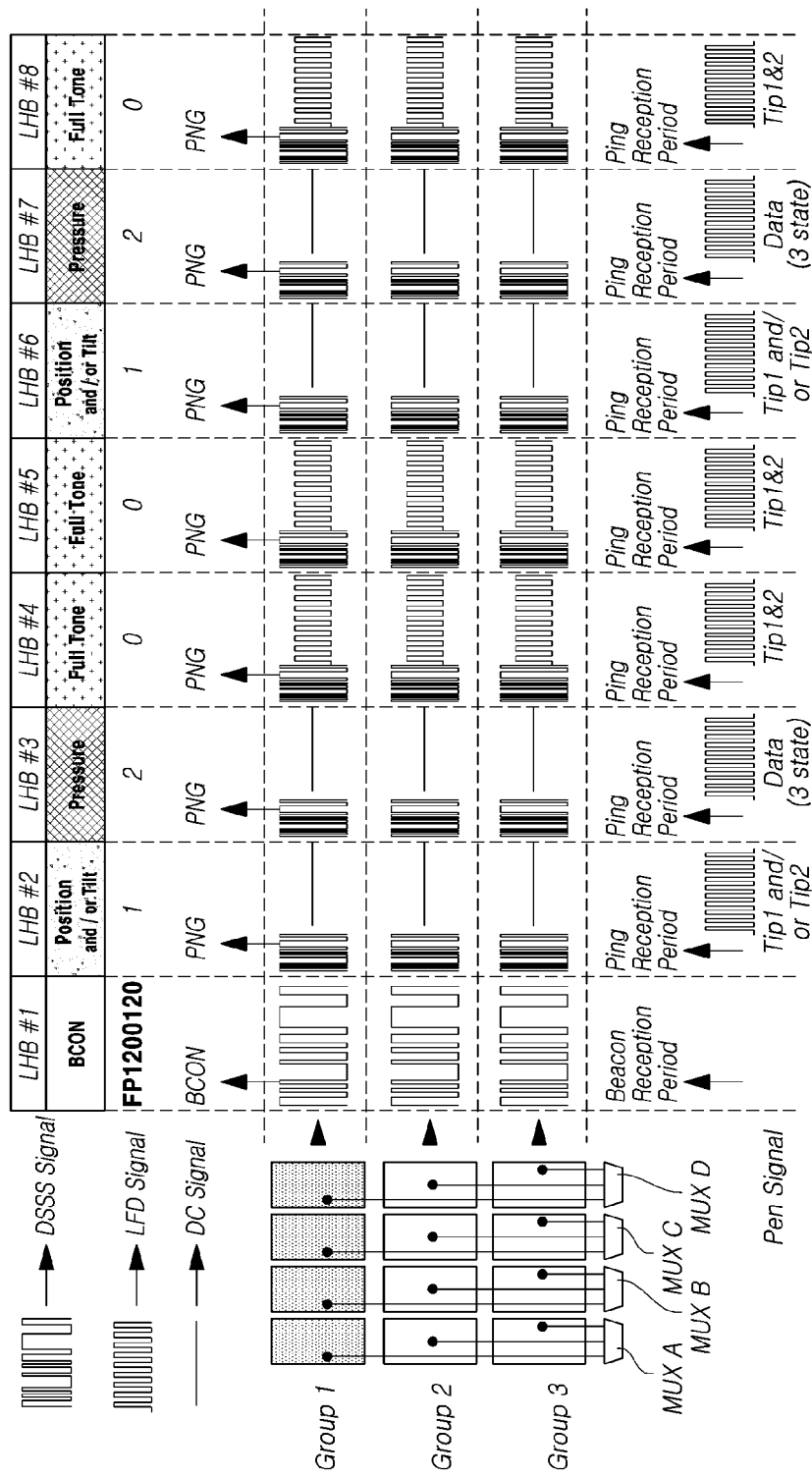
FIG. 24A is a view exemplifying a timing diagram of panel driving and pen driving in a touch system according to embodiments disclosed herein.

FIG. 24A is a view exemplifying a timing diagram of panel driving and pen driving in a touch system according to the present embodiments.

FIG. 24A exemplifies panel driving and pen driving during eight LHBs, in which it is assumed that the touch electrodes arranged on the touch panel TSP are driven in the state of being divided into three groups (Group 1, Group 2, and Group 3) (in practice, the number of groups may be less or more than three).

Referring to FIG. 24A, in eight LHBs (LHB #1 to LHB #8), LHB #1 is a beacon period, LHB #2 and LHB #6 are pen position/tilt sensing periods for sensing the position and/or tilt of at least one active pen, LHB #3 and LHB #7 are pen pressure sensing periods for recognizing the pressures (writing pressures) for one or more active pens, and LHB #4, LHB #5, and LHB #8 are full-tone mode periods for performing full sensing for touches made by a finger and/or one or more active pens in the entire screen area.

Therefore, during LHB #1, which is the beacon period, a beacon signal BCON represented by FP1200120 may be applied to the entire area of the touch panel TSP (i.e., all of the touch electrodes).

According to another embodiment, a beacon signal BCON represented by FP1200120 may be applied to a partial area of the touch panel TSP (that is, an area corresponding to some touch electrodes or the position of a detected active pen). For example, the beacon signal BCON may be applied only to touch electrodes located in an even-numbered column among the touch electrodes of the touch panel, or the beacon signal BCON may be applied only to touch electrodes located in an odd-numbered column. Alternatively, the beacon signal BCON may be applied only to a predetermined touch electrode group. Alternatively, the touch electrodes of the touch panel may be divided into a plurality of touch groups, and then, in a first beacon signal period, the beacon signal may be applied to the first touch electrode group and in a second beacon period, the beacon signal may be applied to the second touch electrode group.

Accordingly, one or more active pens may receive the beacon signal BCON, and thus may receive various kinds of information (e.g., a touch panel type, LHB driving information, multiplexer driving information, and a power mode) including the panel information and the driving control information.

The beacon signal may be, for example, a direct sequence spread spectrum (DSSS) signal.

Each of the remaining LHBs (LHB #2 to LHB #8) other than LHB #1 which is the beacon period may be time-divided into an up-link period, in which panel driving is performed and a down-link period, in which pen driving is performed. This will be described again with reference to FIGS. 34 and 35.

During the up-link period of each of LHB #2 and LHB #6 corresponding to pen position/tilt sensing periods, a ping signal PNG may be applied to the entire area (i.e., all of the touch electrodes) of the touch panel TSP. Accordingly, one or more active pens may receive the ping signal PNG.

In each of LHB #2 and LHB #6 corresponding to the pen position/tilt sensing periods, during the down-link period proceeding immediately after the up-link period or after a certain length of time from the up-link period, a DC-type driving signal having a constant voltage may be applied to the entire area (i.e., all of the touch electrodes) of the touch panel TSP, and each of the one or more active pens may emit (output) a pen signal to the touch panel TSP using two or more pen tips Tip 1 and Tip 2 thereof.

Here, for example, each active pen may emit pen signals sequentially using two or more pen tips Tip 1 and Tip 2 for tilt sensing, and may emit pen signals simultaneously using two or more pen tips Tip 1 and Tip 2 or using only one of the two or more pen tips Tip 1 and Tip 2 for position sensing.

During the up-link period of each of LHB #3 and LHB #7, which are pen pressure sensing periods, a ping signal PNG may be applied to the entire area (i.e., all of the touch electrodes) of the touch panel TSP. Accordingly, one or more active pens may receive the ping signal PNG.

In each of LHB #3 and LHB #7, which are the pen pressure sensing periods, during the down-link period proceeding immediately after the up-link period or after a certain length of time from the up-link period, a DC-type driving signal having a constant voltage may be applied to the entire area (i.e., all of the touch electrodes) of the touch panel TSP, and each of the one or more active pens may emit (output) a pen signal corresponding to data including information on the pen tip pressure (i.e., the writing pressure or the pressure) thereof to the touch panel TSP.

Here, the pen signal corresponding to data representing the pressure information may be represented by three states (a normal-phase state, an inverse-phase state, and a DC state). This has been described with reference to FIG. 10, and will be described later in detail with reference to FIG. 29.

During the up-link period of each of LHB #4, LHB #5, and LHB #8, which are full-tone mode periods, a ping signal PNG may be applied to the entire area (i.e., all of the touch electrodes) of the touch panel TSP. Accordingly, one or more active pens may receive the ping signal PNG.

In each of LHB #4, LHB #5, and LHB #8, which are full-tone mode periods, during the down-link period proceeding immediately after the up-link period or after a certain length of time from the up-link period, driving signals (an LFD signal and a touch panel driving signal) having a predetermined frequency and composed of a plurality of pulses may be applied to the entire area (i.e., all of the touch electrodes) of the touch panel TSP.

Accordingly, each active pen may emit (output) pen signals to the touch panel TSP through the two or more pen tips Tip 1 and Tip 2 thereof in response to the driving signals (the LFD signal and the touch panel driving signal).

Figure 24B:
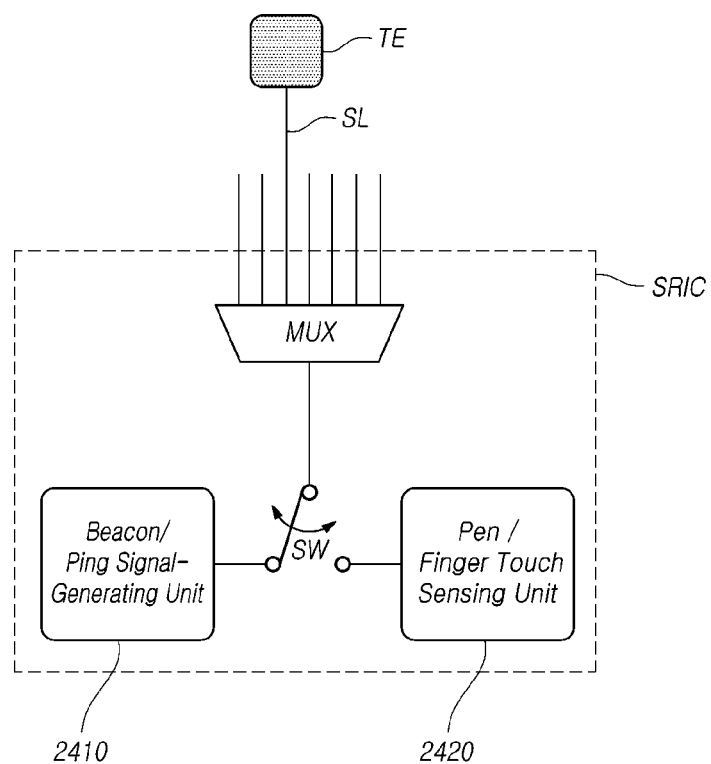
FIG. 24B is a view illustrating a circuit structure for supplying three kinds of touch panel driving signals (a beacon signal, a finger signal, and an LFD signal) to the touch panel in the touch system according to embodiments disclosed herein.

FIG. 24B is a view illustrating a circuit structure for supplying three kinds of touch panel driving signals (a beacon signal, a ping signal, an LFD signal, and a DC signal) to the touch panel in the touch system according to the present embodiments.

Beacon signals (BCON, PNG, and LFD signals), which are three kinds of driving signals, are supplied to the touch panel TSP according to the driving timing for the sensing of a touch made by a finger or the like and the sensing of a pen touch made by an active pen.

A touch circuit SRIC may include a beacon/ping signal-generating unit 2410 configured to generate a beacon signal BCON and a ping signal PNG, a pen/finger touch-sensing unit 2420 configured to output an LFD signal, and a switch SW configured to electrically connect one of the beacon/ping signal-generating unit 2410 and the pen/finger touch sensing unit 2420 to a multiplexer MUX according to driving timing information.

For example, in FIG. 24A, in LHB #1 corresponding to the beacon period, the switch SW electrically connects the beacon/ping signal-generating unit 2410 and a multiplexer MUX. Accordingly, a beacon signal BCON generated by the beacon/ping signal-generating unit 2410 is output to a signal line SL connected to a touch electrode TE through the multiplexer MUX.

In FIG. 24A, in the up-link period (ping period), such as LHB #2, the switch SW electrically connects the beacon/ping signal-generating unit 2410 and the multiplexer MUX. Accordingly, a ping signal PNG generated by the beacon/ping signal-generating unit 2410 is output to the signal line SL connected to the touch electrode TE through the multiplexer MUX.

In FIG. 24A, in the down-link period (ping period), such as LHB #2, the switch SW electrically connects the pen/finger signal generating unit 2420 and the multiplexer MUX. Accordingly, the LFD signal output from the pen/finger touch sensing unit 2420 is output to the signal line SL connected to the touch electrode TE through the multiplexer MUX. The pen/finger touch-sensing unit 2420 may receive and detect a signal representing a change in capacitance through a signal line SL connected to a touch electrode TE to which the LFD signal or the DC signal is applied, or a pen signal emitted from an active pen.

The beacon/ping signal-generating unit 2410 may include, for example, circuit components, such as a pseudo noise code generator configured to generate a pseudo noise code, which is also shared by an active pen, in order to generate a beacon signal BCON and a ping signal PNG in the form of a spread-spectrum-modulated signal (e.g., a DSSS signal), a multiplier configured to multiply codes to be transmitted and the pseudo noise code and to modulate a multiplication result, and a digital-to-analog converter configured to convert a signal modulated by the multiplier to an analog signal and to output a pen signal (BCON or PNG).

The active pen may include circuit components including an analog-to-digital converter, a multiplier, a pseudo noise code generator, and the like, in order to demodulate a beacon signal BCON and a ping signal PNG in the form of a spread-spectrum modulation signal.

At this time, some features of the pen-searching mode of FIG. 22 and the pen mode of FIGS. 23A and 23B will be described once again.

In the pen-searching mode, a beacon signal BCON is periodically applied to all of the touch electrodes arranged on the touch panel TSP, and the beacon signal BCON may be transmitted from the touch panel TSP to one or more active pens.

In such a pen-searching mode, a plurality of LHBs corresponding to full scan mode (full-tone mode) periods may proceed.

That is, in the pen-searching mode, one LHB, two LHBs, or a predetermined number of LHBs of all of the LHBs in one frame period may be a beacon period(s), and the remaining LHBs may be a full scan mode (full-tone mode) period.

When one frame period includes 16 LHBs, that is, in the case of 16-LHB driving, 16 LHBs may include 2 LHBs corresponding to beacon periods and 14 LHBs corresponding to full scan mode (full-tone mode) periods.

At this time, the touch electrodes may be grouped so that some groups may be simultaneously sensed.

During one frame period (one display frame period), the full scan mode (full-tone mode) is performed through 14 LHBs, so that one touch report may be made or two or more touch reports may be made. That is, during one frame period, the process of sensing the touch position in the entire screen area may be performed only once or two or more times.

In the pen-searching mode, a ping signal PNG may be supplied to the touch panel TSP in all of the LHBs, or a ping signal PNG may be supplied to the touch panel TSP only in some LHBs and the ping signal PNG may not be supplied to the touch panel TSP in the remaining LHBs.

In the pen-searching mode, a full scan mode (full-tone mode) may be performed in all of the LHBs, but the full scan mode (full-tone mode) may be performed in some LHBs.

In the pen mode, all of the LHBs in one frame period may include at least one LHB corresponding to a beacon period, at least one LHB corresponding to a pen position/tilt sensing period for sensing at least one of a position and a tilt for at least one active pen, at least one LHB corresponding to a data period, in which data including a plurality of pieces of additional pen information is transmitted from one or more active pens to the touch panel TSP in order to sense the plurality of pieces of additional pen information (e.g., a pressure, a pen ID, button information, and checksum information) for at least one active pen, and at least one LHB in which a full scan mode (full-tone mode) is performed.

In the pen mode, in each LHB corresponding to the full scan mode (full-tone mode), a ping signal PNG and an LFD signal (an AC-type driving signal) are sequentially supplied to the touch panel TSP to be transmitted to the active pens.

In the case in which one frame period includes 16 LHBs, i.e. in the case of 16-LHB driving, the 16 LHBs may include two LHBs corresponding to beacon periods, four LHBs corresponding to pen position/tilt sensing periods, two LHBs corresponding to pen pressure sensing periods, two LHBs corresponding to data transmission periods for transmitting data including additional pen information in addition to pressure, and six LHBs corresponding to full scan mode (full-tone mode) periods.

At this time, the touch electrodes may be grouped so that some groups may be simultaneously sensed.

In a pen mode, during one frame period (one display frame period), the full scan mode (full-tone mode) is performed through six LHBs, so that one touch report may be made. That is, in the pen mode, during one frame period, the process of sensing the touch position in the entire screen area may be performed only once.

In addition, each of the plurality of pieces of additional pen information may be transmitted in different LHBs for respective kinds of information.

For example, the pressure among the plurality of pieces of additional pen information may be transmitted from the active pens to the touch panel via one or more separate LHBs, and the remaining additional pen information (e.g., a pen ID, button information, and checksum information) may be transmitted together via one or more LHBs.

In addition, the pen-searching mode may be performed during a predetermined number of frame periods regardless of whether an active pen is searched for or not.

As described above, in the pen mode, one frame period may include all or some of a beacon period, a pen position/tilt sensing period, a pen pressure sensing period, in which data including pressure information is transmitted in order to sense a pressure in additional pen information, a data transmission period, in which data including a plurality of pieces of additional pen information including other pieces of additional pen information (e.g., a pen ID, button input information, and checksum information), and a full scan mode (full-tone mode) period.

In one frame period, the number and order of a pen position/tilt sensing period, a pen pressure sensing period, a data transmission period, and a full scan mode period may be variously changed.

During one frame period, all or only some of a pen position/tilt sensing period, a pen pressure sensing period, a data transmission period, and a full scan mode period may exist.

An LHB driving method as to the order and the kinds of periods in which respective LHBs in one frame period are allocated, and a transmission method and a signal format of the signals related to panel driving and pen driving in each LHB are defined as protocols, and such protocols may be defined in advance between the touch display device 100 and an active pen, or may be transmitted from the touch display device 100 to the active pen through a beacon signal or the like.

The protocols may be adaptively changed according to a change in various situations, such as the driving environment of a touch system, the presence or absence and the number of active pens, and the driving state and condition of the panel or the active pens.

Alternatively, when one active pen or a predetermined number of active pens is found, the pen-searching mode may be interrupted and the mode may be switched to the pen mode.

When the touch frequency (touch-sensing rate or touch report rate) is A Hz in the pen-searching mode and B Hz in the pen mode, A and B may be the same, or A and B may be different from each other.

For example, the touch frequency A Hz in the pen-searching mode may be lower than the touch frequency B Hz in the pen mode. That is, the touch report rate in the pen-searching mode may be slower than the touch report rate in the pen mode.

As a specific example, when the display frequency is 60 Hz, the touch frequency for the finger touch in the pen-searching mode is 120 Hz, and the touch frequency for the finger touch in the pen mode may be 60 Hz.

For example, when the pen-searching mode is performed, a communication period associated with the active pens is required, so that the periods associated with the finger touch are reduced to that extent, and thus, the number of times of sensing the finger touch can be reduced, and as a result, the touch report rate for the finger touch can be reduced.

FIG. 25 is a view illustrating characteristics related to the recognition of the position and/or tilt, pressure, and data of an active pen at the time of pen-touch sensing in a touch system according to the present embodiments.

As described above, a touch display device 100 according to the present embodiments recognizes the position and/or tilt, pressure, and data (additional pen information) for an active pen.

The position and/or tilt, pressure, and data (additional pen information) of an active pen are to be different from each other in terms of the importance of recognition, and the touch display device 100 and the active pen may be adaptively driven according to importance setting.

Referring to the example of FIG. 25, the importance of recognition of the position and/or tilt for the active pen may be set to the highest, the importance of recognition of the pressure for the active pen may be set to the next highest, and the importance of recognition of the data for the active pen may be set to the lowest.

In this example of the importance setting, the number of LHBs for recognizing the position and/or tilt for an active pen may be set to the largest in one frame period, the number of LHBs for recognizing the pressure for the active pen in one frame period may be set to the next largest, and the number of LHBs for recognizing data (additional pen information) for the active pen in one frame period may be set to the smallest.

Further, in order to recognize accurate pen touch positions according to the trace touched by an active pen by the user, the intervals of the LHBs for recognizing the pen positions may be set uniformly.

The panel and pen driving for sensing (recognizing) the position of an active pen and the panel and pen driving for sensing (recognizing) the tilt of the active pen are substantially the same, except for the output methods of the pen signals. Thus, in the present specification, sensing the position (or tilt) for an active pen may imply sensing the tilt (or position) for the active pen.

The pen signals output from an active pen may be generally classified into a signal for sensing a pen position and/or tilt sensing signal and data for sensing various additional pen information (e.g., a pressure, a pen ID, button input information, and checksum information).

The signal for sensing a pen position and/or tilt is a signal in which no information is carried. The touch display device 100 finds the position and/or tilt of a pen by detecting electrical characteristics (e.g., voltage, current, capacitance, and signal intensity) associated with the signal.

A pen signal corresponding to data for sensing various kinds of additional pen information (e.g., a pressure, a pen ID, button input information, and checksum information) is a signal in which predetermined information is carried. The touch display device 100 may confirm data and detect various kinds of additional pen information carried in the data through signal demodulation.

FIG. 26 is a view exemplifying driving signals in the touch display device 100 according to the present embodiments.

Referring to FIG. 26, a touch circuit (TC) may supply a driving signal to a touch panel TSP for touch-sensing for a touch made by a passive touch input pointer, such as a finger, and pen-touch sensing for a pen touch made by an active touch input pointer, such as an active pen.

Such a driving signal is a signal for driving the touch panel TSP for touch sensing and pen-touch sensing and may be variously referred to as a touch panel driving signal, a touch-driving signal TDS, a touch-driving voltage Vtouch signal, a Load-Free Driving (LFD) signal, or the like.

Such a driving signal is supplied from a touch circuit TC to a touch panel TSP (an external type bonded to the outside of the display panel or a built-in type embedded in the display panel) and may be transferred to the inside of an active pen, which is in contact with the touch panel TSP or not in contact with but in the vicinity of the touch panel TSP, through a pen tip of the active pen.

As illustrated in FIG. 26, the driving signal may be an AC-type signal having a plurality of pulses or a DC-type signal having a constant voltage.

The AC-type driving signal is a signal swinging between a high-level voltage and a low-level voltage. The AC-type driving signal may be composed of a plurality of pulses having one frequency or two or more frequencies, and may have various waveforms, such as a square wave, a triangle wave, a sine wave, a trapezoidal wave, and the like.

For example, the AC-type driving signal may be used to sense the position of a touch made by a finger in the entire screen area (full sensing area), to search an active pen in the entire screen area (full sensing area), and to drive a touch panel TSP in the periods (i.e., the full-tone periods) (LHB #2 to LHB #8 in FIG. 22, LHB #4, LHB #5, LHB #8, LHB #12, LHB #13, and LHB #16 in FIGS. 23A and 23B) for sensing the position of a pen touch made by an active pen.

For example, the DC-type driving signal may be used to drive the touch panel TSP in periods (LHB #2, LHB #3, LHB #6, LHB #7, LHB #10, LHB #11, LHB #14, and LHB #15 in FIGS. 23A and 23B) for recognizing the position, tilt, pressure, and additional pen information (data) for an active pen in a partial screen area (local sensing area).

When the AC-type driving signal is used, it is possible to more accurately sense the touch position of a finger and the position of an active pen in the entire screen area, and when the DC-type driving signal is used, it is possible to more accurately recognize a position, tilt, pressure, additional pen information (data), and the like for the active pin in a partial area of the screen.

Figure 27:
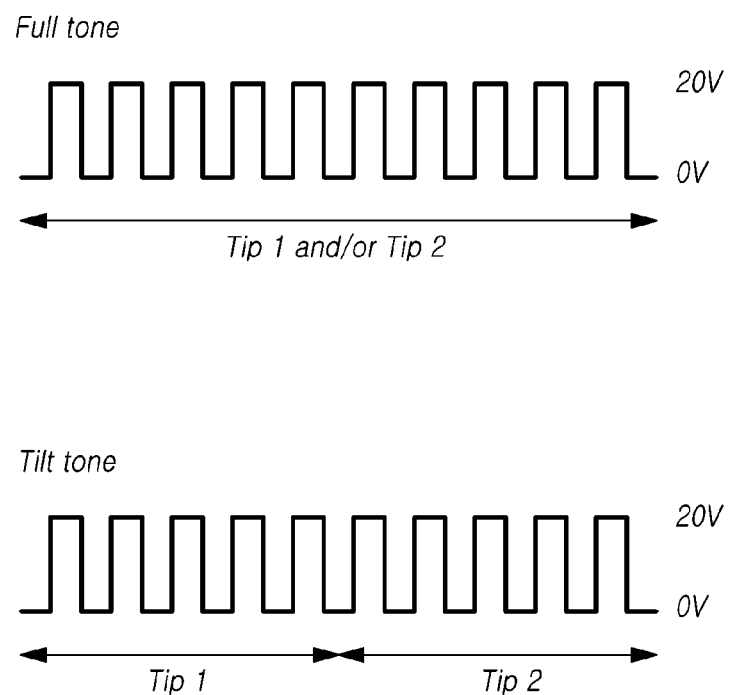
FIG. 27 is a view exemplifying pen signals in an active pen according to embodiments disclosed herein.

FIG. 27 is a view exemplifying pen signals in an active pen according to the present embodiments.

As illustrated in FIG. 27, a pen signal generated in and output from an active pen according to the present embodiments may be in the form of a full-tone, a tilt-tone, or the like.

For example, a full-tone pen signal may be a pen signal for sensing a pen position in the entire screen area (full sensing area), and when an AC-type driving signal is supplied to the touch panel TSP, i.e. in full-tone mode periods (LHB #2 to LHB #8 in FIG. 22, LHB #4, LHB #5, LHB #8, LHB #12, LHB #13, and LHB #16 in FIGS. 23A and 23B), the full-tone pen signal may be all or some of the signals equally output from two or more tips Tip 1 and Tip 2 of an active pen.

When an active pen is in the hover mode (non-contact mode) capable of performing pen-touch sensing even when the active pen is close to the touch panel TSP but not touching the touch panel TSP, two or more tips Tip 1 and Tip 2 of the active pen may simultaneously output the same pen signal. In a contact mode in which touch-sensing is enabled only when an active pen comes into contact with the touch panel TSP, a pen signal may be output only from some of two or more tips Tip 1 and Tip 2 of the active pen.

For example, tilt-tone pen signals may be pen signals for sensing the pen position and/or pen tilt in a partial screen area (local sensing area), and may be sequentially output from two or more tips Tip 1 and Tip 2 of an active pen when a DC-type driving signal is supplied from the touch panel TSP, i.e. in the pen position/tilt sensing periods (LHB #2, LHB #6, LHB #8, LHB #10, and LHB #14 in FIGS. 23A and 23B).

In addition, in a period for transmitting the pressure of an active pen and a period for transmitting data (additional pen information) to the active pen, the pen signals are not a form in which the pulses are regularly repeated as in a full-tone and a tilt-tone, but may be signals in which pulses are arranged in a specific pattern of representing the corresponding pressure and additional pen information.

As described above, the output position (pen tip) and timing of the pen signals may vary depending on the type (AC or DC) of the driving signals for driving the touch panel TSP.

In addition, as described above, when driving signals for driving the touch panel TSP are AC-type signals including a plurality of pulses, the pen signal may be simultaneously output from two or more pen tips P/A, or may be output from only some of the two or more pen tips P/A.

When the driving signals for driving the touch panel TSP are DC-type signals having a constant voltage, pen signals may be sequentially output from two or more pen tips P/A.

Accordingly, an active pen may confirm the type of the driving signals received through the touch panel TSP and may control the driving operation thereof.

Figure 28:
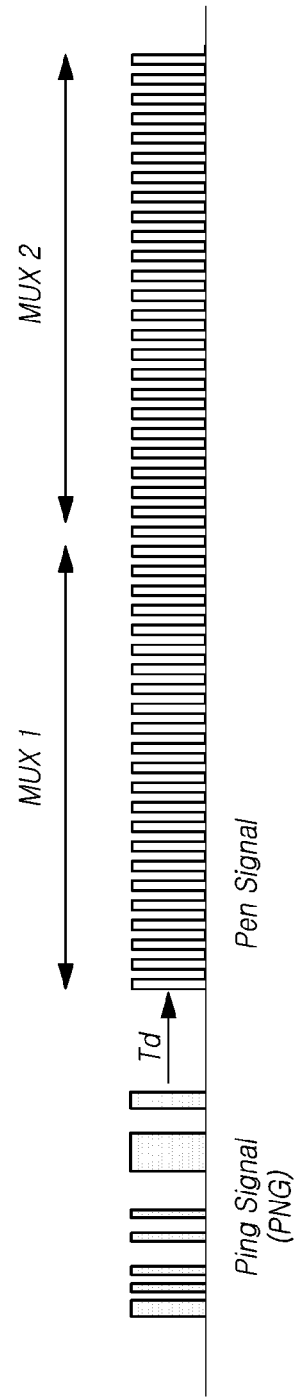
FIG. 28 is a view illustrating a drive timing diagram between a panel and an active pen in a tilt-tone mode and a full-tone mode in a touch system according to embodiments disclosed herein.
Figure 29:
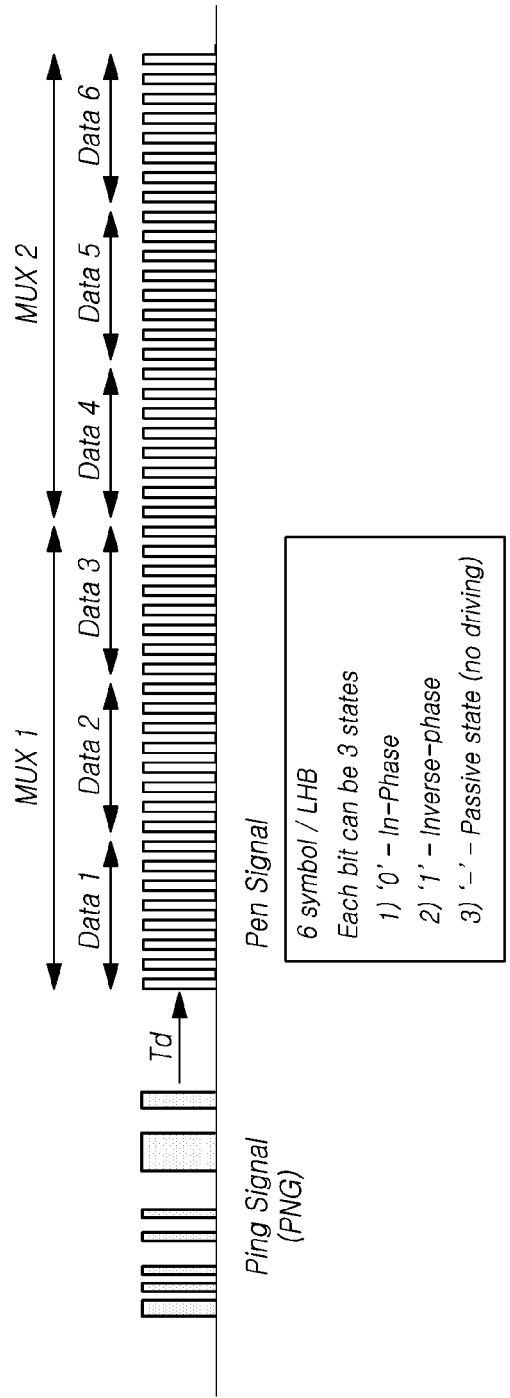
FIG. 29 is a drive timing diagram between the panel and the active pen in a data mode in the touch system according to embodiments disclosed herein.

FIG. 28 is a view illustrating a drive timing diagram between the touch panel TSP and the active pen in a tilt-tone mode (a mode corresponding to a pen position/tilt sensing period) and a full-tone mode (a mode corresponding to a full-tone mode period) in a touch system according to the present embodiment, and FIG. 29 is a drive timing diagram between the touch panel TSP and the active pen in a data mode (a mode corresponding to a data transmission period) in the touch system according to the present embodiments.

Referring to FIGS. 28 and 29, in the first half (corresponding to an up-link period in FIG. 34) of each of two or more LHBs in which a pen signal is output from one or more active pens, a ping signal PNG constituted by pulses representing predetermined codes is transmitted from the touch panel TSP or a display panel 110, in which the touch panel TSP is embedded, to the one or more active pens.

Here, the ping signal PNG is a signal that is supplied to the touch panel TSP and transmitted to the active pen, and may be regarded as a kind of a touch panel driving signal in view of the fact that it is supplied to the touch panel TSP.

Thereafter, a driving signal may be supplied to the touch panel TSP or the display panel 110 in which the touch panel TSP is embedded, and pen signals may be output from one or more active pens.

Pen signals may be output from the one or more active pens after a predetermined time Td elapses from the last pulse among the pulses constituting the ping signal PNG.

The above-mentioned ping signal is a signal that synchronizes a touch panel (TSP) and an active pen. Based on the ping signal PNG, the active pen may generate and output a pen signal synchronized with a driving signal supplied to the touch panel TSP or an operation signal within a touch-driving circuit ROIC or an integrated driving chip SRIC including the touch-driving circuit ROIC.

Meanwhile, referring to FIGS. 28 and 29, MUX 1 denotes a first channel of each multiplexer included in a touch-driving circuit ROIC or an integrated driving chip SRIC including the touch-driving circuit ROIC. MUX 2 denotes a second channel of each multiplexer included in the touch-driving circuit ROIC or the integrated driving chip SRIC including the touch-driving circuit ROIC.

During a MUX 1 driving period, a driving signal output from a touch circuit TC may be applied to the touch panel TSP through the first channel of each multiplexer, and a tilt-tone or full-tone pen signal output from an active pen may be emitted to the touch panel TSP and received by the touch circuit TC through the first channel of each multiplexer.

During a MUX 2 driving period, a driving signal output from a touch circuit TC may be applied to corresponding touch electrodes within the touch panel TSP through the second channel of each multiplexer, and a tilt-tone or full-tone pen signal output from an active pen may be emitted to the touch panel TSP and received by the touch circuit TC through the second channel of each multiplexer.

During one LHB, driving and signal reception (sensing) may be performed through one channel of each multiplexer, or driving and signal reception (sensing) may be sequentially performed through two channels of each multiplexer.

FIGS. 28 and 29 are timing diagrams each illustrating a case in which driving and signal reception (sensing) are sequentially performed through two channels of each multiplexer during one LHB.

Referring to FIG. 28, in a tilt-tone mode (a mode corresponding to a pen position/tilt sensing period) and a full-tone mode (a mode corresponding to a full-tone mode period), when a ping signal PNG is transmitted to an active pen through the touch panel TSP, the active pen may output a tilt-tone or full-tone pen signal after a predetermined time Td elapses from the time point at which the last pulse of the ping signal PNG is confirmed.

Referring to FIG. 29, in a data mode (a mode corresponding to a data transmission period), when a ping signal PNG is transmitted to an active pen through the touch panel TSP, the active pen may output a pen signal corresponding to data including additional pen information after a predetermined time Td elapses from the time point at which the active pen confirms the last pulse of the ping signal PNG.

The pen signal may include a plurality of pen pulses.

The pen signal may be in a first state, in which the pen signal is in an in-phase relationship with an operation signal of the touch circuit TC or a driving signal applied to the touch panel TSP, or may be in a second state, in which the pen signal is in an inverse-phase relationship with the operation signal of the touch circuit TC or the driving signal applied to the touch panel TSP.

This pen signal may be used in a tilt-tone mode (a mode corresponding to a pen position/tilt sensing period) and a full-tone mode (a mode corresponding to a full-tone mode period) in FIG. 28.

As described above, since the pen signal is generated in response to an operation signal of the touch circuit TC or a driving signal applied to the touch panel TSP, the touch circuit TC may accurately detect the pen signal emitted to the touch panel TSP.

Meanwhile, some of the plurality of pen pulses included in the pen signal are in a first state, in which the pulses are in a normal-phase (in-phase) relationship with an operation signal of the touch circuit TC or a driving signal applied to the touch panel TSP ("0"), a second state, in which the pulses are in an inverse-phase relationship with the operation signal of the touch circuit TC or the drive signal applied to the touch panel TSP ("1"), or a third state, in which the pulses have a constant value ("-").

According to this, various kinds of information may be expressed using the three states ("0," "1," and "-") of the pen signal. This example is illustrated in FIG. 30.

Figure 30:
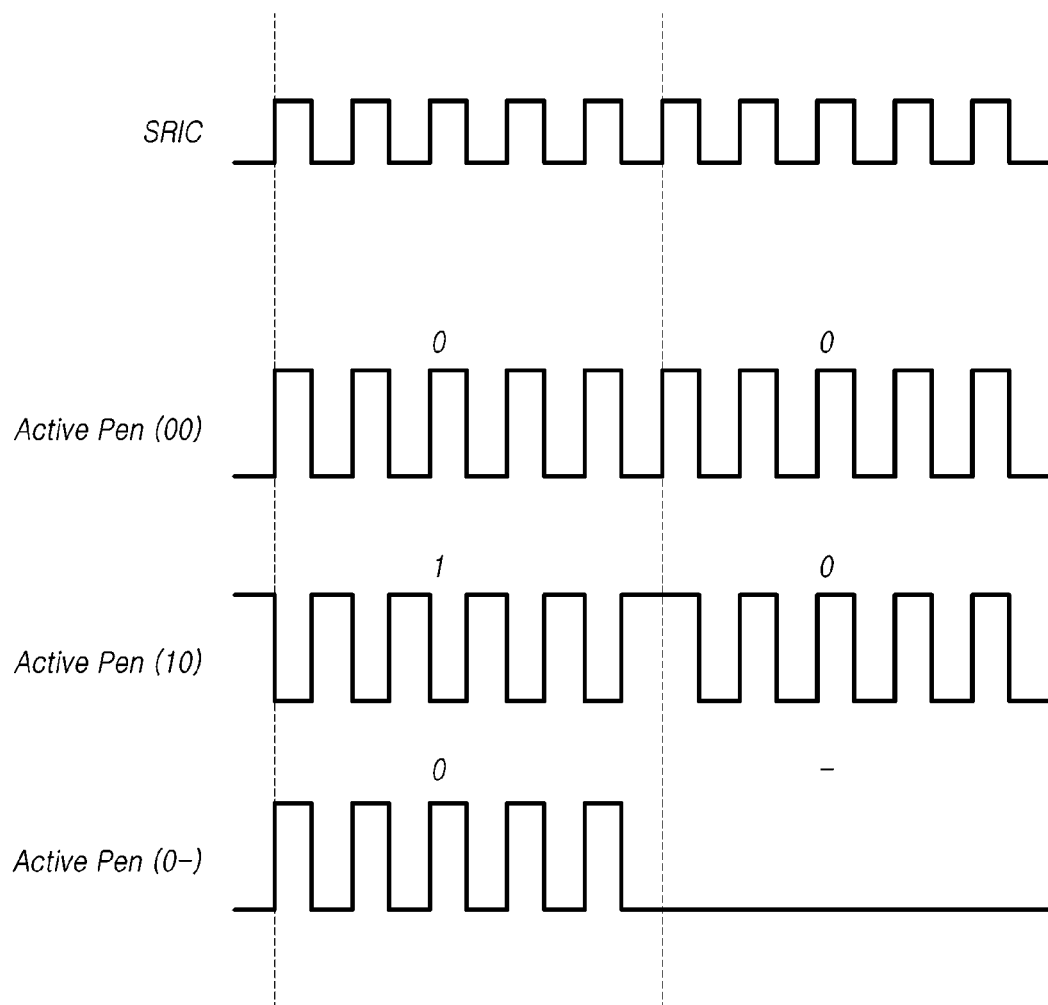
FIG. 30 is a view illustrating pulse patterns of pen signals in a touch system according to embodiments disclosed herein.

FIG. 30 is a view illustrating pulse patterns of pen signals in a touch system according to the present embodiments.

A pen signal may be made by combining three states ("0," "1," and "-") with reference to the phase of an operation signal of a touch signal TC (i.e., a touch-driving circuit ROIC or an integrated driving chip SRIC) or a driving signal applied to the touch panel TSP.

For example, assuming that the pen signal has a two-digit value, when the three states ("0," "1," and "-") are combined, many pen signals may be made as 00, 01, 0-, 10, 11, 1-, -0, -1, --, and so on in order to represent various kinds of information.

FIG. 30 illustrates, by way of an example, a pen signal including information represented by "00," a pen signal including information represented by "10," and a pen signal including information represented by "0-."

These pen signals may be used in a data mode (a mode corresponding to a data transmission period) in FIG. 29 in which various additional pen information (data) is transmitted.

As described above, since a pen signal is generated in response to an operation signal of the touch circuit TC or a driving signal applied to the touch panel TSP, the touch circuit TC may accurately detect the pen signal emitted to the touch panel TSP. Furthermore, since the pulse state of the pen signal is made by the combination of three states ("0," "1," and "-"), more information can be transmitted from an active pen to the touch display device 100 through the pen signal.

Meanwhile, in connection with the transmission of a ping signal PNG, the ping signal PNG is a synchronization signal supplied to the touch panel TSP and transmitted from the touch panel TSP to an active pen. That is, the ping signal PNG may be supplied to all of the touch electrodes TE arranged on the touch panel TSP, and may be transmitted from all of the touch electrodes TE to an active pen.

The ping signal PNG may be supplied to the touch panel TSP in a period separate from a period, in which a beacon signal BCON is supplied to the touch panel TSP.

In this case, the ping signal PNG may be supplied to the touch panel TSP in all or some of LHBs other than LHBs in which the beacon signal BCON is supplied to the touch panel TSP.

The ping signal PNG may be supplied to the touch panel TSP together with the beacon signal BCON in LHBs in which the beacon signal BCON may be supplied to the touch panel TSP, and may be supplied to the touch panel TSP by being included in the beacon signal BCON.

After a predetermined time (e.g., one pulse time (approximately several msec or several µsec)) elapses after the ping signal PNG is supplied to the touch panel TSP, the panel driving signal (e.g., an AC-type driving signal (LFD signal) or a DC-type driving signal) may be supplied to the touch panel TSP. This is to secure a length of time in which an active pen receives a ping signal PNG so as to perform signal recognition and processing.

While the ping signal PNG is supplied to the touch panel TSP and transmitted to the active pen, the active pen may not emit (output) any signal.

Figure 31:
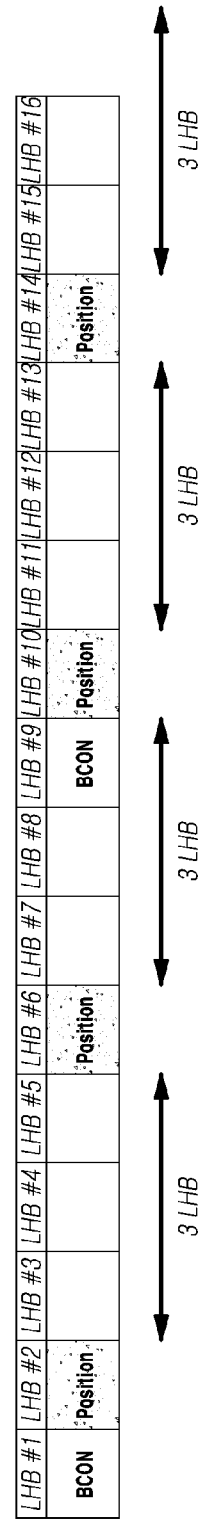
FIGS. 31 and 32 are views illustrating intervals of LHBs corresponding to pen position sensing periods in the touch system according to embodiments disclosed herein.
Figure 32:
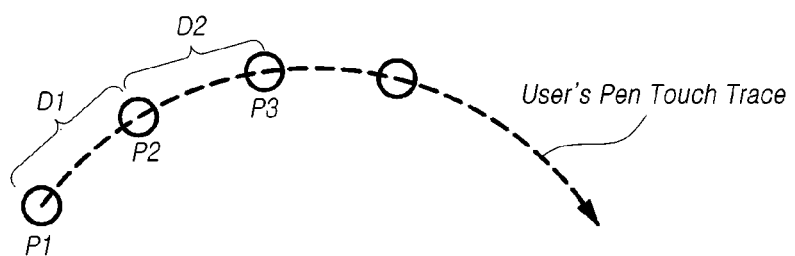

FIGS. 31 and 32 are views illustrating intervals of LHBs corresponding to pen position sensing periods in the touch system according to the present embodiments.

Referring to FIG. 31, the LHBs (LHB #2, LHB #6, LHB #10, and LHB #14) corresponding to pen position/tilt sensing periods for sensing the position (and/or tilt) of an active pen may be arranged at uniform intervals at the time of designing LHB driving.

That is, the intervals between every two LHBs (LHB #2 and LHB #6, LHB #6 and LHB #10, LHB #10 and LHB #14, and LHB #14 and LHB #2 of the next frame period)

corresponding to the pen position/tilt sensing periods for sensing the position (and/or tilt) an active pen are equal to each other as 3 LHBs.

This will be described in more detail with reference to FIGS. 31 and 32.

Assuming that among a plurality of LHBs existing in one or more frame periods, a first LHB (LHB #2), a second LHB (LHB #6), and a third LHB (LHB #10) exist which correspond to three different LHBs in which the display panel 110 receives a pen signal from an active pen, during the first LHB (LHB #2), the touch circuit TC receives the pen signal output from the active pen through the display panel 110 so as to sense the position of the active pen, during the second LHB (LHB #6), the touch circuit TC receives the pen signal output from the active pen through the display panel 110 so as to sense the position of the active pen, and during the third LHB (LHB #10), the touch circuit TC receives the pen signal output from the active pen through the display panel 110 so as to sense the position of the active pen.

Even if at least one of a position P1 of an active pen detected through the first LHB (LHB #2), a position P2 of an active pen sensed through the second LHB (LHB #6), and a position P3 of an active pen sensed through the third LHB (LHB #10) is different from the others, a time interval D1 between the first LHB (LHB #2) and the second LHB (LHB #6) and a time interval D2 between the second LHB (LHB #6) and the third LHB (LHB #10) may be equal to each other.

Even if at least one of a real position P1 of an active pen in the first LHB (LHB #2), a real position P2 of an active pen in the second LHB (LHB #6), and a real position P3 of an active pen the third LHB (LHB #10) is different from the others, a time interval D1 between the first LHB (LHB #2) and the second LHB (LHB #6) and a time interval D2 between the second LHB (LHB #6) and the third LHB (LHB #10) may be equal to each other.

Accordingly, pen touch positions accurately corresponding to a trace touched by the user using the active pen can be sensed without a deviation.

Figure 33:
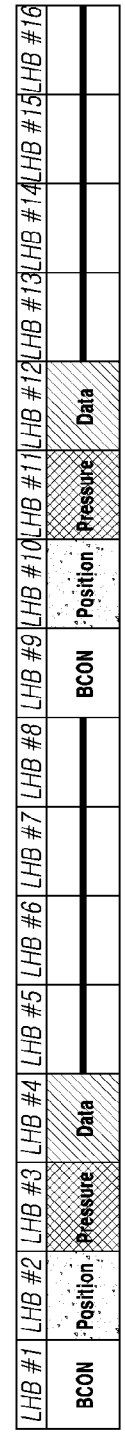
FIG. 33 is a view illustrating LHB driving for reducing power consumption in the touch system according to embodiments disclosed herein.

FIG. 33 is a view illustrating LHB driving for reducing power consumption in the touch system according to the present embodiments.

Referring to FIG. 33, among two or more LHBs (LHB #2 to LHB #8) existing between the first LHB (LHB #1) and the second LHB (LHB #9), there may be at least one LHB (LHB #5, LHB #6, LHB #7, or LHB #8) in which no pen signal is output from an active pen.

Thus, the power consumption of the active pen and the touch display device 100 can be reduced.

Figure 34:
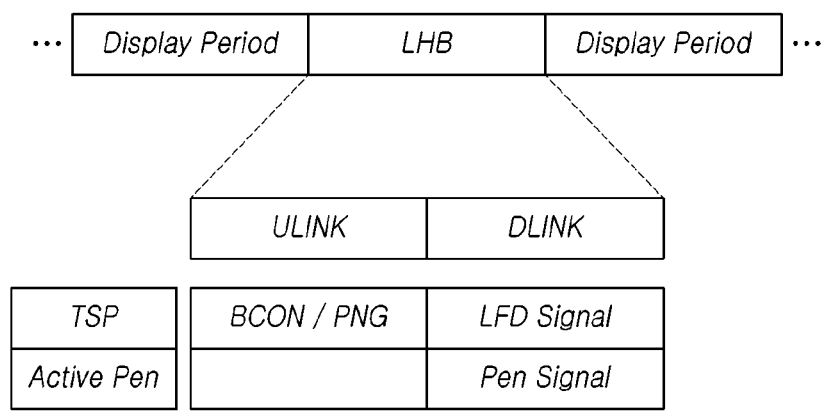
FIG. 34 is a view illustrating the driving of a touch panel and an active pen in an up-link period and a down-link period when one LHB is time-divided into the up-link period and the down-link period in a touch system according to embodiments disclosed herein.

FIG. 34 is a view illustrating the driving of a touch panel TSP and an active pen in an up-link period ULNK and a down-link period DLNK when one LHB is time-divided into the up-link period ULNK and the down-link period DLNK in a touch system according to the present embodiments.

Referring to FIG. 34, each of a plurality of LHBs in one frame period includes an up-link period ULINK for signal transmission from the touch panel TSP or a display panel 110 including the touch panel TSP to the active pen, and a down-link period DLINK for signal transmission from an active pen to the touch panel TSP or a display panel 110 including the touch panel TSP.

Referring to FIG. 34, during the up-link period ULINK, a beacon signal BCON or a ping signal PNG distinguished from a driving signal (LFD signal) may be supplied to the display panel 110 thereby being transmitted to the active pen through the display panel 110.

During the down-link period DLINK, a driving signal (LFD signal) may be supplied to the display panel 110, thereby being transmitted to the active pen through the display panel 110, and the pen signal may be output from the active pen to the display panel 110.

As described above, when an LHB corresponding to a touch period is divided into an up-link period ULINK and a down-link period DUNK, an appropriate panel driving state required for pen recognition is made for each of the up-link period ULINK and the down-link period DLINK, and the touch panel TSP and the active pen exchange information or a signal required for pen recognition, efficient and accurate signal transmission and reception for pen recognition may be enabled, and consequently accurate and efficient pen recognition may be enabled.

Figure 35:
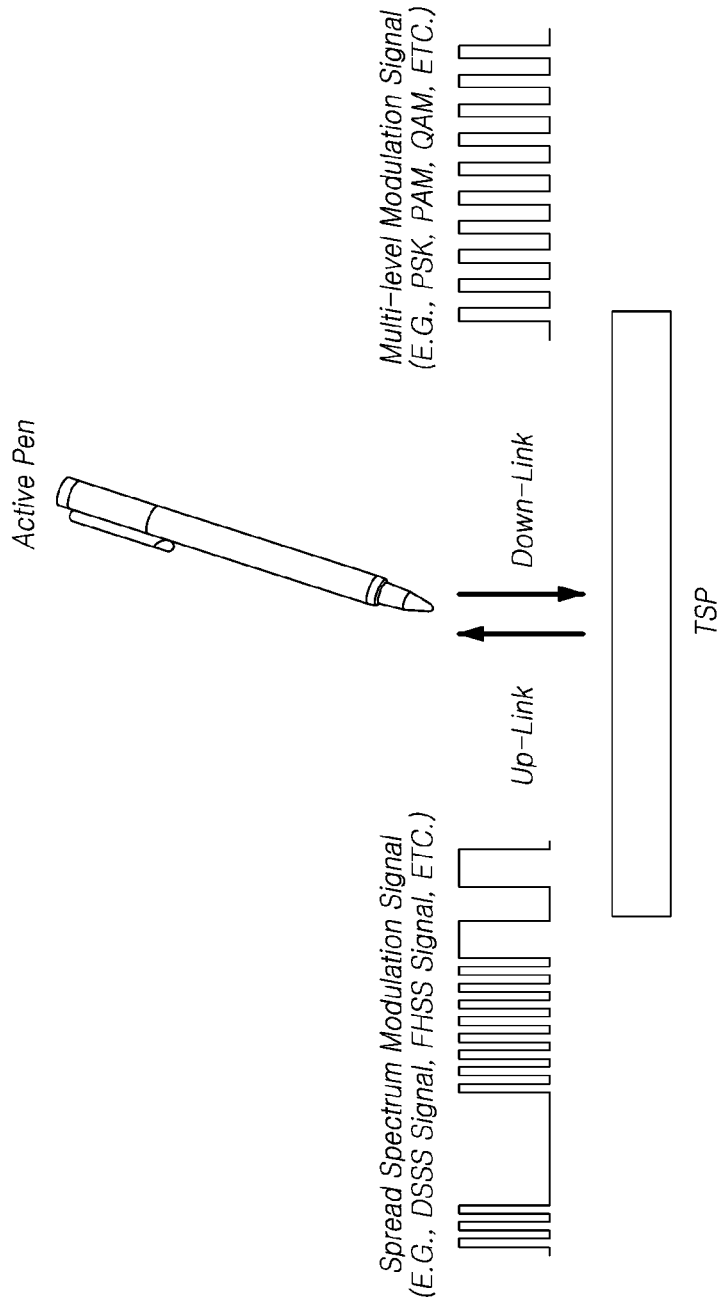
FIG. 35 is a view illustrating a digital modulation method of a signal transmitted from the touch panel and a signal transmitted from an active pen in the touch system according to embodiments disclosed herein.

FIG. 35 is a view illustrating a digital modulation method of a signal transmitted from the touch panel TSP and a signal transmitted from an active pen in the touch system according to the present embodiments.

Referring to FIG. 35, a signal transmitted from the display panel 110 to the active pen and a signal transmitted from the active pen to the display panel 110 may be different digital modulated signals.

For example, a signal (e.g., a driving signal for driving the touch panel such as BCON or PNG) transmitted from the touch panel TSP to the active pen during an up-link period ULINK and a signal (e.g., a pen signal) transmitted from the active pen to the touch panel TSP during a down-link period DUNK may be signals modulated by different digital modulation methods.

As described above, by using different digital modulation methods for a signal (e.g., a drive signal for driving the touch panel, such as BCON or PNG) transmitted from the touch panel TSP to the active pen and a signal (e.g., a pen signal) transmitted from the active pen to the touch panel TSP during the down-link period DLINK, it is possible to provide a communication environment suitable for the characteristics and transmission environment of a bi-directionally transmitted signal (information).

As specific examples of digital modulation methods, as illustrated in FIG. 35, a signal (e.g., a driving signal for driving a touch panel such as BCON or PNG) transmitted from a touch panel TSP to an active pen during an up-link period ULINK may be a spread spectrum modulation signal.

In addition, a signal (e.g., a pen signal) transmitted from an active pen to a touch panel TSP during a down-link period DLINK may be a multi-level modulation signal.

The spread spectrum modulation is a kind of modulation technique that spectrum-spreads a signal to be transmitted using a pseudo noise (PN) code.

Such spread spectrum modulation may include, for example, direct sequence spread spectrum (DSSS) modulation, frequency hopping spread spectrum (FHSS) modulation, time hopping spread spectrum (THSS) modulation, and so on.

In addition, the multi-level modulation is a method of modulating a digital signal to be transmitted in three or more levels that represent binary numbers when performing amplitude modulation, phase modulation, frequency modulation, or the like that are used when modulating a digital signal into a carrier wave. That is, the multi-level modulation is a modulation technology for multi-valuing the number of states that can be taken in the modulation to two or more (levels or phases) without changing the modulation rate in the case where it is intended to transmit more information in a limited transmission band.

Such multi-level modulation includes phase shift keying (PSK) which is phase modulation, pulse amplitude modulation (PAM) which is amplitude modulation, quadrature amplitude modulation (QAM), which is a modulation of a combination of phase and amplitude, vestigial side band (VSB) modulation, and so on.

As described above, when a signal is transmitted from a touch panel TSP to an active pen, it is possible to transmit a signal that is robust against noise and high in security to the active pen by using the spread spectrum technique, and a considerable pen recognition improvement can be expected in a multi-pen environment. Further, when a signal is transmitted from an active pen to a touch panel TSP, it is possible to transmit more information to the touch panel TSP in a limited transmission band by using the multi-level modulation technique.

FIG. 36 is a view illustrating full sensing and local sensing in the touch system according to the present embodiments.

Referring to FIG. 36, the touch display device 100 according to the present embodiments may sense touches made by a finger and an active pen in the entire screen area.

Sensing touches made by a finger and an active pen in the entire screen area of a touch display device 100 is referred to as full sensing.

The entire screen area in which full sensing is performed is referred to as a full sensing area (FSA).

Referring to FIG. 36, in the touch display device 100 according to the present embodiments, a touch made by a finger and/or an active pen may be made only in a partial screen area.

Sensing a touch made by a finger and/or an active pen in the entire screen area of a touch display device 100 is referred to as local sensing.

The whole screen area in which local sensing is performed is referred to as a local sensing area (LSA).

The number of such LSAs may be one or more.

At the time of local sensing, the touch circuit TC may perform pen recognition processing (pen-touch-sensing processing) in an LSA corresponding to a partial area of the entire screen area.

In connection with a driving method at the time of local sensing, the touch display device 100 may perform sensing processing (touch-sensing processing or pen-touch-sensing processing) by performing signal detection through the touch electrodes arranged in the LSA by supplying a driving signal only to the touch electrodes arranged in the LSA among all of the touch electrodes arranged in the touch panel TSP.

In some cases, at the time of local sensing, the touch display device 100 may perform sensing processing (touch-sensing processing or pen-touch-sensing processing) by supplying a driving signal to all of the touch electrodes arranged on the touch panel TSP and instead, detecting the driving signal through only the touch electrodes arranged in the LSA.

Referring to FIG. 36, a method of sensing the entire screen area may sense an FSA during one LHB. However, when only one LHB is allocated for only a short time, an FSA may be sensed during several LHBs (e.g., 4, 6, 8, or 14 LHBs).

For example, when sensing one-sixth of the FSA during each LHB, the entire screen area may be sensed after passing through six LHBs.

Figure 37:
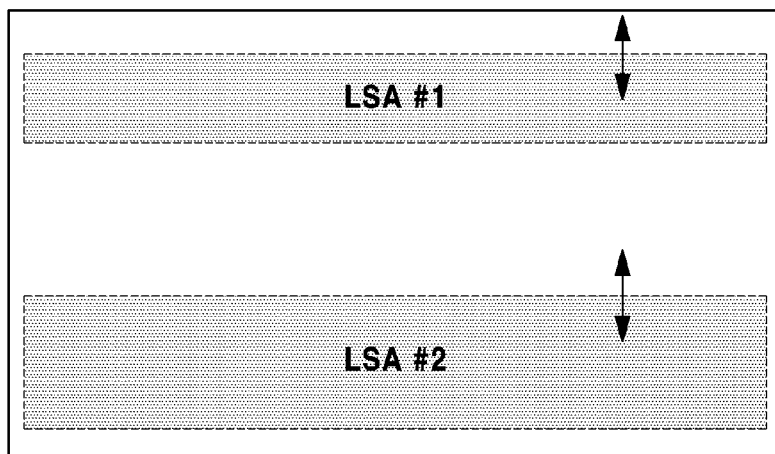
FIG. 37 is a view illustrating variable control of a local sensing area in the touch system according to embodiments disclosed herein.

FIG. 37 is a view illustrating variable control of an LSA in the touch system according to the present embodiments.

As illustrated in FIG. 37, the touch display device 100 may perform local sensing in two or more LSAs (LSA #1 and LSA #2), and may make the size of at least one of two or more LSAs (LSA #1 and LSA #2) variable.

In other words, the location or size of an LSA may be variable.

Accordingly, accurate pen recognition (pen-touch-sensing) may be enabled even in variable situations in which the number of active pens and the touch range of the active pens are dynamically variable.

In FIGS. 36 and 37, the LSA is illustrated in the form of a square block. However, this is only an example for convenience of explanation and may have various shapes.

For example, the LSA may vary in shape depending on the performance and state of the display panel 110, the shape of each the touch electrodes, the number of touch electrodes, the grouping of the touch electrodes, and so on. For example, depending on the shape of the grouping of the touch electrodes, the LSA may have various shapes, such as a square, a circle, an ellipse, a square, a polygon, or a cross.

In addition, the shape of the LSA may always be constant, or may be adaptively changed depending on whether or not a finger and/or an active pen exist, the number of fingers and/or active pens, and so on.

Figure 38:
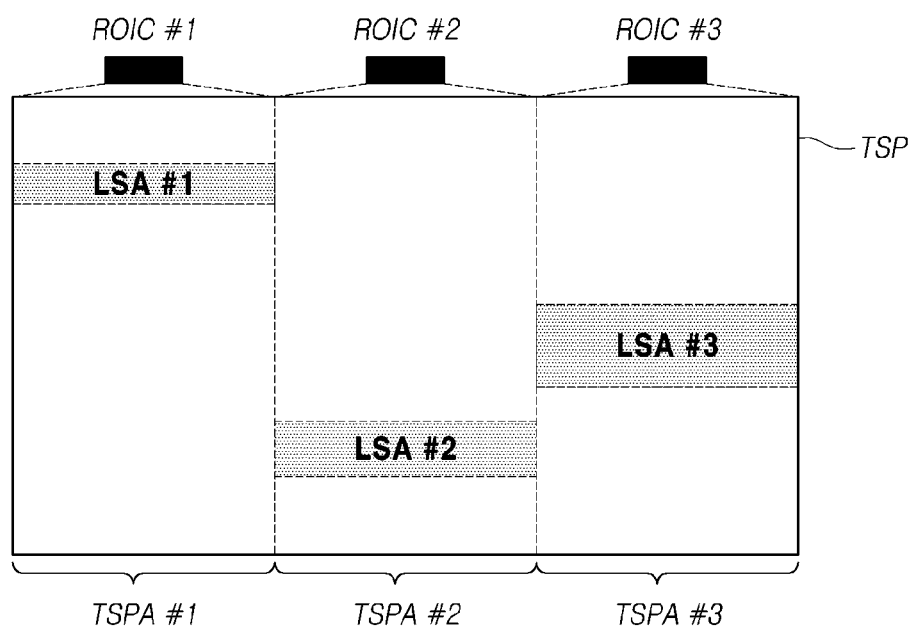
FIGS. 38 and 39 are illustrative views of local sensing in the touch system according to embodiments disclosed herein.
Figure 39:
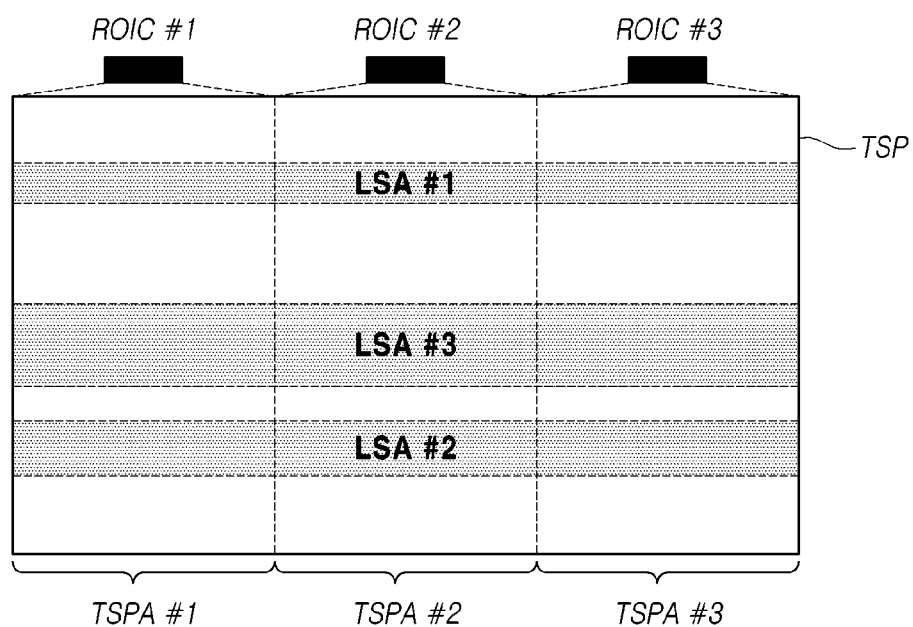

FIGS. 38 and 39 are illustrative views of local sensing in the touch system according to the present embodiments.

As illustrated in FIGS. 38 and 39, the three touch-driving circuits ROIC #1, ROIC #2 and ROIC #3 may drive a touch panel TSP.

The first touch-driving circuit ROIC #1 controls a first touch panel area TSPA #1 of the touch panel TSP.

That is, the first touch-driving circuit ROIC #1 may drive the touch electrodes arranged in the first touch panel area TSPA #1 of the touch panel TSP, and may detect a signal from the touch electrodes arranged in the first touch panel area TSPA #1.

The second touch-driving circuit ROIC #2 controls a second touch panel area TSPA #2 of the touch panel TSP.

That is, the second touch-driving circuit ROIC #2 may drive the touch electrodes arranged in the second touch panel area TSPA #2 of the touch panel TSP, and may detect a signal from the touch electrodes arranged in the second touch panel area TSPA #2.

The third touch-driving circuit ROIC #3 controls a third touch panel area TSPA #3 of the touch panel TSP.

That is, the third touch-driving circuit ROIC #3 may drive the touch electrodes arranged in the third touch panel area TSPA #3 of the touch panel TSP, and may detect a signal from the touch electrodes arranged in the third touch panel area TSPA #3.

As illustrated in FIG. 38, a local sensing area in which each of the three touch-driving circuits ROIC #1, ROIC #2, and ROIC #3 performs driving and signal detection for local sensing may exist in its own touch panel area.

Specifically, the first touch-driving circuit ROIC #1 may perform driving and signal detection in a first local sensing area LSA #1 in the first touch panel area TSPA #1.

The second touch-driving circuit ROIC #2 may perform driving and signal detection in a second local sensing area LSA #2 in the second touch panel area TSPA #2.

The third touch-driving circuit ROIC #3 may perform driving and signal detection in a third local sensing area LSA #3 in the third touch panel area TSPA #3.

As illustrated in FIG. 39, a local sensing area in which each of the three touch-driving circuits ROIC #1, ROIC #2, and ROIC #3 performs driving and signal detection for local sensing may commonly exist in all of the touch panel areas TSP #1, TSPA #2, and TSPA #3.

Specifically, the first touch-driving circuit ROIC #1 may perform driving and signal detection in a first local sensing area LSA #1 that extends over the entire area of the touch panel TSP.

The second touch-driving circuit ROIC #2 may perform driving and signal detection in a second local sensing area LSA #2 that extends over the entire area of the touch panel TSP.

The third touch-driving circuit ROIC #3 may perform driving and signal detection in a third local sensing area LSA #3 that extends over the entire area of the touch panel TSP.

FIG. 40 is view illustrating two types of touch electrodes TE in a display device 100 according to the present embodiments.

As illustrated in FIG. 40, each of the plurality of touch electrodes TE, constituting the touch panel TSP may be of a plate type in which no open area exists, or of a mesh type, in which at least one open area OA exists.

The plate-type touch electrode TE, may be a transparent electrode.

When one touch electrode TE is of a mesh type, each open area OA existing in the one touch electrode TE corresponds to a light-emitting area of a sub pixel for image display.

Meanwhile, the touch display device 100 according to the present embodiments may be various types of displays, such as a liquid crystal display (LCD) device, an organic light-emitting display (OLED) device, and a quantum dot display device.

In addition, in the touch display device 100 according to the present embodiments, the touch panel TSP may be of an add-on type (or an externally mounted type) manufactured separately from the display panel 110 and bonded to the display panel 110.

Alternatively, the touch panel TSP may be of a built-in type (e.g., an in-cell type, an on-cell type, or the like) embedded in the display panel 110. In this case, the touch panel TSP may be regarded as an aggregate of a plurality of touch electrodes TE, and the plurality of touch electrodes TE may be embedded and arranged in the display panel 110.

Hereinbelow, in the case where the display panel is an LCD panel, a panel structure in which a plurality of touch electrodes TE is embedded in the display panel 110 will be briefly described with reference to FIG. 41.

Next, in the case where the display panel 110 is an OLED panel, a panel structure in which a plurality of touch electrodes TE is embedded in the display panel 110 will be briefly described with reference to FIGS. 42 to 47 as an example.

Figure 41:
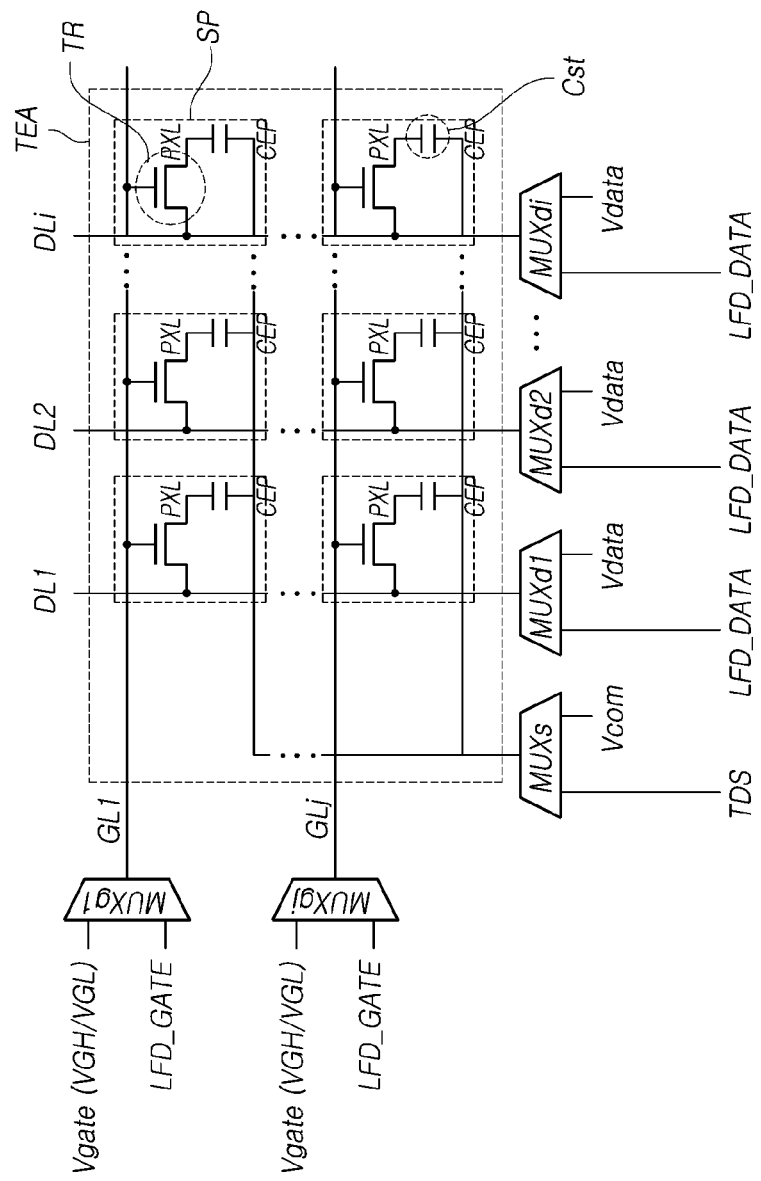
FIG. 41 is a view illustrating an area in which one touch electrode is located when the display panel is a liquid crystal display panel and a touch panel is embedded in the touch display device according to embodiments disclosed herein.

FIG. 41 is a view illustrating an area where one touch electrode TE is located when the display panel 110 of the touch display device 100 according to the present embodiments is an LCD panel 110 in which the touch panel TSP is built, in which the area is conceptualized in a circuit.

Referring to FIG. 41, one touch electrode TE is disposed in a size corresponding to an area TEA in which i×j subpixels (SP) are arranged by i data lines (DL1 to DLi) and j gate lines (GL1 to GLj).

In each subpixel SP, there is a transistor TR having a gate electrode connected to a corresponding gate line, a source electrode (or drain electrode) connected to a corresponding data line, and a drain electrode (or source electrode) connected to a corresponding pixel electrode PXL.

A plurality of touch electrodes TE is arranged in blocks in the entire display panel 110.

The plurality of touch electrodes TE forms a pixel electrode PXL and a capacitor Cst in each sub-pixel SP.

Referring to FIG. 41, the capacitor Cst in each sub-pixel SP is formed by a pixel voltage applied to the corresponding pixel electrode PXL and a common voltage Vcom applied to a CEP point.

All of the CEP points in one touch electrode area TEA are points that are present on one touch electrode TE when viewed electrically.

During a display period, in all of the touch electrode areas TEA, all of the CEP points each corresponding to one electrode constituting the capacitor Cst in each sub-pixel SP may be connected by multiplexers MUXs. Accordingly, the common voltage Vcom may be applied to all of the sub-pixel areas of the display panel 110.

Accordingly, the common voltage Vcom may be applied to all of the CEP points in the display panel 110 by the multiplexers MUXs.

During a blank period (e.g., LHB), in one or more or all of the touch electrode areas TEA, all of the CEP points each corresponding to one electrode constituting a capacitor Cst in each sub-pixel SP may be connected by the multiplexer MUXs.

Accordingly, a driving signal (e.g., a touch-driving signal TDS) may be applied to all or some of the touch electrodes TE arranged on the display panel 110 by the multiplexers MUXs.

Accordingly, a driving signal (e.g., a touch-driving signal TDS) may be applied to all of the CEP points on all or some of the touch electrodes TE arranged on the display panel 110 by the multiplexers MUXs.

In order to prevent parasitic capacitance from being formed between the data line and the touch electrode, when a touch-driving signal TDS is applied to the touch electrode TE, a load-free driving signal LFD_DATA (Vtouch_data in FIG. 2) that is the same (substantially the same) as the touch-driving signal TDS may be applied to the data lines DL1 to DLi.

For this purpose, multiplexers MUXd1 to MUXdi are connected to the data lines DL1 to DLi.

During the display period, the multiplexers MUXd1 to MUXdi may supply the corresponding data voltages Vdata to the data lines DL1 to DLi, respectively.

During the display period, the multiplexers MUXd1 to MUXdi may supply a load-free driving signal LFD_DATA (Vtouch_data in FIG. 2) to all of the data lines DL1 to DLi in the touch electrode area TEA.

Meanwhile, in order to prevent parasitic capacitance from being formed between the gate line and the touch electrode, when a touch-driving signal TDS is applied to the touch electrode TE, a load-free driving signal LFD_GATE (Vtouch_gate in FIG. 2) that is the same (substantially the same) as the touch-driving signal TDS may be applied to the gate lines GL1 to GLj.

For this purpose, the multiplexers MUXg1 to MUXgj are connected to the gate lines GL1 to GLj.

During the display period, the multiplexers MUXg1 to MUXgj may sequentially supply the corresponding gate voltage Vgate to the gate lines GL1 to GLj.

During the display period, the multiplexers MUXg1 to MUXgj may supply the load-free driving signal LFD_GATE (Vtouch_gate in FIG. 2) to all of the gate lines GL1 to GLj in the touch electrode area TEA.

Figure 42:
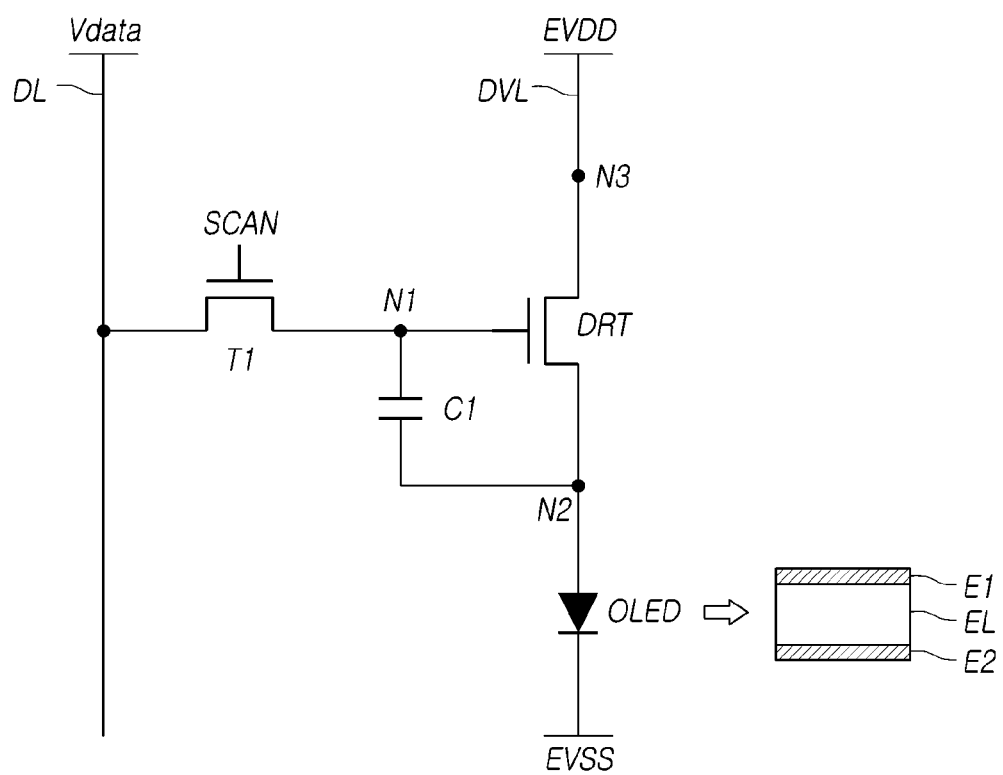
FIG. 42 is a circuit diagram of each sub-pixel in the display panel when the display panel is an organic light-emitting display panel in the touch display device according to embodiments disclosed herein.

FIG. 42 is a circuit diagram of each sub-pixel in a display panel 110 when the display panel 110 is an organic light-emitting display panel in the touch display device 100 according to the present embodiments.

Referring to FIG. 42, in the display panel 110 according to the present embodiments, each subpixel SP may basically include an OLED, a driving transistor DRT configured to drive the OLED, a first transistor T1 configured to transmit a data voltage Vdata to a first node N1 corresponding to a gate node of the driving transistor DRT, and a storage capacitor C1 configured to hold the data voltage Vdata corresponding to an image signal voltage or a voltage corresponding to the data voltage during one frame period.

The OLED may include a first electrode E1 (an anode electrode or a cathode electrode), an organic light-emitting layer EL, a second electrode E2 (a cathode electrode or an anode electrode), and so on.

For example, a ground voltage EVSS may be applied to the second electrode E2 of the OLED.

The driving transistor DRT drives the OLED by supplying a driving current to the OLED.

The driving transistor DRT has a first node N1, a second node N2, and a third node N3.

The first node N1 of the driving transistor DRT is a node corresponding to a gate node, and may be electrically connected to a source node or a drain node of the first transistor T1.

The second node N2 of the driving transistor DRT may be electrically connected to the first electrode E1 of the OLED, and may be a source node or a drain node.

The third node N3 of the driving transistor DRT may be a node to which a driving voltage EVDD is applied, and may be electrically connected to a driving voltage line DVL that supplies the driving voltage EVDD. The third node N3 may be a drain node or a source node.

Each of the driving transistor DRT and the first transistor T1 may be implemented as an n-type or a p-type.

The first transistor T1 is electrically connected between the data line DL and the first node N1 of the driving transistor DRT, and may be controlled by receiving a scan signal SCAN applied to the gate node thereof through the gate line.

The first transistor T1 may be turned on by the scan signal SCAN so as to transmit the data voltage Vdata supplied from the data line DL to the first node N1 of the driving transistor DRT.

The storage capacitor C1 may be electrically connected between the first node N1 and the second node N2 of the driving transistor DRT.

The storage capacitor C1 is not a parasitic capacitor (e.g., Cgs or Cgd) which is an internal capacitor existing between the first node N1 and the second node N2 of the driving transistor DRT, but an external capacitor intentionally designed outside the driving transistor DRT.

Figure 43:
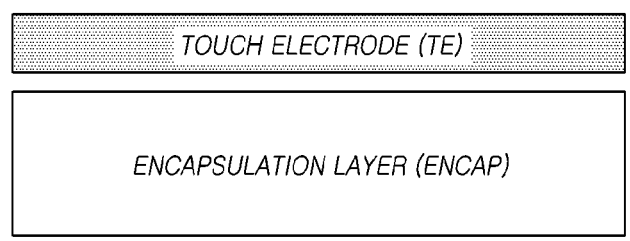
FIG. 43 is a view schematically illustrating a position at which a touch electrode is formed when the display panel in the touch display device according to embodiments disclosed herein is an organic light-emitting display panel in which a touch panel is embedded.

FIG. 43 is a view briefly illustrating the position at which a touch electrode 1 is formed when, in the touch display device 100 according to the present embodiments, the display panel 110 is the organic light-emitting display panel 110 and a touch panel TSP is embedded therein.

When the display panel 110 according to the present embodiments is an organic light-emitting display panel 110 and the touch panel TSP is embedded therein, a plurality of touch electrodes TE may be positioned on an encapsulation layer ENCAP. Here, the encapsulation layer ENCAP is a layer for protecting the panel from moisture, air, physical shocks, or foreign matter that may occur during a manufacturing process in order to ensure the reliability of the panel.

This structure is called touch sensor on encapsulation layer (TOE) structure.

Figure 44:
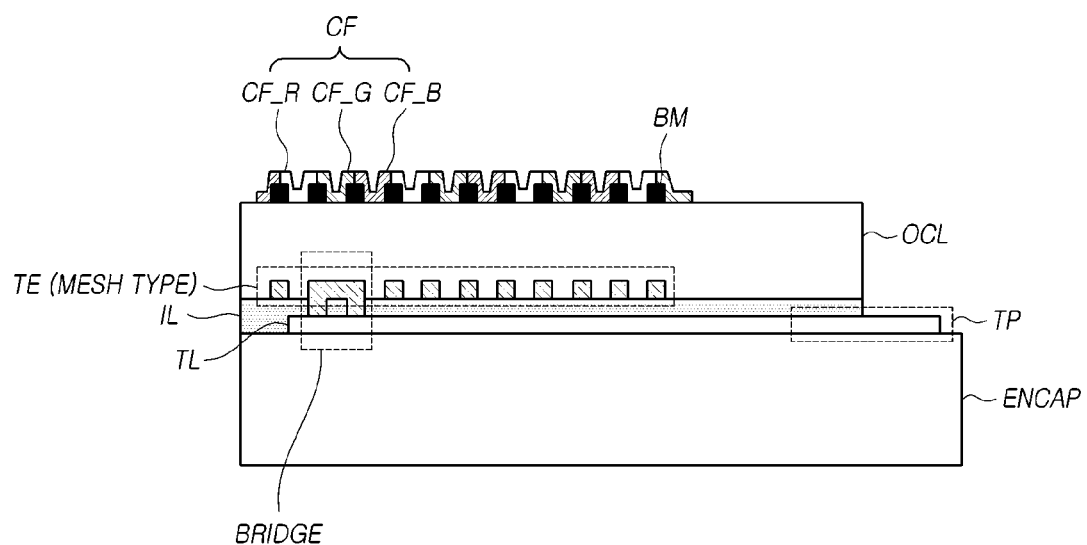
FIGS. 44 to 47 are illustrative views of a touch sensor metal layer on encapsulation layer (TOE) structure when the display panel in the touch display device according to embodiments disclosed herein is an organic light-emitting display panel in which a touch panel is embedded.
Figure 45:
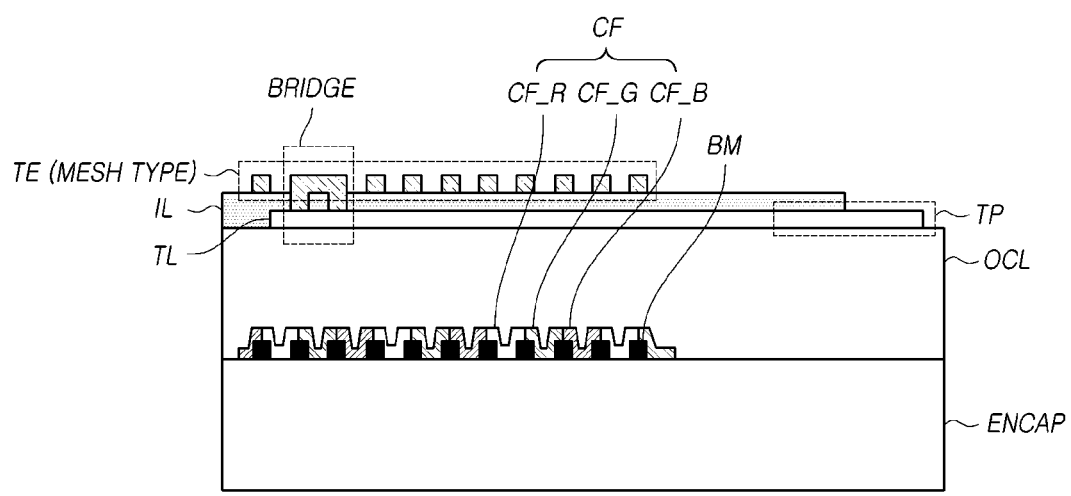
Figure 46:
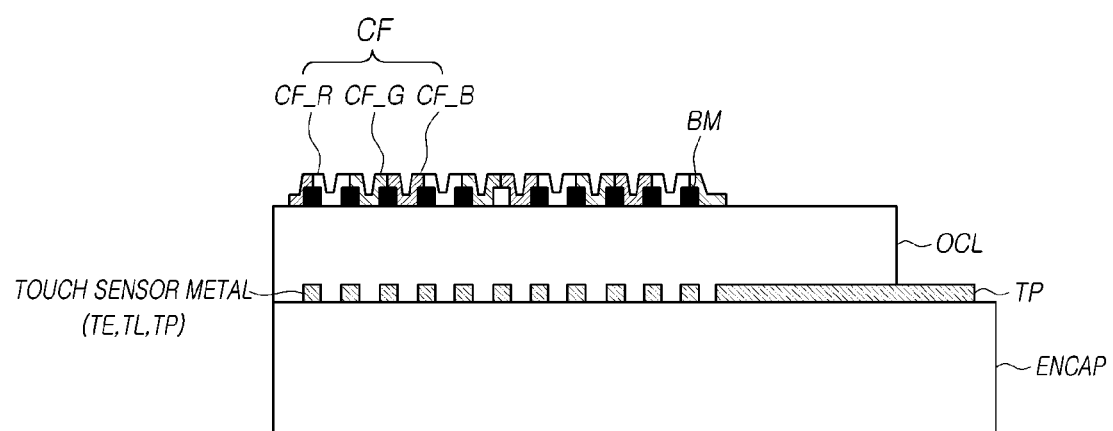

FIGS. 44 to 46 are illustrative views of TOE structures related to one mesh-type touch electrode TE when, in the touch display device 100 according to the present embodiments, the display panel 110 is an OLED panel 110 and a touch panel TSP is embedded therein.

Referring to FIGS. 44 to 46, a touch sensor metal used for touch-sensing, in addition to a plurality of touch electrodes TE, may further include a plurality of touch lines corresponding to signal lines SL that electrically connect the plurality of electrodes TE to a touch circuit TC, and touch pads at which the plurality of touch lines TL are connected to the touch circuit TC.

All of the touch sensor metals may be located on the encapsulation layer ENCAP.

FIGS. 44 and 45 illustrate a TOE structure in which touch electrodes TE and a touch line TL exist in different layers.

Figure 47:
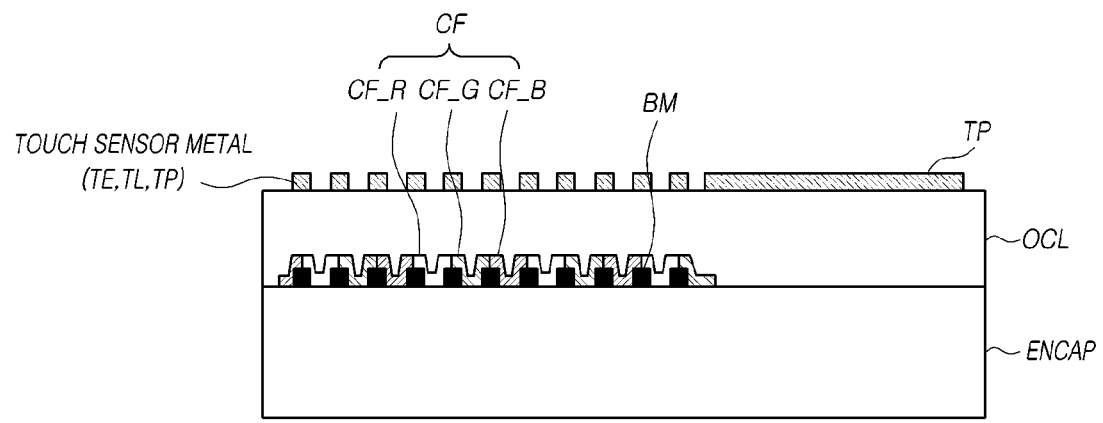

FIGS. 46 and 47 illustrates a TOE structure in which touch electrodes TE, and a touch line TL exist in the same layer.

First, the first TOE structure illustrated in FIG. 44 will be described.

Due to the TOE structure, the touch electrodes TE, the touch line TL, and the touch pad TP exist on the encapsulation layer ENCAP.

However, the touch electrodes TE, the touch line TL, and the touch pad TP exist in different layers.

The touch line TL is located on the encapsulation layer ENCAP.

An end portion of the touch line TL serves as a touch pad TP, or may be connected to a touch pad TP located outside the panel. Here, the touch pad TP is connected to the touch circuit TC.

An insulating layer IL is present on the touch line TL.

A mesh-type touch electrode TE, is placed on the insulating layer IL.

In a bridge portion, the touch electrode TE, is electrically connected to the touch line TL through a contact hole passing through the insulating layer IL.

An overcoat layer OCL may be disposed to cover the touch electrode TE.

Black matrices BM and color filters CF are disposed on the overcoat layer OCL.

The color filters CF correspond to, for example, a red color filter CF_R, a green color filter CF_G, and a blue color filter CF_B, and the position of each of the red color filter CF_R, the green color filter CF_G, and the blue color filter CF_B corresponds to the position of one sub-pixel.

One black matrix BM exists in the boundary portion between two sub-pixels SP, and the area occupied by one touch electrode TE is larger than the area occupied by one sub-pixel SP.

The positions of the open areas in one touch electrode TE formed in the mesh type illustrated in FIG. 44 correspond to the positions of the light-emitting areas of respective sub-pixels SP.

Next, a second TOE structure illustrated in FIG. 45 will be described.

Due to the TOE structure, touch electrodes TE, a touch line TL, and a touch pad TP exist on an encapsulation layer ENCAP.

However, the touch electrodes TE, the touch line TL, and the touch pad TP exist in different layers.

Black matrices BM and color filters CF are disposed on the encapsulation layer ENCAP.

An overcoat layer OCL is disposed on the black matrices BM and color filters CF.

The touch line TL is located on the overcoat layer OCL.

An end portion of the touch line TL serves as a touch pad TP, or may be connected to a touch pad TP located outside the panel. Here, the touch pad TP is connected to the touch circuit TC.

An insulating layer IL is present on the touch line TL.

A mesh-type touch electrode TE is placed on the insulating layer IL.

In a bridge portion, the touch electrode TE is electrically connected to the touch line TL through a contact hole passing through the insulating layer IL.

The positions of the open areas in one touch electrode TE formed in the mesh type illustrated in FIG. 45 correspond to the positions of the light-emitting areas of respective sub-pixels SP.

Next, a third TOE structure illustrated in FIG. 46 will be described.

Due to the TOE structure, touch sensor metals, each including touch electrodes TE, a touch line TL, and a touch pad TP, exist on an encapsulation layer ENCAP.

However, the touch sensor metals, each including the touch electrodes TE, the touch line TL, and the touch pad TP, exist in the same layer.

However, the touch sensor metals, each including the touch electrodes IL, the touch line TL, and the touch pad TP, are located on the encapsulation layer ENCAP.

An end portion of the touch line TL serves as a touch pad TP or may be connected to a touch pad TP located outside the panel. Here, the touch pad TP is connected to the touch circuit TC.

An over-coat layer OCL may be disposed on the touch sensor metals, each including the touch electrodes IL, the touch line TL, and the touch pad TP.

Black matrices BM and color filters CF are disposed on the overcoat layer OCL.

The positions of the open areas in one touch electrode TE formed in the mesh type illustrated in FIG. 46 correspond to the positions of the light-emitting areas of respective sub-pixels SP.

Next, a fourth TOE structure illustrated in FIG. 47 will be described.

Due to the TOE structure, touch sensor metals, each including touch electrodes TE, a touch line TL, and a touch pad TP, exist on an encapsulation layer ENCAP.

However, the touch sensor metals, each including the touch electrodes IL, the touch line TL, and the touch pad TP, may be located on the same layer.

Black matrices BM and color filters CF are disposed on the encapsulation layer ENCAP.

An overcoat layer OCL is disposed to cover the black matrices BM and color filters CF.

However, the touch sensor metals, each including the touch electrodes IL, the touch line TL, and the touch pad TP, are located on the overcoat layer OCL.

An end portion of the touch line TL serves as a touch pad TP or may be connected to a touch pad TP located outside the panel. Here, the touch pad TP is connected to the touch circuit TC.

The positions of the open areas in one touch electrode TE formed in the mesh type illustrated in FIG. 47 correspond to the positions of the light-emitting areas of respective sub-pixels SP.

Meanwhile, in the TOE structures of FIGS. 44 to 47, color filters CF are arranged above the encapsulation layer ENCAP. These color filters CF may be necessary in the case of using white OLEDs. When each White OLED uses OLEDs of, for example, red, green, and blue, the color filters CF may not be needed.

The embodiments described above may provide a driving method and device in a touch display device 100 including touch electrodes embedded in a display panel 110, in which a plurality of touch electrodes TE, is driven by a so-called multiplexer unit (or a multiplexer channel unit), display driving and touch driving are separately performed in a display period and a touch period, a period for informing an active pen side of touch panel information, a touch panel state, and so on (a beacon signal transmission period) is included in the touch period, and position sensing of the plurality of active pens and transmission of pen signals of each active pen are performed during the touch period.

According to the present embodiments described above, it is possible to provide a touch display device 100, an active pen, a touch system, a touch circuit, and a pen recognition method capable of efficiently providing a display function, a touch-sensing function, and a pen-touch-sensing function.

According to the present embodiments, it is possible to provide a touch display device 100, an active pen, a touch system, a touch circuit, and a pen recognition method capable of improving pen-touch-sensing performance without deteriorating display performance and touch performance.

According to the present embodiments, it is possible to provide a touch display device 100, an active pen, a touch system, a touch circuit, and a pen recognition method which enable a plurality of pen-touch inputs to be made at the same time.

According to the present embodiments, it is possible to provide a touch display device 100, an active pen, a touch system, a touch circuit, and a pen recognition method capable of accurately distinguishing and processing a plurality of pen-touch inputs from each other.

According to the present embodiments, it is possible to provide a touch display device 100, an active pen, a touch system, a touch circuit, and a pen recognition method that enable the recognition of positions, pressures, tilts, buttons, and the like not only for one pen, but also for a plurality of pens.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An active pen comprising:
   a pen body;
   a first pen tip configured to receive a beacon signal or a ping signal from a touch display device and configured to transmit pen signals to the touch display device; and
   a micro control unit configured to control a pulse generation timing of the pen signals based on the beacon signal or the ping signal from the touch display device;
   wherein the active pen has a first state and a second state to generate the pen signals including a plurality of pen pulses, the pen signals in the first state are in-phase with an operation signal of a touch circuit or a drive signal of the touch display device, and the pen signals in the second state are in an inverse-phase with the operation signal of the touch circuit or the drive signal of the touch display device.

2. The active pen of claim 1, wherein the touch display device includes a display panel comprising a plurality of touch electrodes for sensing touch of the display panel.

3. The active pen of claim 2, wherein the touch circuit of the touch display device is configured to supply the drive signal to the display panel, the touch circuit sensing at least one of a finger touch of the display panel based on a touch signal received in response to the drive signal or senses a pen touch of the display panel by the active pen based on pen signals received from the active pen in response to the drive signal.

4. The active pen of claim 2, wherein at least one frame period of the touch display device includes a plurality of alternating display periods for displaying images and a plurality of blank periods, the pen signals output from the active pen to the display panel in two or more blank periods from the plurality of blank periods in the one frame period of the touch display device.

5. The active pen of claim 4, wherein the two or more blank periods comprise a pen position/tilt sensing period, at least one of a position of the active pen or a tilt angle of the active pen is sensed during the pen position/tilt sensing period.

6. The active pen of claim 5, wherein time intervals between a plurality of pen position/tilt sensing periods are equal.

7. The active pen of claim 4, wherein the touch display device outputs the beacon signal to the active pen during a beacon signal transmission period, the beacon signal comprising pulses representing predetermined codes.

8. The active pen of claim 7, wherein the beacon signal transmission period is in the plurality of blank periods.

9. The active pen of claim 1, wherein the touch display device operates in one of a pen-searching mode for identifying the active pen or a pen mode for communicating with the active pen based on the beacon signal.

10. The active pen of claim 1, wherein the beacon signal includes display panel information of the touch display device and driving control information that defines driving attributes of the active pen.

11. The active pen of claim 1, wherein the beacon signal includes a frequency of the plurality of pen pulses that represents the pen signals, and a number of the plurality of pen pulses that represents the pen signals.

12. The active pen of claim 1, wherein the beacon signal defines a number of blank periods between a beacon signal transmission period and a subsequent beacon signal transmission period.

13. The active pen of claim 12, wherein a blank period in which no pen signal is emitted to save power is between the beacon signal transmission period and the subsequent beacon signal transmission period.

14. The active pen of claim 4, wherein the touch display device transmits the ping signal comprising pulses that represent predetermined codes to the active pen during the plurality of blank periods.

15. The active pen of claim 1, wherein the active pen further comprising a pressure sensor configured to sense a pressure of the active pen.

16. The active pen of claim 1, wherein the active pen further comprising a second pen tip,
wherein an angle between the active pen and the touch display device is calculated based on a position of a first pen tip and a position of the second pen tip.

* * * * *